(12) United States Patent
Durney et al.

(10) Patent No.: US 7,032,426 B2
(45) Date of Patent: *Apr. 25, 2006

(54) TECHNIQUES FOR DESIGNING AND MANUFACTURING PRECISION-FOLDED, HIGH STRENGTH, FATIGUE-RESISTANT STRUCTURES AND SHEET THEREFOR

(75) Inventors: Max W. Durney, San Francisco, CA (US); Alan D. Pendley, Petaluma, CA (US); Irving S. Rappaport, Palo Alto, CA (US)

(73) Assignee: Industrial Origami, LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/861,726

(22) Filed: Jun. 4, 2004

(65) Prior Publication Data

US 2005/0126110 A1 Jun. 16, 2005

Related U.S. Application Data

(60) Division of application No. 10/672,766, filed on Sep. 26, 2003, which is a continuation-in-part of application No. 10/256,870, filed on Sep. 26, 2002, now Pat. No. 6,877,349, which is a continuation-in-part of application No. 09/640,267, filed on Aug. 17, 2000, now Pat. No. 6,481,259.

(51) Int. Cl.
*B21D 28/00* (2006.01)

(52) U.S. Cl. .................. 72/324; 72/379.2; 428/136

(58) Field of Classification Search ............ 72/324, 72/335, 379.2, 129, 185; 428/136
See application file for complete search history.

(56) References Cited

U.S. PATENT DOCUMENTS 1,295,769 A 2/1919 Kux (Continued)

FOREIGN PATENT DOCUMENTS

DE 298 18 909 U1 2/1999

(Continued)

OTHER PUBLICATIONS

Publication "Office dA" by Contemporary World Architects, 2000, pp. 15, 20-35, Rockport Publishers, Inc., Gloucester, Massachusetts.

(Continued)

*Primary Examiner*—Daniel C. Crane
(74) *Attorney, Agent, or Firm*—Dorsey & Whitney LLP

(57) ABSTRACT

A process for designing and manufacturing precision-folded, high strength, fatigue-resistant structures and a sheet therefore. The techniques include methods for precision bending of a sheet of material (41, 241, 341, 441, 541) along a bend line (45, 245, 345, 445,543) and a sheet of material formed with bending strap-defining structures, such as slits or grooves (43, 243, 343, 443, 542), are disclosed. Methods include steps of designing and then separately forming longitudinally extending slits or grooves (43, 243, 343, 443, 542) through the sheet of material in axially spaced relation to produce precise bending of the sheet (41, 241, 341, 441, 541) when bent along the bend line (45, 245, 345, 445, 543). The bending straps have a configuration and orientation which increases their strength and fatigue resistance, and most preferably slits or arcs are used which causes edges (257, 457) to be engaged and supported on faces (255, 455) of the sheet material on opposite sides of the slits or arcs. The edge-to-face contact produces bending along a virtual fulcrum position in superimposed relation to the bend line (45, 245, 345, 445, 543). Several slit embodiments (43, 243, 343, 443, 542) suitable for producing edge-to-face engagement support and precise bending are disclosed, as is the use of the slit sheets to produce various three-dimensional structures and to enhance various design and fabrication techniques.

35 Claims, 30 Drawing Sheets

U.S. PATENT DOCUMENTS

| | | | |
|---|---|---|---|
| 1,405,042 | A | 1/1922 | Kraft |
| 1,698,891 | A | 1/1929 | Overbury |
| 2,127,618 | A | 8/1938 | Riemenschneider |
| 3,258,380 | A | 6/1966 | Fischer et al. |
| 3,341,395 | A | 9/1967 | Weber |
| 3,353,639 | A | 11/1967 | Andriussi |
| 3,756,499 | A | 9/1973 | Giebel et al. |
| 3,788,934 | A | 1/1974 | Coppa |
| 3,854,859 | A | 12/1974 | Sola |
| 3,938,657 | A | 2/1976 | David |
| 3,963,170 | A | 6/1976 | Wood |
| 4,215,194 | A | 7/1980 | Sheperd |
| 4,289,290 | A | 9/1981 | Miller |
| 4,559,259 | A | 12/1985 | Cetrelli |
| 4,628,661 | A | 12/1986 | St. Louis |
| 4,837,066 | A | 6/1989 | Quinn et al. |
| 5,148,900 | A | 9/1992 | Mohan |
| 5,157,852 | A | 10/1992 | Patrou et al. |
| 5,225,799 | A | 7/1993 | West et al. |
| 5,239,741 | A | 8/1993 | Shamos |
| 5,390,782 | A | 2/1995 | Sinn |
| 5,524,396 | A | 6/1996 | Lalvani |
| 5,568,680 | A | 10/1996 | Parker |
| 5,692,672 | A | 12/1997 | Hunt |
| 5,701,780 | A | 12/1997 | Ver Meer |
| 5,709,913 | A | 1/1998 | Anderson et al. |
| 5,789,050 | A | 8/1998 | Kang |
| 5,885,676 | A | 3/1999 | Lobo et al. |
| 6,132,349 | A | 10/2000 | Yokoyama |
| 6,210,037 | B1 | 4/2001 | Brandon, Jr. |
| 6,412,325 | B1 | 7/2002 | Croswell |
| 6,481,259 | B1 | 11/2002 | Durney |
| 6,599,601 | B1 | 7/2003 | Fogle et al. |
| 6,640,605 | B1 | 11/2003 | Gitlin et al. |
| 6,643,561 | B1 | 11/2003 | Torvinen |
| 6,658,316 | B1 | 12/2003 | Mehta et al. |
| 2001/0010167 | A1 | 8/2001 | Leek |
| 2002/0184936 | A1 | 12/2002 | Gitlin et al. |
| 2003/0037586 | A1 | 2/2003 | Durney et al. |

FOREIGN PATENT DOCUMENTS

| | | |
|---|---|---|
| GB | 2 129 339 A | 5/1984 |
| JP | 52-068848 | 6/1977 |
| JP | 53-070069 | 6/1978 |
| JP | 55-022468 | 2/1980 |
| JP | 55-055222 | 4/1980 |
| JP | 59-006116 | 1/1984 |
| JP | 02-065416 | 5/1990 |
| JP | 02-165817 | 6/1990 |
| JP | 02-192821 | 7/1990 |
| JP | 02-258116 | 10/1990 |
| JP | 04-033723 | 2/1992 |
| JP | 04-091822 | 3/1992 |
| JP | 05-261442 | 10/1993 |
| JP | 07-148528 | 6/1995 |
| JP | 08-224619 | 9/1996 |
| JP | 10-085837 | 4/1998 |
| JP | 11-123458 | 5/1999 |
| JP | 11-188426 | 7/1999 |
| WO | WO 97/24221 | 7/1997 |

OTHER PUBLICATIONS

Patent Abstracts of Japan, vol. 004, No. 053 (M-008), Apr. 19, 1980 (JP 55-022-468 A).

Patent Abstracts of Japan, vol. 015, No. 006 (M-1066), Jan. 8, 1991 (JP 02-258116 A).

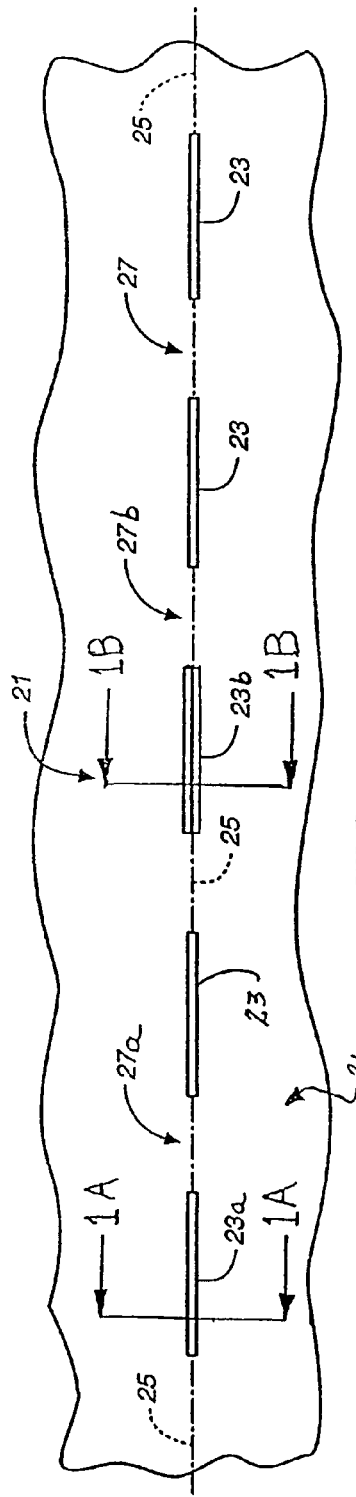
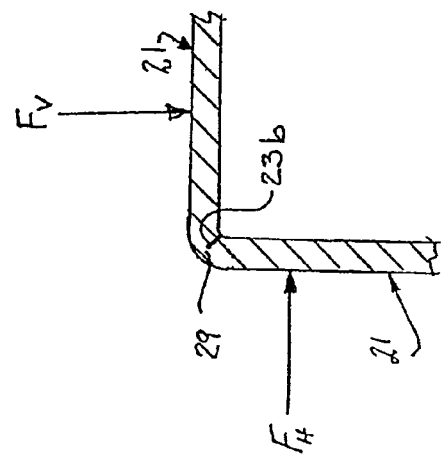
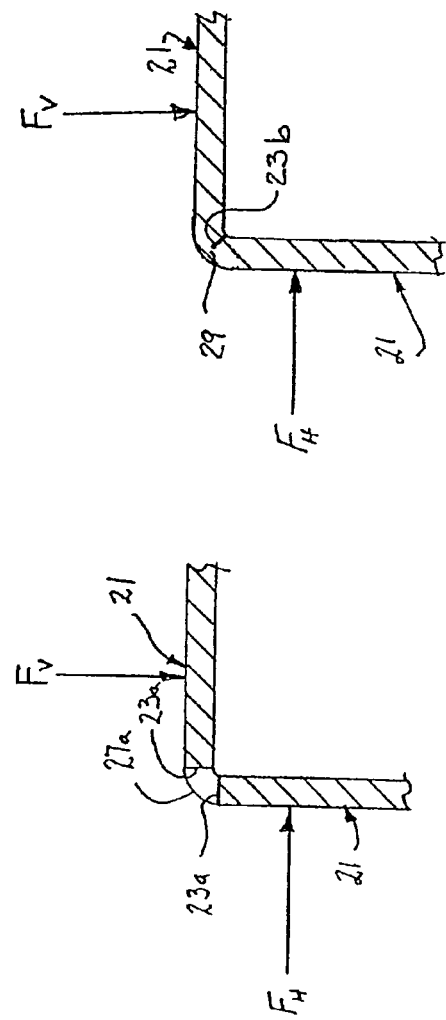
FIG._1 (PRIOR ART)
FIG._1A (PRIOR ART)
FIG._1B (PRIOR ART)

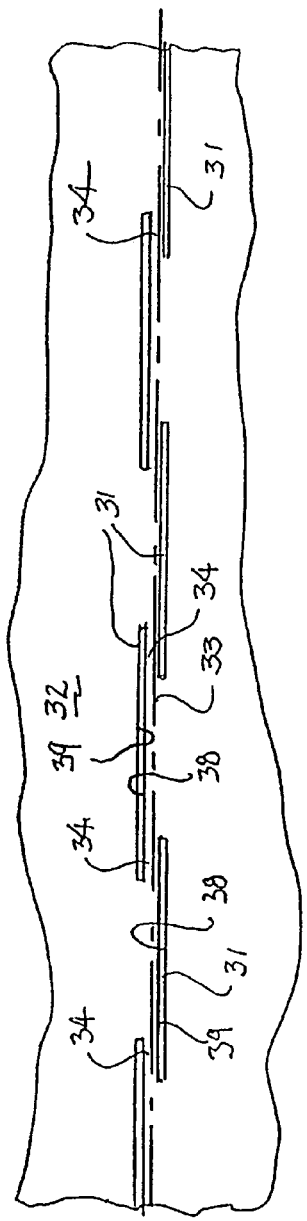
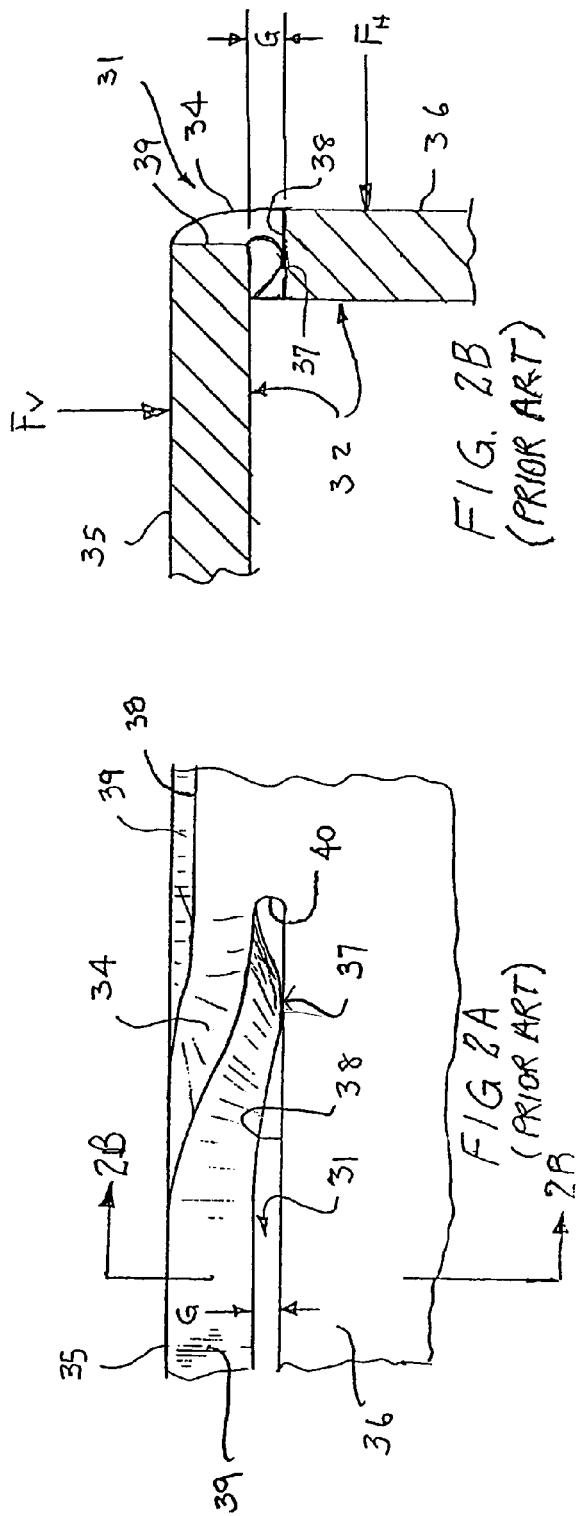
FIG. 2 (PRIOR ART)
FIG. 2A (PRIOR ART)
FIG. 2B (PRIOR ART)

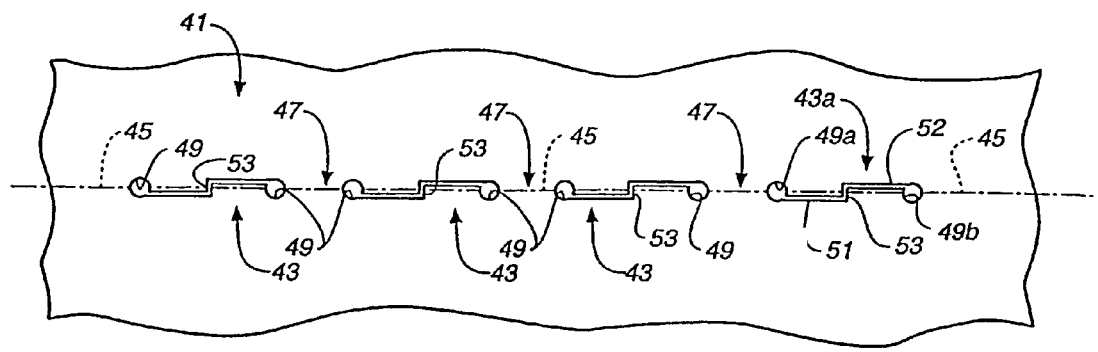
FIG._3
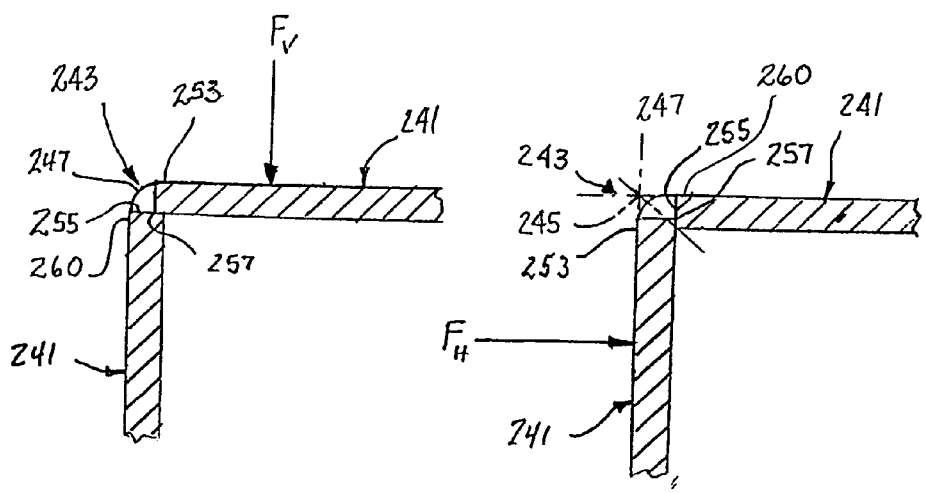
FIG._8A     FIG._8B

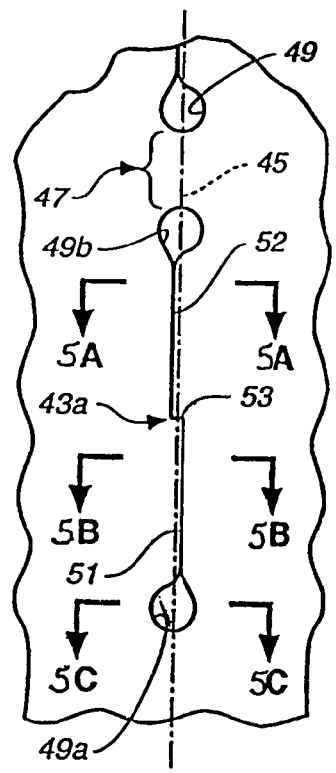
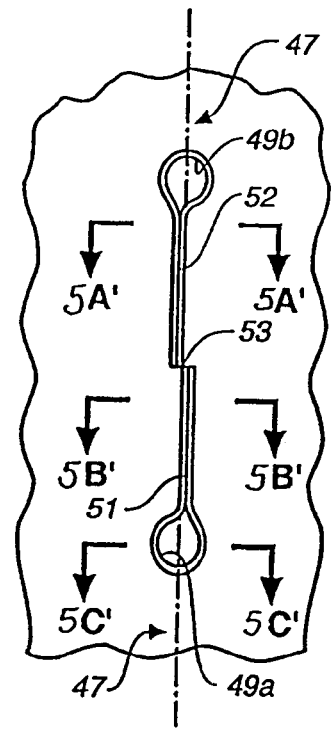
FIG._4A  FIG._4B
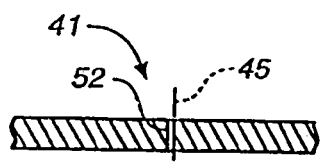
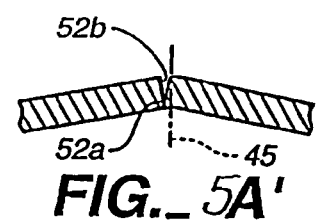
FIG._5A  FIG._5A'
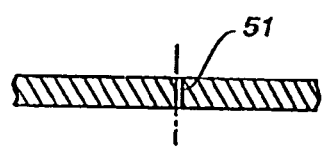
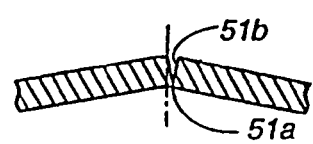
FIG._5B  FIG._5B'
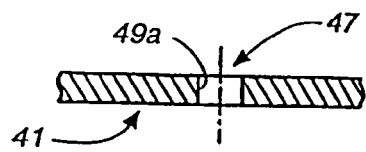
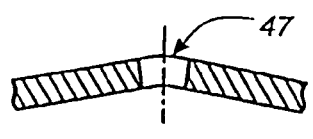
FIG._5C  FIG._5C'

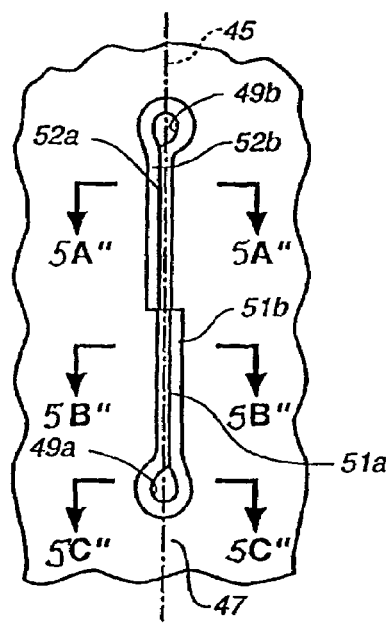
FIG._4C
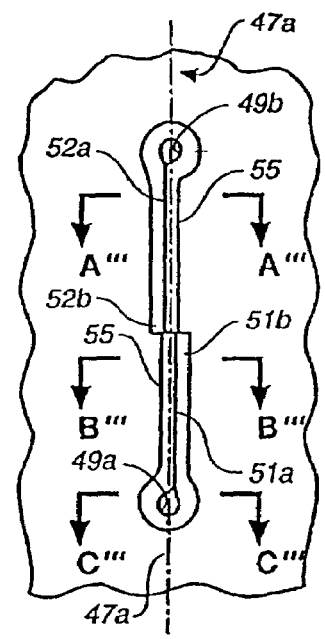
FIG._4D
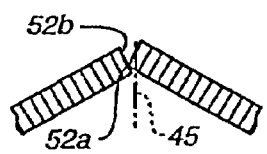
FIG._5A"
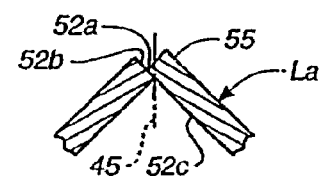
FIG._5A'''
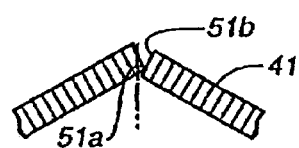
FIG._5B"
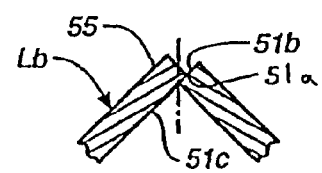
FIG._5B'''
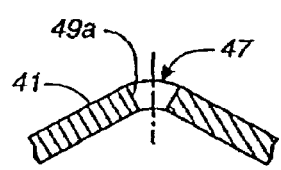
FIG._5C"
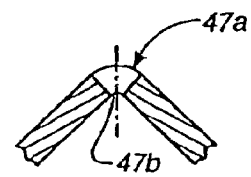
FIG._5C'''

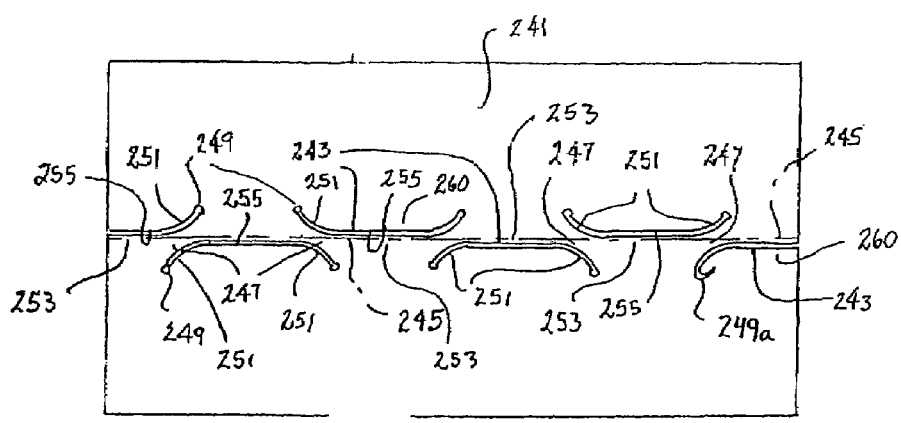
FIG._6
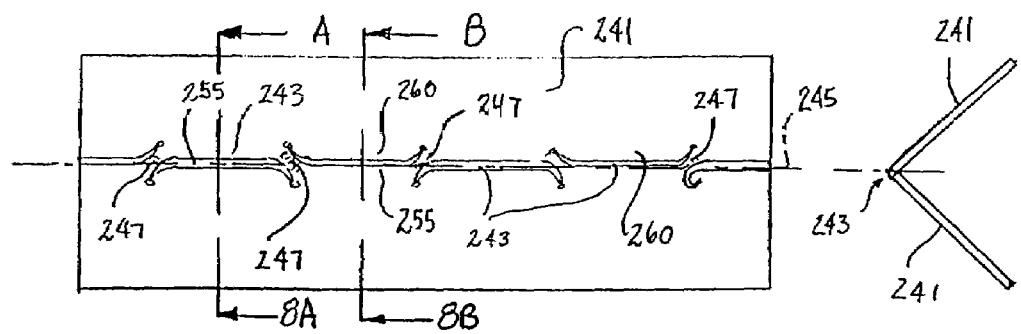
FIG._7
FIG._8

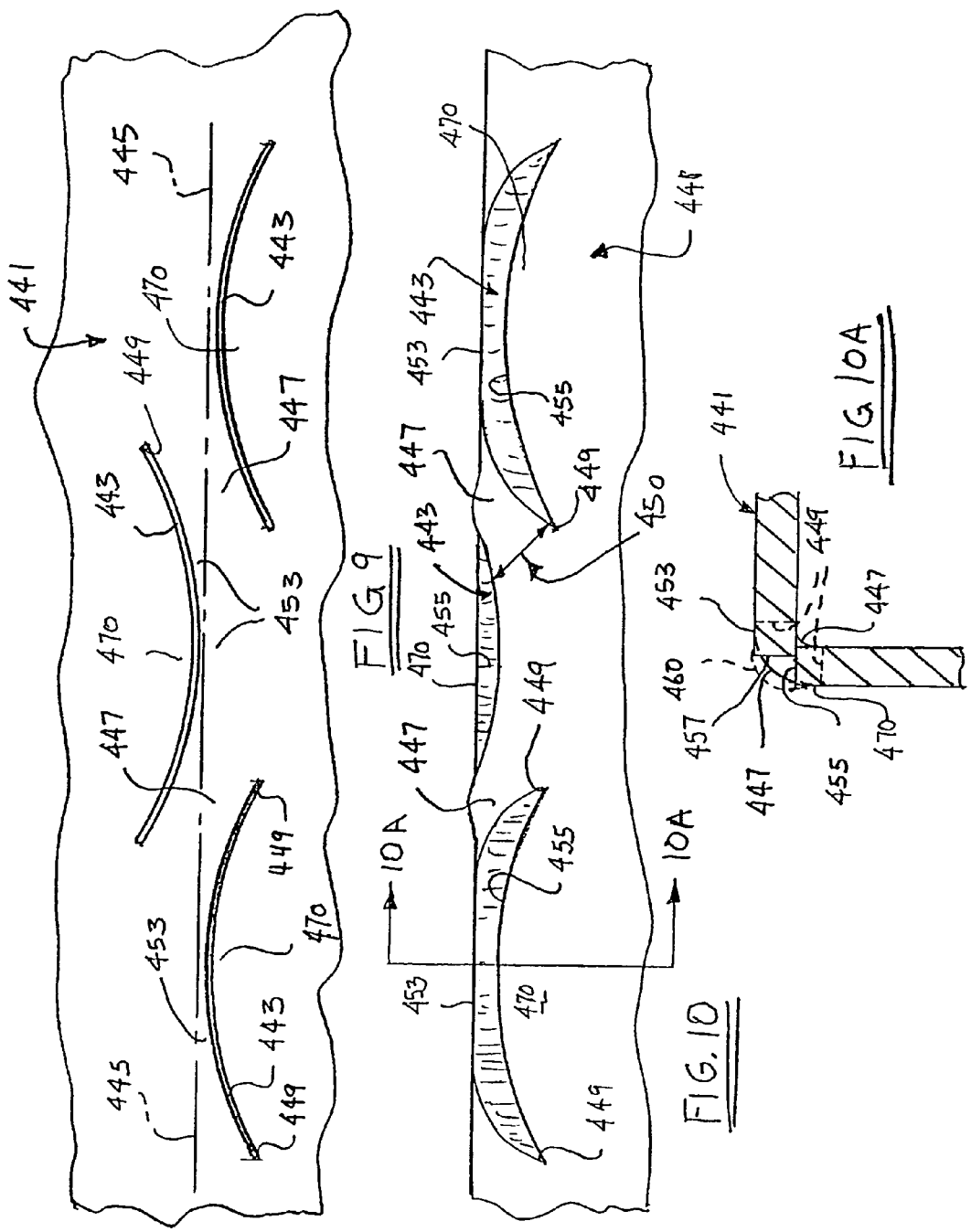

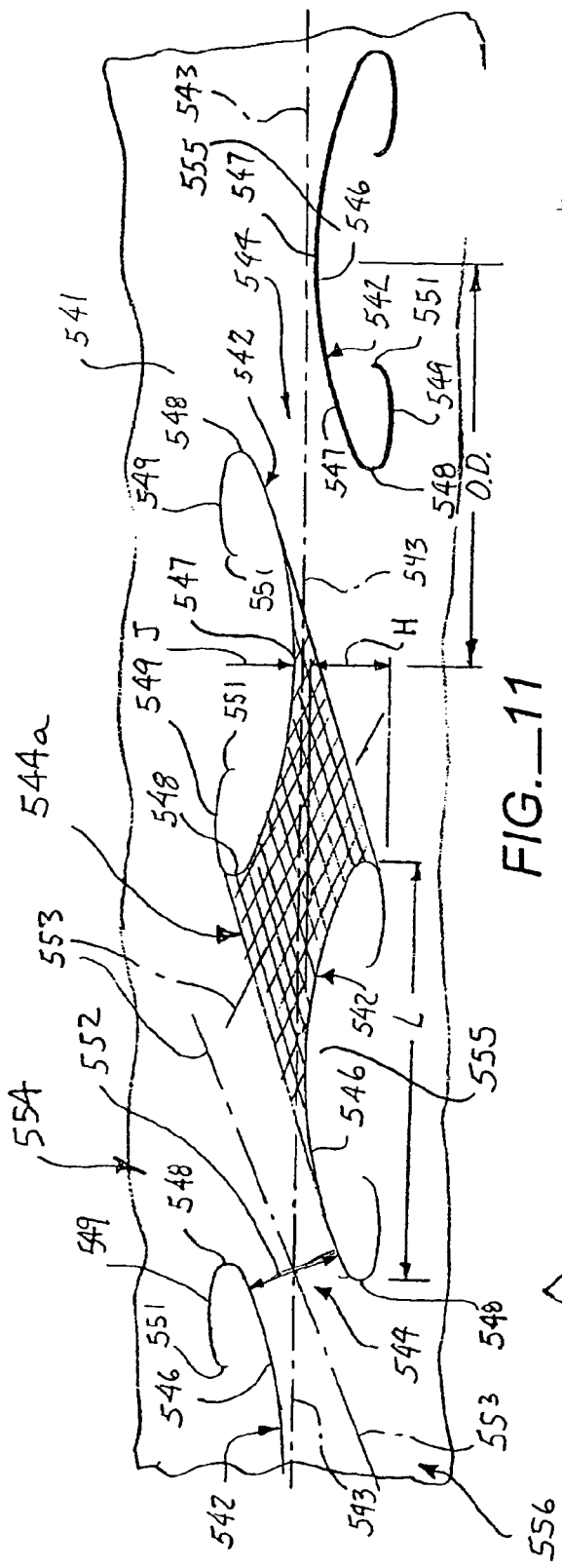
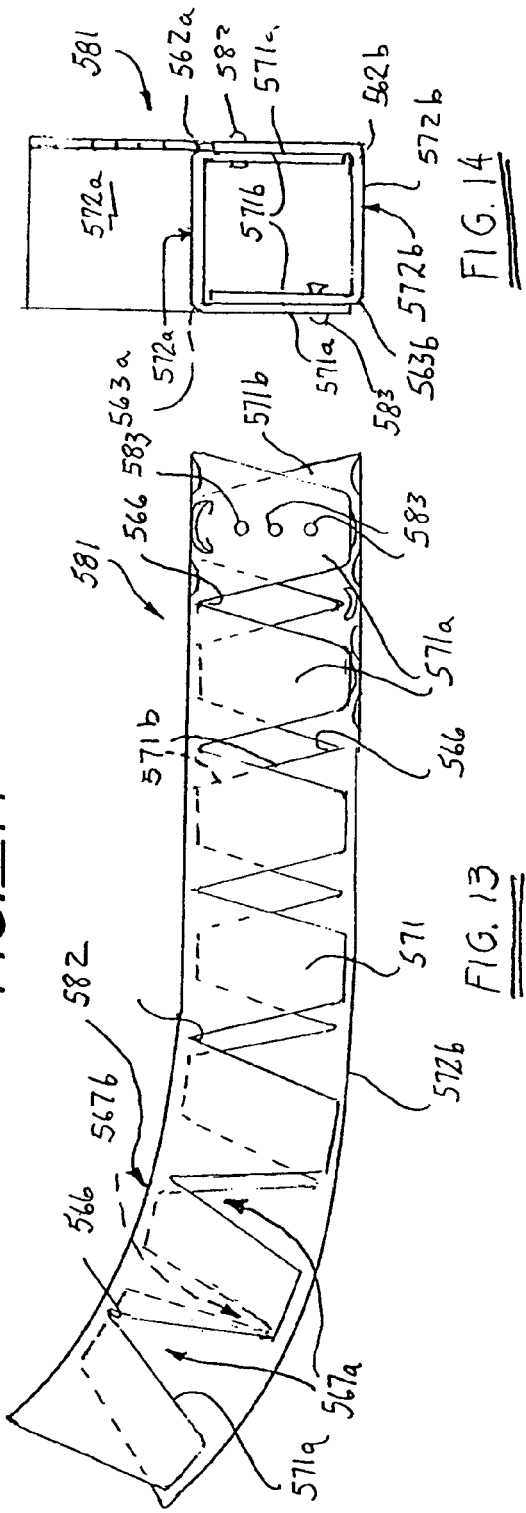
FIG._11
FIG._13
FIG._14

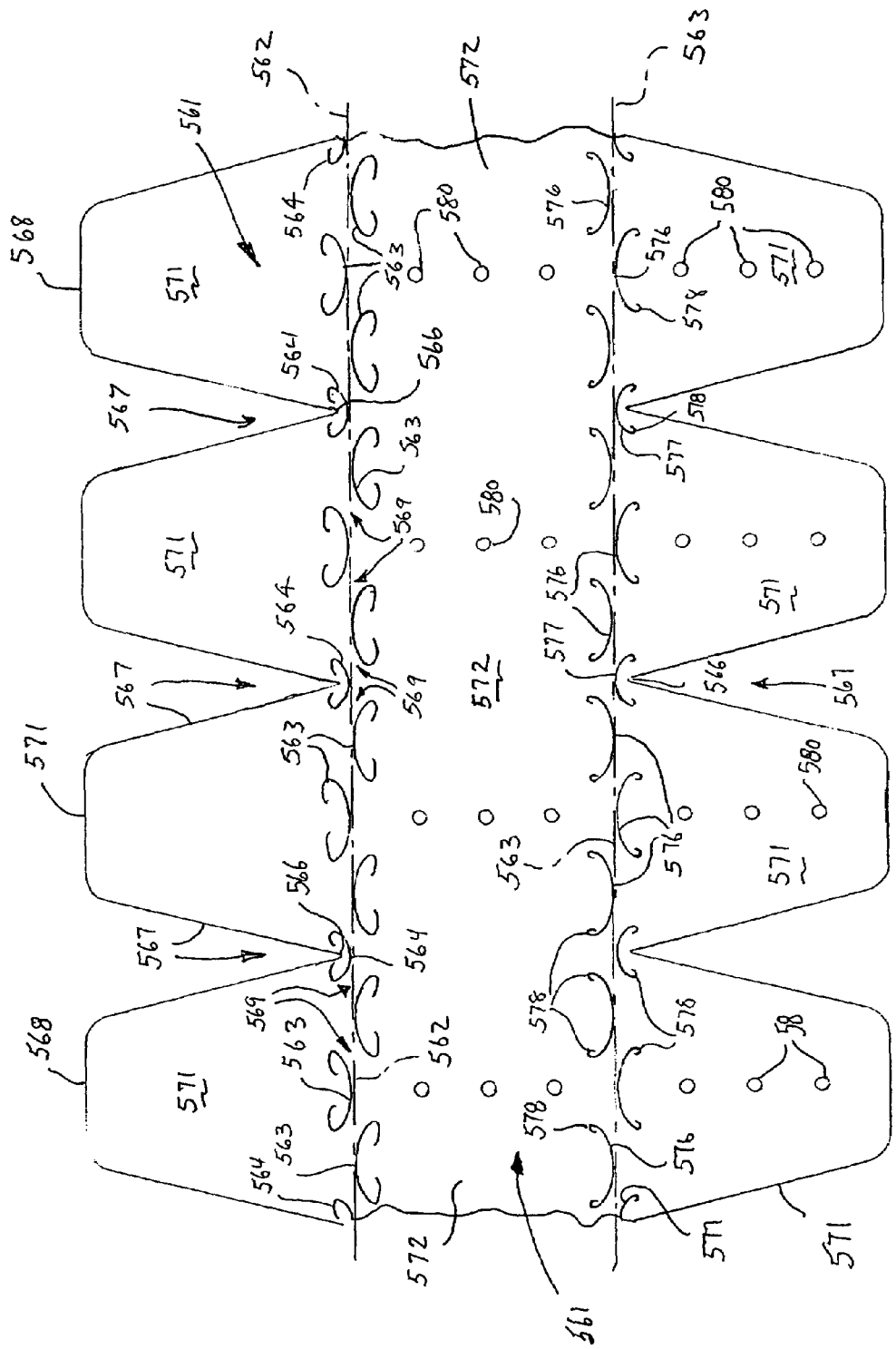
FIG._12

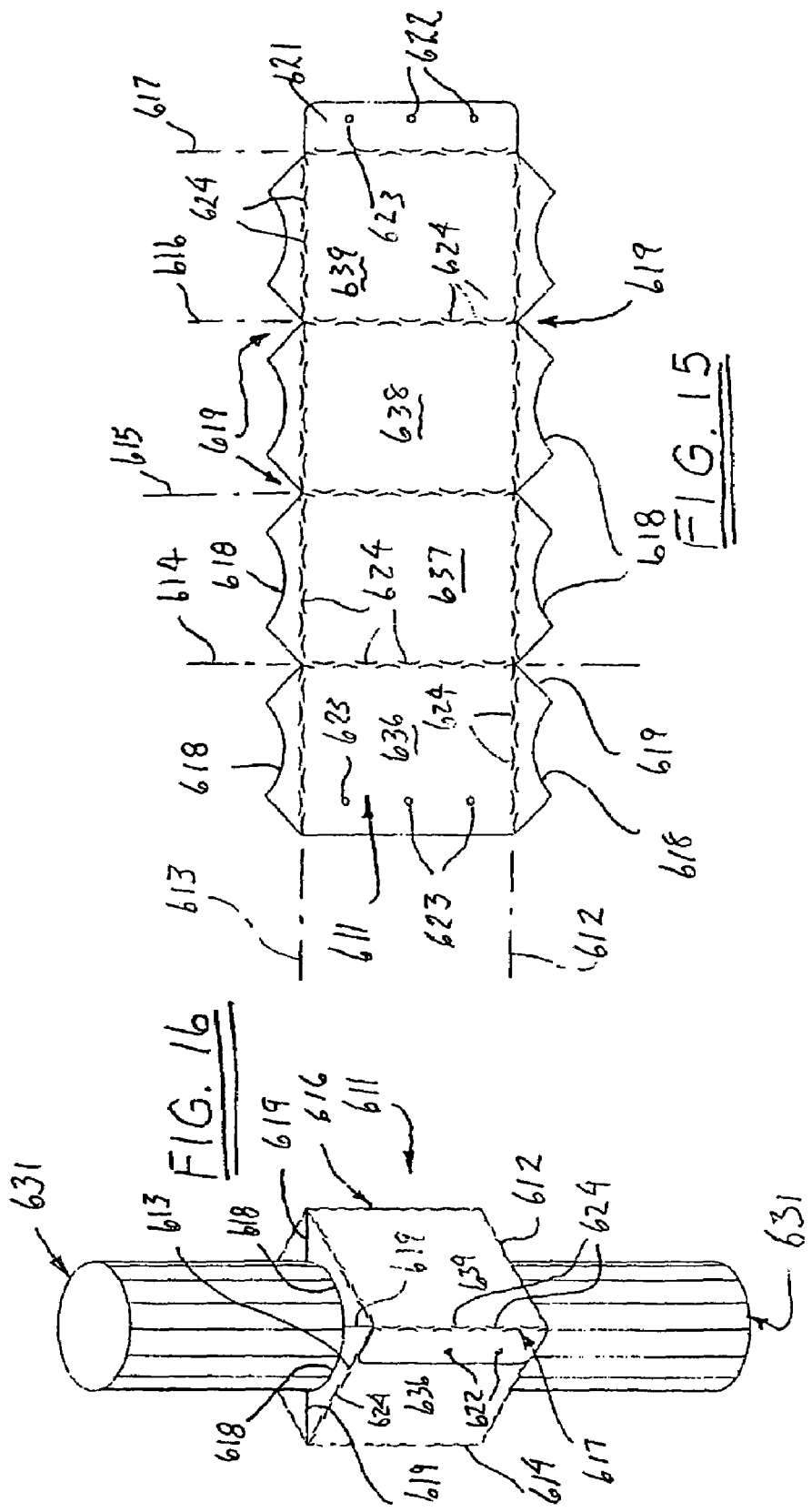

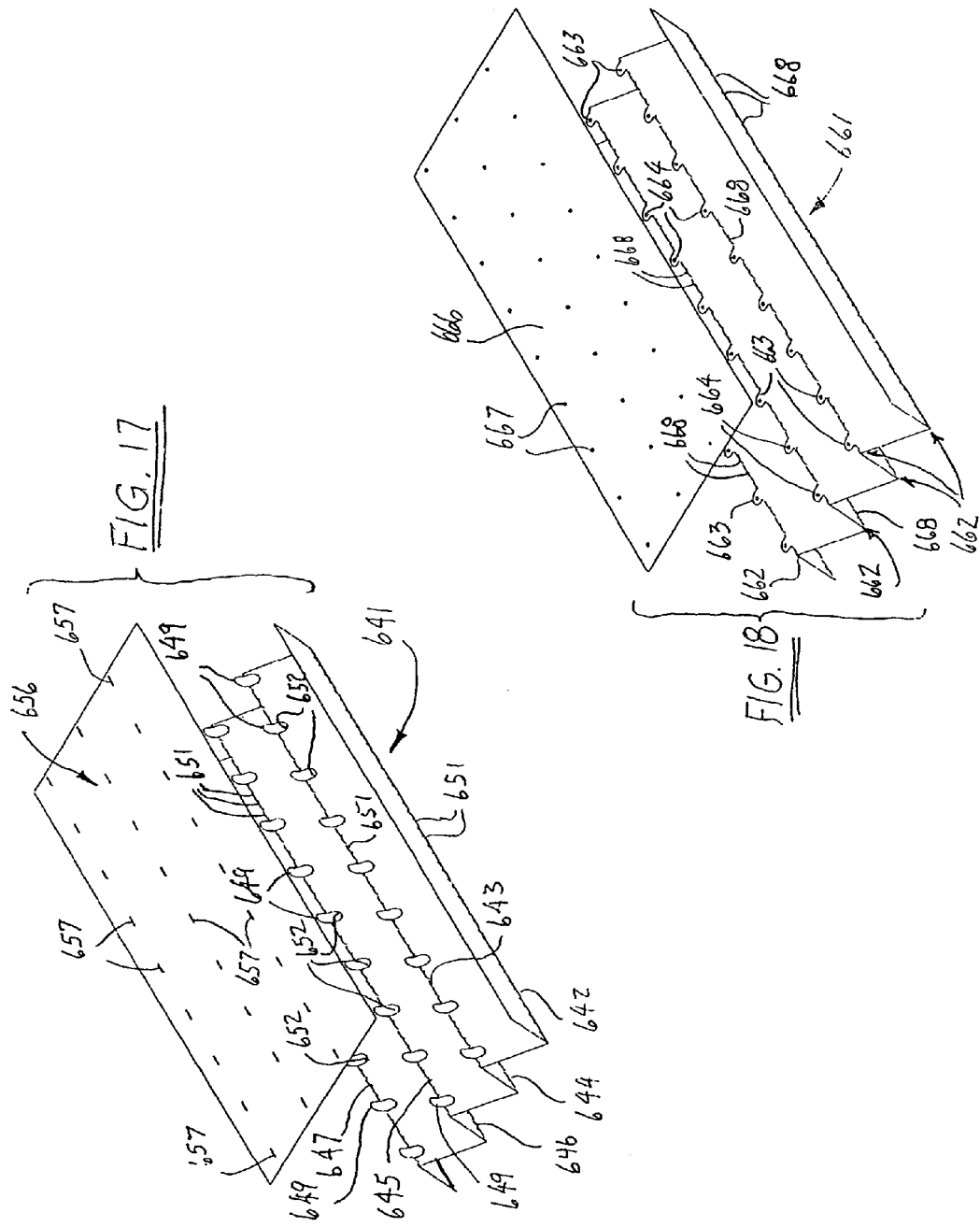

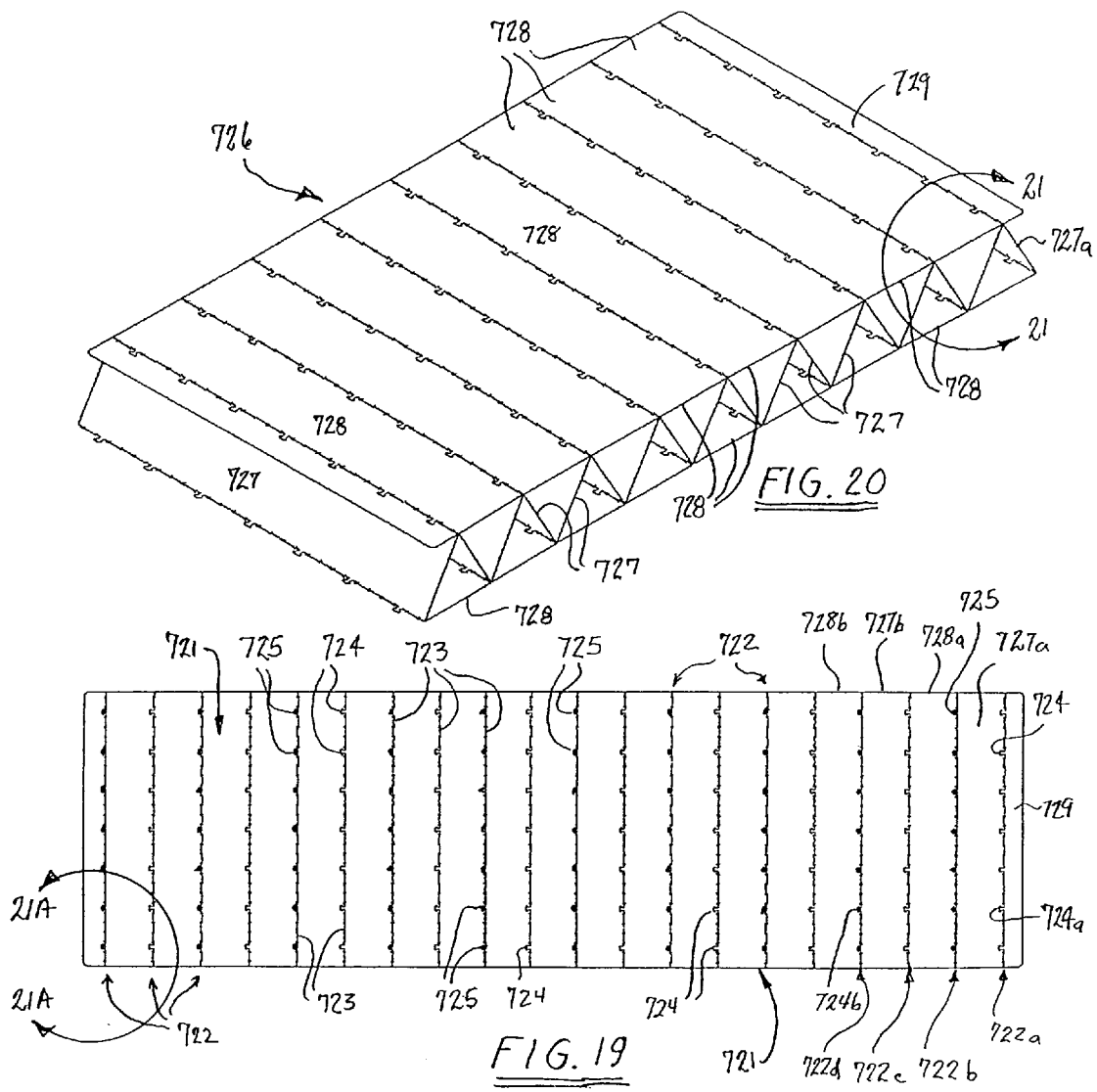

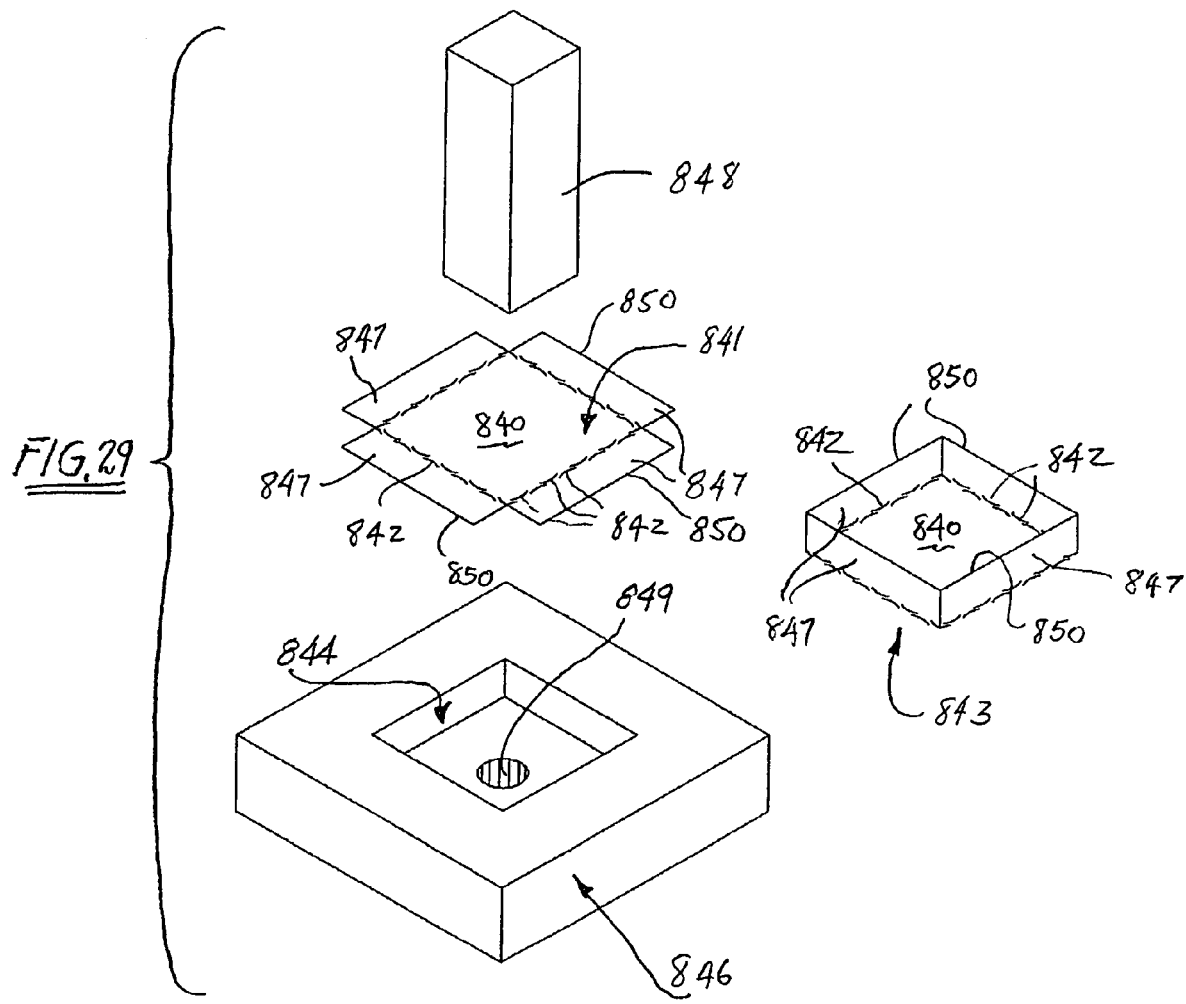

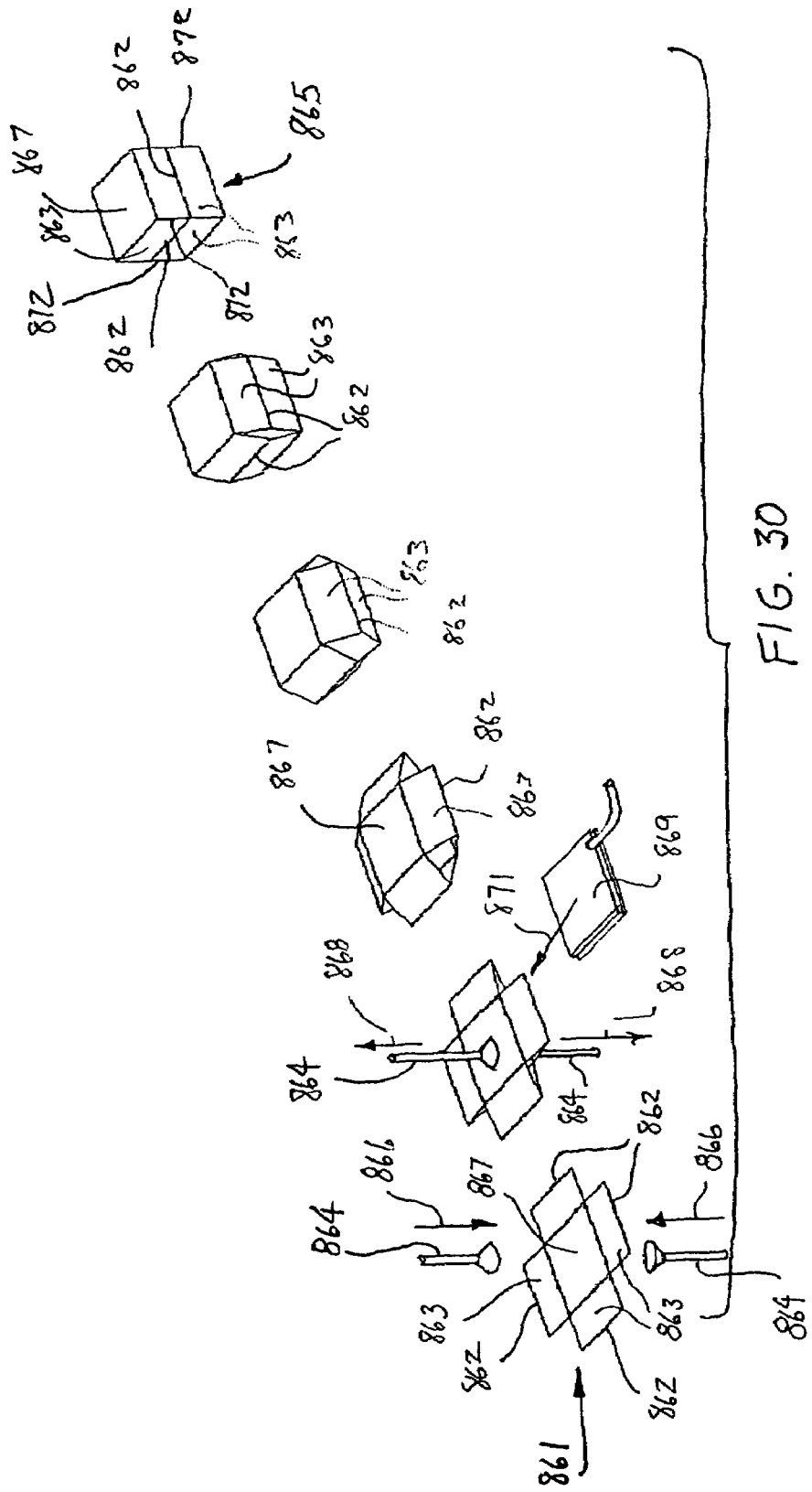

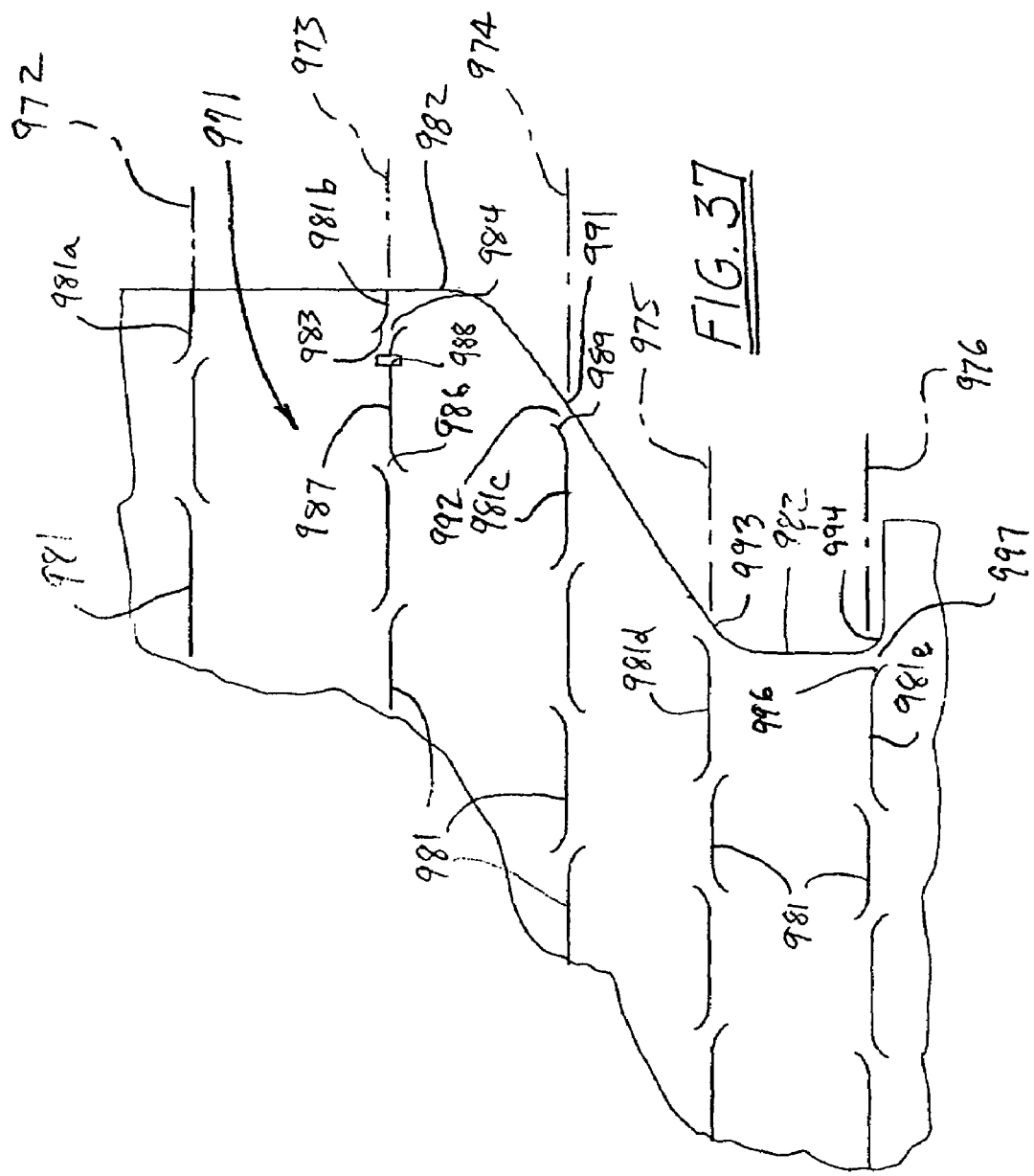

TECHNIQUES FOR DESIGNING AND MANUFACTURING PRECISION-FOLDED, HIGH STRENGTH, FATIGUE-RESISTANT STRUCTURES AND SHEET THEREFOR

RELATED APPLICATIONS

This application is a Division Application based upon a co-pending patent application Ser. No. 10/672,766, filed Sep. 26, 2003, and entitled TECHNIQUES FOR DESIGNING AND MANUFACTURING PRECISION-FOLDED, HIGH STRENGTH, FATIGUE-RESISTANT STRUCTURES AND SHEET THEREFOR, which is a Continuation-in-Part Application based upon a patent application Ser. No. 10/256,870, filed Sep. 26, 2002, now Pat. No. 6,877,349, and entitled METHOD FOR PRECISION BENDING OF SHEET OF MATERIALS, SLIT SHEETS FABRICATION PROCESS, which was a Continuation-in-Part Application based upon a co-pending parent application, Ser. No. 09/640,267, filed Aug. 17, 2000, and entitled METHOD FOR PRECISION BENDING OF A SHEET OF MATERIAL AND SLIT SHEET THEREFOR, now U.S. Pat. No. 6,481,259 B1.

TECHNICAL FIELD

The present invention relates, in general, to the designing and precision folding of sheets of material and the manufacture of structures therefrom. More particularly, the present invention relates to processes of designing, preparing and manufacturing, including, but not limited to, ways of preparing sheet material, in order to enable precision folding and to the use of such processes for rapid two-dimension- to-three-dimensional folding of high strength, fatigue-resistant structures or assemblies.

BACKGROUND ART

A commonly encountered problem in connection with bending sheet material is that the locations of the bends are difficult to control because of bending tolerance variations and the accumulation of tolerance errors. For example, in the formation of the housings for electronic equipment, sheet metal is bent along a first bend line within certain tolerances. The second bend, however, often is positioned based upon the first bend, and accordingly, the tolerance errors can accumulate. Since there can be three or more bends which are involved to create the chassis or enclosure for the electronic components, the effect of cumulative tolerance errors in bending can be significant. Moreover, the tolerances that are achievable will vary widely depending on the bending equipment, and its tooling, as well as the skill of the operator.

One approach to this problem has been to try to control the location of bends in sheet material through the use of slitting or grooving. Slits and grooves can be formed in sheet stock very precisely, for example, by the use of computer numerically controlled (CNC) devices which control a slit or groove forming apparatus, such as a laser, water jet, punch press, knife or other tool.

Referring to FIG. 1, a sheet of material 21 is shown which has a plurality of slits or grooves 23 aligned in end-to-end, spaced apart relation along a proposed bend line 25. Between pairs of longitudinally adjacent slits or grooves are bending webs, splines or straps 27 which will be plastically deformed upon bending of sheet 21. Webs 27 hold the sheet together as a single member. When grooves that do not penetrate through sheet 21 are employed, the sheet of material is also held together by the web of material behind each groove.

The location of grooves or slits 23 in sheet 21 can be precisely controlled so as to position the grooves or slits on bend line 25 within relatively close tolerances. Accordingly, when sheet 21 is bent after the grooving or slitting process, the bend occurs at a position that is very close to bend line 25. Since slits can be laid out on a flat sheet of material precisely, the cumulative error is much less in such a bending process, as compared to one in which bends are formed by a press brake, with each subsequent bend being positioned by reference to the preceding bend.

Nevertheless, even a grooving-based or slitting-based bending of sheet material has its problems. First, the stresses in bending webs or straps 27, as a result of plastic deformation of the webs and slitting at both ends of webs 27, are substantial and concentrated. For grooving, the stresses on the material behind or on the back side of the groove also are substantial and very concentrated. Thus, failures at webs 27 and/or behind grooves 23 can occur. Moreover, the grooves or slits do not necessarily produce bending of webs 27 directly along bend line 25, and the grooving process is slow and inconsistent, particularly when milling or point cutting V-shaped grooves. Grooving, therefore, is not in widespread commercial use.

As can be seen in FIGS. 1A and 1B, if sheet 21 is slit, as is shown at 23a and/or grooved, as shown at 23b, and then bent, bending webs 27a and 27b will experience plastic deformation and residual stress. For slit 23a, of course, material will be completely removed or severed along the length of the slit. For V-shaped groove 23b, there will be a thin web 29 between groove 23b and the convex outside of the bend, but it also will be plastically deformed and highly stressed. The bend for V-shaped grooving will normally be in a direction closing groove 23b so that the side faces come together, as shown in FIG. 1B. Loading of the bent structure of FIGS. 1A and 1B with a vertical force $F_V$ and/or a horizontal force $F_H$ will place the bend, with the weakening slits and/or grooves and the plastically deformed straps or webs 27a, 27b, as well as thin web 29, under considerable stress. Failure of the structure will occur at lower force levels than if a non-slitting or non-grooving bending process was used.

Another scheme for sheet slitting to facilitate bending has been employed in the prior art. The slitting technique employed to produce bends, however, was designed primarily to produce visual or decorative effects for a sculptural application. The visual result has been described as "stitching," and the bends themselves have been structurally reinforced by beams. This stitched sculpture was exhibited at the New York Museum of Modern Art by at least 1998, and the sheet slitting technique is described in Published United States Patent Application U.S. 2002/0184936 A1, published on Dec. 12, 2002, (the "Gitlin, et al Application."). The sculpture is also shown and described in the publication entitled "Office dA" by Contemporary World Architects, pp. 15, 20–35, 2000. FIGS. 2, 2A and 2B of the present drawing show one example of the stitching technique employed.

One embodiment of the Office dA or Gitlin, et al. Application is shown in FIG. 2. A plurality of slits 31 is formed in a sheet material 32. Slits 31 are linear and offset laterally of each other along opposite sides of a bend line 33. The slits can be seen to longitudinally overlap so as to define what will become bending splines, webs, straps or "stitches" 34 between the overlapped slit ends. FIGS. 2A and 2B show an enlarged side elevation view of one end of one slit in sheet 32, which has been bent along bend line 33 by 90 degrees, and sheet portions 35 and 36 on opposite sides of the bend line are interconnected by the twisted straps or "stitches" 34, which twist or stitch between the 90 degree sheet portions 35, 36. The architects of the New York Museum of Modern Art sculpture recognized that the resulting bend is not structurally very strong, and they have incorporated partially hidden beams welded into the sculpture in the inner vertices of each of the stitched bends.

Since slits 31 are parallel to bend line 33, straps 34, which also have a constant or uniform width dimension, are twisted or plastically deformed in torsion over their length, with the result that at the end of a 90° bend a back side of the strap engages face 38 on the other side of slit 31 at position 37. Such engagement lifts sheet portion 35 up away from face 38 on sheet portion 36, as well as trying to open end 40 of the slit and producing further stress at the slit end. The result of the twisting of straps 34 and the lifting at the end of the bend is a gap, G, over the length of slit 31 between sheet portion 35 and face 38. Twisted straps or stitches 34 force sheet portion 35 off of face 38 and stress both slit ends 40 (only one slit end 40 is shown but the same stress would occur at the other slit end 40 of the slip 31 shown in FIGS. 2A and 2B).

Gaps G are produced at each slit 31 along the length of bend line 33 on alternative sides of the bend line. Thus, at each slit a sheet portion is forced away from contact with a slit-defining face instead of being pulled into contact with, and thus full support by, the face.

Moreover, and very importantly, the slitting configuration of FIG. 2 stresses each of straps 34 to a very high degree. As the strap length is increased (the length of overlap between the ends of slits 31) to attempt to reduce the stress from twisting along the strap length, the force trying to resiliently pull or clamp a sheet portion against an opposing face reduces. Conversely, as strap length 34 is decreased, twisting forms micro tears in the constant width straps with resultant stress risers, and the general condition of the twisted straps is that they are overstressed. This tends to compromise the strength of the bend and leaves a non-load bearing bend.

A vertical force (Fv in FIG. 2B) applied to sheet portion 35 will immediately load twisted and stressed strap 34, and because there is a gap G the strap will plastically deform further under loading and can fail or tear before the sheet portion 35 is displaced down to engagement with and support on face 38. A horizontal force $F_H$ similarly will tend to crush the longitudinally adjacent strap 34 (and shear strap 34 in FIG. 2B) before gap G is closed and the sheet portion 35 is supported on the opposing slit face 38.

Another problem inherent in the slitting scheme of FIGS. 2–2B and the Gitlin, et al. Application is that the constant strap width cannot be varied independently of the distance between slits, and the strap width cannot be less than the material thickness without stressing the straps to the extreme. When slits 31 are parallel to each other and longitudinally overlapping, the strap width, by definition, must equal the spacing or jog between slits. This limits the flexibility in designing the bends for structural loading of the straps. Still further, the slits terminate with every other slit end being aligned and directed toward the other. There is no attempt, therefore, to reduce stress risers and micro-crack propagation from occurring at the ends of the slits, and aligned slit ends can crack under loading.

The sheet slitting configuration of FIGS. 2–2B, therefore, can be readily employed for decorative bends, but it is not optimally suited for bends which must provide significant structural support and fatigue resistance.

The Gitlin et al. Application also teaches the formation of curved slits (in FIGS. 10a, 10b), but the slits again parallel a curved bend line so that the width of the bending straps is constant, the straps extend along and parallel to the bend line, not across it, the straps are twisted in the extreme, the slit ends tend to direct micro-cracks and stress concentrations to the next slit, and the application teaches employing a slit kerf which results in engagement of the opposite side of the slit, at 37, only at the end of the bend.

A simple linear perforation technique also was used by the same architects in an installation of bent metal ceiling panels in a pizza restaurant in Boston. Again, the bent sheet components by linear perforation were not designed to bear significant unsupported loads along the bends.

Slits, grooves, perforations, dimples and score lines also have been used in various patented systems as a basis for bending sheet material. U.S. Pat. No. 5,225,799 to West et al., for example, uses a grooving-based technique to fold up a sheet of material to form a microwave wave guide or filter. In U.S. Pat. No. 4,628,161 to St. Louis, score lines and dimples are used to fold metal sheets. In U.S. Pat. No. 6,210,037 to Brandon, slots and perforations are used to bend plastics. The bending of corrugated cardboard using slits or die cuts is shown in U.S. Pat. No. 6,132,349 and PCT Publication WO 97/24221 to Yokoyama, and U.S. Pat. No. 3,756,499 to Grebel et al. and U.S. Pat. No. 3,258,380 to Fischer, et al. Bending of paperboard sheets also has been facilitated by slitting, as is shown in U.S. Pat. No. 5,692,672 to Hunt, U.S. Pat. No. 3,963,170 to Wood and U.S. Pat. No. 975,121 to Carter. Published U.S. Patent Application No. U.S. 2001/0010167 A1 also discloses a metal bending technique involving openings, notches and the like and the use of great force to produce controlled plastic flow and reduced cracking and wrinkling.

In most of these prior art bending systems, however, the bend forming technique greatly weakens the resulting structure, or precision bends are not capable of being formed, or bending occurs by crushing the material on one side of the bend. Moreover, when slitting is used in these prior art systems, in addition to structural weakening and the promotion of future points of structural failure, the slitting can make the process of sealing a bent structure expensive and difficult. These prior art methods, therefore, are less suitable for fabricating structures that are capable of containing a fluid or flowable material.

The problems of precision bending and retention of strength are much more substantial when bending metal sheets, and particularly sheets of substantial thickness. In many applications it is highly desirable to be able to bend metal sheets with low force, for example, by hand with only hand tools, or with only moderately powered tools. Such bending of thick metal sheets, of course, poses greater problems.

In another aspect of the present invention the ability to overcome prior art deficiencies in slitting-based bending of sheet material is applied to eliminate deficiencies in prior art metal fabrication techniques and the structures resulting therefrom.

A well known prior art technique for producing rigid three dimensional structures is the process of cutting and joining together parts from sheet and non-sheet material. Jigging and welding, clamping and adhesive bonding, or machining and using fasteners to join together several discrete parts has previously been extensively used to fabricate rigid three-dimensional structures. In the case of welding, for example, a problem arises in the accurate cutting and jigging of the individual pieces; the labor and machinery required to manipulate a large number of parts, as well as the quality control and certification of multiple parts. Additionally, welding has the inherent problem of dimensional shape warping caused by the heat-affected zone of the weld.

Traditional welding of metals with significant material thickness is usually achieved by using parts having beveled edges often made by grinding or single point tools, which add significantly to the fabrication time and cost. Moreover, the fatigue failure of heat-affected metals is unpredictable for joints whose load-bearing geometries rely entirely on welded, brazed or soldered materials. Fatigue failure of welds usually is compensated for by increasing the mass of the components, which are welded together and the number and depth of the welds. The attendant disadvantage of such over design is, of course, excessive weight.

With respect to adhesively bonding sheet and non-sheet material along the edges and faces of discrete components, a problem arises from the handling and accurate positioning the several parts and holding or clamping them in place until the bonding method is complete.

Another class of prior art techniques related to the fabrication of three-dimensional structures are the Rapid Prototyping methods. These include stereo lithography and a host of other processes in which a design is produced using a CAD system and the data representation of the structure is used to drive equipment in the addition or subtraction of material until the structure is complete. Prior art Rapid Prototyping techniques are usually either additive or subtractive.

The problems associated with subtractive Rapid Prototyping methods are that they are wasteful of materials in that a block of material capable of containing the entire part is used and then a relatively expensive high-speed machining center is required to accurately mill and cut the part by removal of the unwanted material.

Problems also exist with prior art additive Rapid Prototyping techniques. Specifically, most such techniques are optimized for a very narrow range of materials. Additionally, most require a specialized fabrication device that dispenses material in correspondence with the data representing the part. The additive Rapid Prototyping processes are slow, very limited in the scale of the part envelope and usually do not make use of structurally robust materials.

Generally in the prior art, therefore, sheet slitting or grooving to enable sheet bending has produced bends, which lack the precision and strength necessary for commercial structural applications. Thus, such prior art sheet bending techniques have been largely relegated to light gauge metal bending or decorative applications, such as sculpture.

In a broad aspect of the present invention, therefore, it is an important object of the present invention to be able to bend sheet material in a very precise manner and yet produce a bend, which is capable of supporting substantial loading and is resistant to fatigue failures.

Another object of this aspect of the present invention is to provide a method for precision bending of sheets of material using improved slitting techniques, which enhance the precision of the location of the bends, the strength of the resulting structures and reduce stress-induced failures.

Another object of the present invention is to provide a precision sheet bending process and a sheet of material which has been slit or grooved for bending and which can be used to accommodate bending of sheets of various thicknesses and of various types of non-crushable materials.

Another object of the present invention is to provide a method for slitting sheets for subsequent bending that can be accomplished using only hand tools or power tools which facilitate bending but do not attempt to control the location of the bend.

Another object of the present invention is to be able to bend sheet material into high strength, three-dimensional structures having precise dimension tolerances.

It is another object of the present invention to be able to bend sheet materials into precise three-dimensional structures that are easily and inexpensively sealed thus enabling the containment of fluid or flowable materials.

In a broad aspect of the present invention relating to the use of slit-based bending to enhance fabrication and assembly techniques, it is an object of the present invention to provide a new Rapid Prototyping and Advanced Rapid Manufacturing technique that employs a wide range of materials including many that are structurally robust, does not employ specialized equipment other than what would be found in any modern fabrication facility, and can be scaled up or down to the limits of the cutting process used.

It is another object of this aspect of the present invention to provide features within the sheet of material to be bent that assist in the accurate additive alignment of components prior to and after the sheet material is bent.

A further object of the present invention is to provide a fabrication method that serves as a near-net-shape structural scaffold for multiple components arranged in 3D space in the correct relationship to each other as defined by the original CAD design process.

It is a further object of the present invention to provide a method of fabricating welded structures that employs a smaller number of separate parts and whose edges are self jigging along the length of the bends and whose non-bent edges provide features that facilitate jigging and clamping in preparation for welding. In this context it is yet another object of the present invention to provide a superior method of jigging sheet materials for welding that dramatically reduces warping and dimensional inaccuracy caused by the welding process.

Yet another object of the present invention is to provide a novel welded joint that provides substantial load-bearing properties that do not rely on the heat affected zone in all degrees of freedom and thereby improve both the loading strength and cyclical, fatigue strength of the resulting three dimensional structure.

Still another object of the present invention is to provide a superior method for:
1) reducing the number of discrete parts required to fabricate a strong, rigid, dimensionally accurate three dimensional structure, and
2) inherently providing a positioning and clamping method for the various sides of the desired three dimensional structure that can be accomplished through the bent and unbent edges of the present invention resulting in a lower cost, higher yield fabrication method.

It is a further object of the present invention to provide a method of fabricating a wide variety of fluid containing casting molds for metals, polymers, ceramics and composites in which the mold is formed from a slit, bent, sheet of material which can be either removed after the solidification process or left in place as a structural or surface component of the finished object.

Still another object of the present invention is to provide a sheet bending method that is adaptable for use with existing slitting devices, enables sheet stock to be shipped in a flat or coiled condition and precision bent at a remote location without the use of a press brake, and enhances the assembly or mounting of components within and on the surfaces in the interior of enclosures formed by bending of the sheet stock after component affixation to the sheet stock.

Still another object of the present invention is to provide a precision folding technique that can be used to create accurate, precise, load-bearing folds in sheets of material, including but not limited to, metals, plastics, and composites.

Another object of the present invention is to provide a precision folding technique that allows folding around a virtual bend line and requires considerably less force to accomplish the fold than conventional bending techniques.

Another object of the present invention is to provide a precision folding technique that is essentially linearly scalable independently of the thickness or microstructural characteristics of the material.

Another object of the present invention is to form the geometries described herein whether by a slitting/removal process, a severing process or by an additive process, and arrive at the advantages herein described by any route.

Yet another object of the present invention is to provide a precision folding technique for folding a non-crushable material in which the microstructure of the material remains substantially unchanged around the fold.

The methods and discrete techniques for designing and precision folding of sheet material, the fabrication techniques therefor, and the structures formed from such precision bending of the present invention have other features and objects of advantage which will become apparent from, or are set forth in more detail in, the accompanying drawing and the following description of the Best Mode of Carrying Out the Invention.

DISCLOSURE OF INVENTION

In a broad aspect the present invention, bending strap-defining structures, which are preferably slits but may be grooves, are used to configure bending straps in the sheet of material that cause the bent sheet to have improved precision in the bend location and substantially improved bend strength.

Briefly, in a preferred embodiment a sheet of material is formed with a plurality of slits that are positioned relative to a proposed bend line and configured to allow bending of the sheet of material precisely along the bend line as a result of edge-to-face engagement of material on opposite sides of the slits during bending for increased bend strength and dimensional accuracy.

Most preferably the longitudinally adjacent slits are equally transversely spaced on opposite sides of the bend line to define bending straps that extend obliquely across the bend line. The slits are preferably arcuate with convex side facing or closest to the bend line so that the width dimension of the straps increases in both directions from a midpoint, or a constant width region, of the straps. The slits also preferably include crack propagation resisting end portions to further reduce the likelihood of stress failures.

The method for precision bending of a sheet of material of the present invention is comprised, briefly, of the steps of forming a plurality of longitudinally extending slits through the sheet in axially spaced relation in a direction extending along, and proximate to, a bend line to define bending straps or webs between adjacent ends of pairs of the slits. The slits are further configured and positioned during the forming step to produce edge-to-face engagement of the sheet material on opposite sides of the slits during bending of the sheet of material. The method also can include the step of bending the sheet of material along the bend line to produce such precision-enhancing edge-to-face engagement of the material on opposite sides of the slits throughout the bend.

In one embodiment, the slitting step is accomplished by forming two elongated slits longitudinally shifted along the bend line, with each slit having a slit end portion which diverges away from the bend line to provide a pair of adjacent slit portions on opposite sides of the bend line which define an oblique bending strap extending across the bend line with increasing width in both directions from the bend line. The slit kerf and jog distance between opposing rows of arcuate slits are dimensioned and positioned to produce interengagement of an edge of the sheet of material on one side of the slits with a face of the sheet of material on the opposite side of the slits during bending. Most preferably the slits are arcuate and produce continuous and progressive engagement of an edge with an opposing face, with the result that the edge is resiliently clamped and held against the opposing face over a substantial portion of the length of the slit during bending for control of the bending precision and enhancement of the strength of the bent sheet.

In another embodiment of the method of the present invention, the step of slitting is accomplished by forming a first elongated slit through the sheet of material along the bend line, which slit is composed of a pair of proximate, transversely spaced apart, parallel and longitudinally extending, first slit segments connected near a common transverse plane by a transversely extending slit segment; and by forming a second elongated slit in substantially longitudinally aligned and longitudinally spaced relation to the first elongated slit. The step of forming the second elongated slit also preferably is accomplished by forming a pair of proximate, transversely spaced apart, parallel and longitudinally extending, slit segments connected near a common transverse plane by a transversely extending slit segment. Thus, instead of one continuous elongated slit, each slit in the pair of slits is formed as a slightly stepped slit proximate a midpoint of the combined length of the slit segments.

In these embodiments, a virtual fulcrum is provided upon bending that can be positioned precisely on the bend line to cause bending of the bending straps or webs more precisely along the bend line. The detailed concept of the virtual fulcrum is described below in the Best Mode Of Carrying Out The Invention. The slits may be provided with enlarged end openings, or may curve back on themselves so as to reduce stress concentrations proximate the bending webs and resist micro-crack propagation.

In another embodiment a single slit is provided with bending straps that are configured to pull the sheet on the far side of the bend line toward the slit to maintain edge-to-face engagement during bending. Obliquely oriented bending straps having central axes which converge on a side of the bend line opposite to the side on which the slit is positioned will produce such edge-to-face contact. Sheet edges can be combined with arcuate slit end portions to define such oblique straps.

DESCRIPTION OF THE DRAWING

FIG. 1 is a fragmentary, top plan view of a sheet of material having slits and grooves formed therein in accordance with one prior art technique.

FIG. 1A is an enlarged, fragmentary view, in cross section, taken substantially along the plane of line 1A—1A in FIG. 1, of the sheet of FIG. 1 when in a bent condition.

FIG. 1B is an enlarged, fragmentary view, in cross section, taken substantially along the plane of line 1B—1B of FIG. 1, of the sheet of FIG. 1 when in a bent condition.

FIG. 2 is a fragmentary, top plan view of a sheet of material having a plurality of slits formed therein using an alternative configuration known in the prior art.

FIG. 2A is an enlarged fragmentary side elevation view of the sheet of FIG. 2 bend by about 90 degrees.

FIG. 2B is a cross sectional view taken substantially along the plane of line 2B—2B in FIG. 2A.

FIG. 3 is a fragmentary, top plan view of a sheet of material slit in accordance with one embodiment of the present invention.

FIGS. 4A–4D are fragmentary, top plan views of a sheet of material which has been slit according to the embodiment of FIG. 3 and which is in the process of being bent from a flat plane in FIG. 4A to a 90 degrees bend in FIG. 4D.

FIGS. 5A–5C . . . are fragmentary, cross sectional views, taken substantially along the planes of lines 5C—5C . . . , in FIGS. 4A–4D during bending of the sheet of material.

FIG. 6 is a top plan view of a sheet of material slit in accordance with a second embodiment of the present invention.

FIG. 7 is a top plan view of the sheet of FIG. 6 after being bent by about 90 degrees.

FIG. 8 is an end view of the sheet of material of FIG. 7.

FIG. 8A is an enlarged, end elevation view, in cross section, of the sheet of material of FIG. 7 taken substantially along the plane of 8A—8A in FIG. 7 and rotated by about 45 degrees from FIG. 8.

FIG. 8B is an enlarged, end elevation view, in cross section, of the sheet of material of FIG. 7 taken substantially along the plane of 8B—8B in FIG. 7 and rotated by about 45 degrees from FIG. 8.

FIG. 9 is a fragmentary top plan view of a sheet of material slit according to a further alternative embodiment of the present invention.

FIG. 10 is a side elevation view of the sheet of FIG. 9 after bending by about 90 degrees.

FIG. 10A is a fragmentary cross sectional view taken substantially along the plane of line 10A—10A in FIG. 10.

FIG. 11 is a fragmentary, top plan view of a schematic representation of a further alternative embodiment of a sheet of material having strap-defining structures constructed in accordance with the present invention.

FIG. 12 is a fragmentary, top plan view of one sheet of material before bending and assembly into a curved box beam.

FIG. 13 is a side elevation view of a curved box beam constructed from two sheets of material each being slit as shown in FIG. 12.

FIG. 14 is an end elevation view of the beam of FIG. 13.

FIG. 15 is a top plan view of a sheet of material formed with strap-defining structures and configured for enclosing a cylindrical member.

FIG. 16 is a top perspective view of the sheet of material of FIG. 15 as bent along bend lines and mounted to enclose a cylindrical member.

FIG. 17 is a top perspective, exploded view of a corrugated assembly formed using a sheet of material formed in accordance with the present invention.

FIG. 18 is a top perspective, exploded view of an alternative embodiment of a sheet of material formed in accordance with the present invention.

FIG. 19 is a top plan view of the slit sheet used to construct an alternative embodiment of a corrugated deck prior to bending or folding.

FIG. 20 is a top perspective view of a corrugated sheet or deck constructed using the slit sheet material of FIG. 19.

FIG. 21A is an enlarged, fragmentary, top plan view substantially bounded by line 21A—21A in FIG. 19.

FIG. 29 is a top perspective, schematic representation of one embodiment of equipment suitable for low-force bending or folding of the slit sheet of the present invention.

FIG. 30 is a top perspective, schematic representation of another embodiment of sheet bending or folding process of the present invention.

FIG. 37 is a fragmentary top plan view of a sheet of material having differing bend line termination slit configurations.

BEST MODE OF CARRYING OUT THE INVENTION

Figure 21:
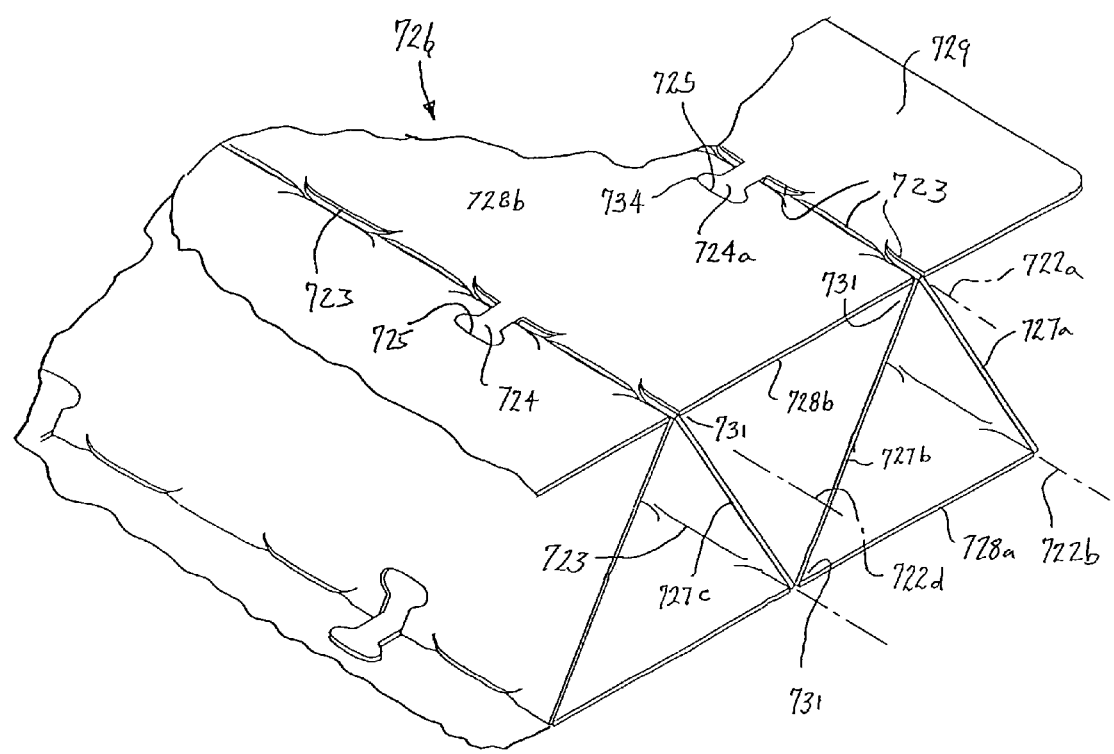
FIG. 21 is an enlarged, fragmentary perspective view substantially bounded by line 21—21 in FIG. 20.
Figure 21:
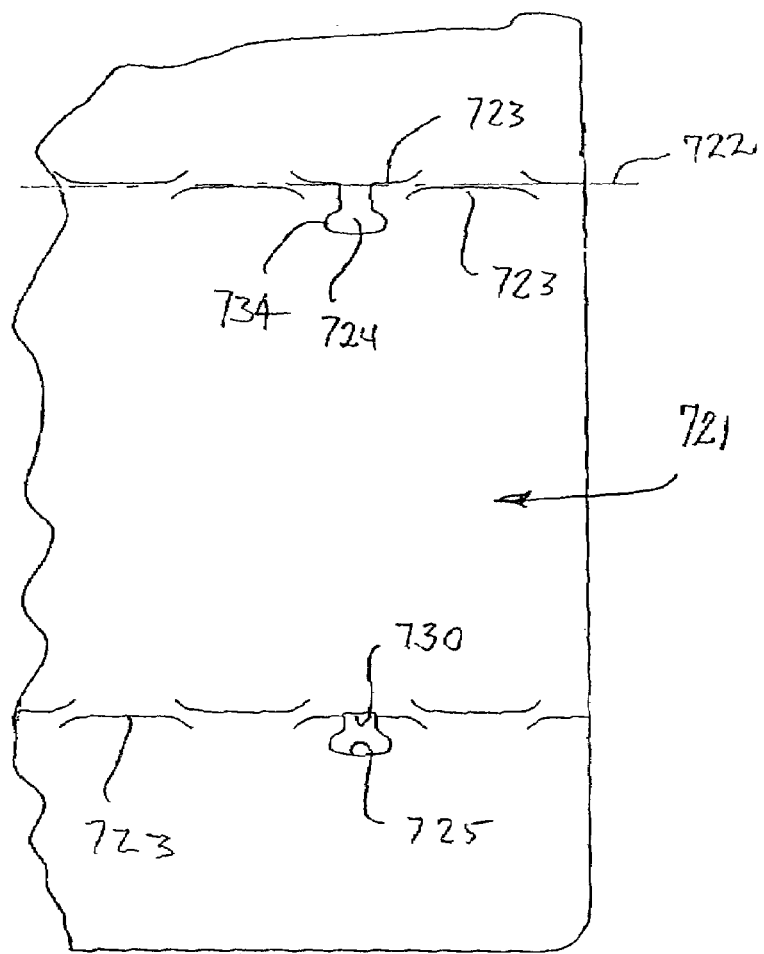

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

The present method and apparatus for precision bending of sheet material is based upon the slitting geometries disclosed in prior application Ser. No. 09/640,267, filed Aug. 17, 2000, and entitled METHOD FOR PRECISION BENDING OF A SHEET OF MATERIAL AND SLIT SHEET THEREFOR, and Ser. No. 10/256,870, filed Sep. 26, 2002 and entitled METHOD FOR PRECISION BENDING OF SHEET OF MATERIALS, SLIT SHEETS AND FABRICATION PROCESS, which are incorporated herein by reference in their entirety.

One embodiment of the precision and high strength bending process and apparatus of the present invention can be described by reference to FIGS. 3–5. In FIG. 3 a sheet of material 41 is formed with a plurality of bending strap-defining structures, in this case slits, generally designated 43, along a bend line 45. Slits 43, therefore, are longitudinally extending and in end-to-end spaced relation so as to define bending webs or straps 47 between pairs of slits 43. In FIG. 3, slits 43 are provided with stress reducing structures at ends thereof, namely openings 49, so as to effect a reduction in the stress concentration in bending webs 47. It will be understood from the description below, however, that stress reducing structures, such as enlarged openings 49 in FIG. 3, are not required for realization of the benefits of the precision bending system of the present invention.

For the embodiment of slits 43 shown in FIG. 3, however, each longitudinally extending slit between the slit ends is laterally or transversely stepped relative to bend lines 45. Thus, a slit, such as slit 43a, is formed with a pair of longitudinally extending slit segments 51 and 52 which are positioned proximate to, and preferably equidistant on opposite sides of, and substantially parallel to, bend line 45. Longitudinal slit segments 51 and 52 are further connected by a transversely extending slit segment 53 so that slit 43a extends from enlarged opening 49a to enlarged opening 49b along an interconnected path which opens to both of the enlarged openings and includes both longitudinally extending slit segments 51, 52 and transverse slit segment 53.

The function and advantages of such stepped slits can best be understood by reference to FIGS. 4A–4D, and the corresponding FIGS. 5A–5C to 5A . . . –5C . . . , wherein the bending or folding of a sheet of material 41, such as shown in FIG. 3 is illustrated at various stages. In FIG. 4A, sheet 41 is essentially slit as shown in FIG. 3. There is a difference between FIGS. 3 and 4A in that in FIG. 3 a kerf width or section of removed material is shown, while in FIG. 4A the slit is shown without any kerf, as would be produced by a slitting knife or punch. The effect during bending, however, is essentially the same if the kerf width is small enough that the material on the opposite sides of the slit interengage during bending. The same reference numerals will be employed in FIGS. 4A–5C . . . as were employed in FIG. 3.

Thus, sheet 41 is shown in a flat condition before bending in FIG. 4A. Longitudinally extending slit-segments 51 and 52 are shown in FIG. 4A and in the cross sections of FIGS. 5A–5C. The positions of the various cross sections of the sheet are also shown in FIG. 4A.

In FIG. 4B, the sheet has been bent slightly along bend line 45, which can best be seen in FIGS. 5A–5C. As can be seen in FIGS. 5A. and 5B., slits 51 and 52 have opened up along their top edges and the portion of the sheet which extends beyond bend line 45 was referred to in U.S. Pat. No. 6,481,259 B1 and U.S. application Ser. No. 10/256,870 as a "tab" 55, but for the sake of consistency with later embodiments in this application shall be referred to as "lip" 55. The lower or bottom side edges 51a and 52a of lips 55 have moved up slightly along supporting faces 51b and 52b of the sheet on the opposite sides of the slit opposite to lips 55. This displacement of lip edges 51a and 52a may be better seen in connection with the sheet when it is bent to a greater degree, for example, when bent to the position shown in FIG. 4C.

In FIG. 4C it will be seen that edges 51a and 52a have moved upwardly on supporting faces 51b and 52b of sheet 41 on opposite sides of bend line 45. Thus, there is sliding contact between edges 51a and 52a and the opposing supporting faces 51b and 52b of the slit during bending. This sliding contact will be occurring at locations which are equidistant on opposite sides of central bend line 45 if longitudinal slit segments 51 and 52 are formed in equally spaced positions on opposite sides of bend line 45, as shown in FIG. 4A. Sliding contact also can be facilitated by a lubricant or by adhesives or sealants prior to their setting up or bonding.

The result of this structure is that there are two actual bending fulcrums 51a, 51b and 52a, 52b spaced at equal distances from, and on opposite sides of, bend line 45. Lip edge 51a and supporting face 51b, as well as lip edge 52a and supporting face 52b, produce bending of bending web 47 about a virtual fulcrum that lies between the actual fulcrums and will be understood to be superimposed over bend line 45.

The final result of a 90 degree bend is shown in FIG. 4D and corresponding cross sections 5A . . . –5C . . . As will be seen, sheet edge 52a and bottom side or surface 52c now are interengaged or rest on, and are supported in partially overlapped relation to, supporting face 52b (FIG. 5A . . . ). Similarly, edge 51a and bottom surface 51c now engages and rests on face 51b in an overlapped condition (FIG. 5B . . . ). Bending web 47 will be seen to have been plastically deformed or extended along an upper surface of the web 47a and plastically compressed along a lower surface 47b of web 47, as best illustrated in FIG. 5C . . .

In the bent condition of FIG. 4D, the lip portions of the sheet, namely, portions 55, which extend over the center line when the sheet is slit, are now resting on supporting faces 51b and 52b. This edge-to-face engagement and support during the bend, which alternates along the bend line in the configuration shown in the drawing, produces greater precision in bending or folding and gives the bent or folded structure greater resistance to shear forces at the bend or fold in mutually perpendicular directions. Thus a load La (FIG. 5A . . . ) will be supported between bending webs 47 by the overlap of the edge 52a and bottom surface 52c on supporting edge 52b. Similarly, a load Lb (FIG. 5B . . . ) will be supported by overlap and engagement of the edge 51a and surface 51c on supporting face 51b intermediate bending webs 47.

This is referred to herein as "edge-to-face" engagement and support of the material along substantially the entire length of one side of the slit by the material along substantially the entire length of the other side of the slit. It will be appreciated that, if sheet 41 were bent or folded by more than 90 degrees, edges 51a and 52a would lift up off the faces 51b and 52b and the underneath surfaces 51c and 52c would be supported by the lower edges of face 51b and 52b. If the sheet is bent by less than 90 degrees the edge still comes into engagement with the face almost immediately after the start of bending, but only the edge engages the face. This support of one side of the slit on the other shall be deemed to be "edge-to-face" engagement and support as used in the specification and the claims. As will be described hereinafter, non-ninety degree bends with full support of edges 51a and 52a by faces 51b can be achieved by slitting the sheet at angles which are not at 90 degrees to the sheet.

While bending straps or webs 47 have residual stresses as a result of plastic deformation, and while the slits cause a substantial portion of the bend not to be directly coupled together in the slit-based bending system of the present invention, the slits are formed and positioned so as to produce an edge-to-face overlap which provide s substantial additional strength to the bent structure over the strength of the structures of FIGS. 1, 1A and 1B and 2A and 2B, which are based upon conventional slitting or grooving geometries. The bending straps of the present invention, in effect, pre-load the bend so as to pull or clamp the sides of the slit into edge-to-face engagement over substantially the entire bending process, and at the end of the bend, over substantially the entire slit length. Pre-loading of the bend by the residual tension in the strap also tends to prevent vibration between the slit edge which is pre-loaded against the face which acts as a bed on the other side of the slit.

Moreover, since the edges are interengaged with the faces over a substantial portion of the length of the slits, loads $L_a$ and $L_b$ will not crush or further plastically deform bending straps 47, as is the case for the prior art slitting configuration of FIGS. 2, 2A, 2B. Loading of the present bend is immediately supported by the edge-to-face engagement produced by the slitting technique of the present invention, rather than merely by the cross sectional connecting area of a twisted and highly stressed strap, as results in the prior art configuration of FIGS. 2, 2A, 2B and the Gitlin et al. application.

The embodiment employing laterally stepped or staggered slits of the present invention, therefore, result in substantial advantages. First, the lateral position of the longitudinally extending slit segments 51 and 52 can be precisely located on each side of bend line 45, with the result that the bend will occur about a virtual fulcrum as a consequence of two actual fulcrums equidistant from, and on opposite sides of, the bend line. This precision bending reduces or eliminates accumulated tolerance errors since slit positions can be very precisely controlled by a cutting device which is driven by a CNC controller.

It also should be noted, that press brakes normally bend by indexing off an edge of a sheet or an existing bend, or other feature(s). This makes bending at an angle to the sheet edge feature(s) difficult using a press brake. Bending precisely at angles to any feature(s) of the sheet edge, however, can be accomplished readily using the present slitting process. Additionally, the resulting bent sheet has substantially improved strength against shear loading and loading along mutually perpendicular axes because the overlapped edges and faces produced by the present slit configurations support the sheet against such loads.

As can be seen, the embodiment of the present invention, as shown in FIGS. 3-5C . . . produces precision bending of straps 47 which are substantially perpendicular to the bend line. Such an orientation of the bending straps produces significant plastic elongation along the outside or top surface of the strap, as well as significant compression along the inside or bottom surface of the strap. The bend occurs on the relatively short perpendicular straps in a manner similar to the bends of the perpendicular straps of FIGS. 1–1B, but in FIGS. 3–5C''' the lip 55 of one plane is tucked into interlocking or interengaged relationship with the face of the other plane for increased bend strength.

The prior art approach shown in FIGS. 2–2B orients the connecting straps 34 parallel to the bend line and results in significant plastic twisting deformation of the straps. Also this plastic twisting deformation significantly changes the microstructure of the material around the bend line. Moreover the straps do not fully tuck or clamp the opposite sides of the sheet into interengaged relation over the length of the slits. Still further in the embodiment of FIGS. 3–5C''' the strap width can be varied independently of the jog distance between slits 51 and 52 so that greater flexibility in design of the bend strength can be achieved.

While bending of sheet material by 90 degrees has been illustrated in the drawing, it will be understood that most of the advantages described in all embodiments of the present invention also can be realized if the slit sheet is bent by more or less than 90 degrees. The lip which extends across the bend line will slide onto and engage the opposite face beginning at small bend angles, and such support and engagement will continue at large, 90 degree plus, bend angles.

It has been found that the embodiment of FIGS. 3–5C''' is best suited for use with relatively ductile sheet materials. As the material becomes harder and less ductile, a second embodiment is preferred.

In the embodiment of the present invention shown in FIGS. 6–8B a slitting configuration is employed which tucks or clamps the sheet material into interengaged relation on both sides of the slits, and also reduces bending strap plastic deformation and the residual stress in the straps. Moreover, this embodiment also allows the strap width to be varied independently of the jog distance between slits and to have the strap width increase in both directions from the bend line for less stress concentration in the connected portions of the sheet of material on opposite sides of the bend line.

A bending strap which is oblique to the bend line is employed, which allows the strap length to be increased, as compared to the shorter bending straps of FIGS. 3–5C'''. Plastic deformation also is accomplished in part by twisting, rather than purely by bending, as is the case in FIGS. 3–5C''', but the amount of twisting is greatly reduced, as compared to the parallel straps of FIGS. 2–2B. Moreover, the material lips on opposite sides of the slit are tucked into interengagement with the faces over virtually the entire length of the slit so that substantial additional strap stress on loading does not occur.

Additionally, in the embodiment shown in FIGS. 6–8B, the slit configuration produces a continuous sliding interengagement between material on opposite sides of the slits during bending, which interengagement progresses along the slit from the middle toward the ends. The faces on one side of the slits act as beds for sliding support during the bend, which results in a more uniform and a less stressful bending of the bending straps. The embodiment as shown in FIGS. 6–8B, therefore, can be used with sheet material that is less ductile, such as heat treated 6061 aluminum or even some ceramics, and with thicker sheets of material.

Referring specifically to FIGS. 6–8B, a sheet of material 241 to be bent or folded is formed with a plurality of longitudinally extending bending strap-defining structures, such as slits 243, along a bend line 245. Each of slits 243 optionally may be provided with enlarged stress-relieving end openings 249, or a curved end section 249a, which will tend to cause any stress cracks to propagate back into slits 243, depending on the loading direction of the sheet. As will be seen, the slits of the embodiment of FIGS. 6 and 8B are not stepped, but they are configured in a manner producing bending and twisting of obliquely oriented bending straps 247 about a virtual fulcrum superimposed on bend line 245. The configuration and positioning of the slits, including selection of the jog distance and kerf width, also causes the sheet material on opposite sides of the slits to tuck or to move into an edge-to-face interengaged relationship during bending. Most preferably edge-to-face interengagement occurs throughout the bend to its completion. But, the jog distance and kerf can be selected to produce edge-to-face interengagement only at the start of the bend, which will tend to insure precise bending. Thus, as used herein, the expression "during bending" is meant to include edge-to-face interengagement at any stage of the bend.

While the embodiments shown and described in FIGS. 6–8B and 9–10A are not stepped, the oblique straps of the embodiments of 6–8B and 9–10A can be combined with the stepped slit configuration of FIGS. 3–5C . . . . Thus, one or both of the ends of the stepped slits can be oblique or curved.

As shown in FIG. 6, pairs of elongated slits 243 are preferably positioned on opposite sides of and proximate to bend line 245 so that pairs of longitudinally adjacent slit end portions 251 on opposite sides of the bend line define a bending web, spline or strap 247, which can be seen to extend obliquely across bend line 245. "Oblique" and "obliquely," as will be explained in more detail below in connection with FIG. 11, shall mean that the longitudinal central axis of the strap crosses the desired bend line at an angle other than 90 degrees. Thus, each slit end portion 251 diverges away from bend line 245 so that the center line of the strap is skewed or oblique and bending, as well as twisting of the strap, occurs. Although not an absolute requirement to effect bending in accordance with the present invention, it will be seen that slits 243 are longitudinally overlapping along bend line 245.

Unlike slits 31 in FIGS. 2–2B and the prior art Gitlin, et al. Application, which are parallel to the bend line in the area defining bending straps 34, the divergence of the slits 243 from bend line 245 results in oblique bending straps that do not require the extreme twisting present in the prior art of FIGS. 2–2B and Gitlin et al. Application. Moreover, the divergence of slits 243 from bend line 245 results in the width dimension of the straps increasing as the straps connect with the remainder of sheet 241. This increasing width enhances the transfer of loading across the bend so as to reduce stress concentrations and to increase fatigue resistance of the straps.

As was the case for the first embodiment, slit kerfs 243 preferably have a width dimension, and the transverse jog distance across the bend line between slits is dimensioned, to produce interengagement of sheet material on opposite sides of the slits during bending. Thus, slits 243 can be made with a knife and have essentially a zero kerf, or they can have a greater kerf which still produces interengagement, depending upon the thickness of the sheet being bent. Most preferably the kerf width is not greater than about 0.3 times the material thickness, and the jog distance is not greater than about 1.0 times the material thickness.

As was the case for the embodiment of FIGS. 3–5C . . . , a lip portion 253 extends across bend line 245 to slit 243. Lip 253 slides or rides up a face 255 of a tongue 260 on the other side of slit 243 if the kerf width and jog distance, relative to the thickness of the material, are not so large as to prevent contact between the two sides of the slit during bending.

If the kerf width and jog distance are so large that contact between the lip portion 253 and face 255 of tongue 260 does not occur the bent or folded sheet will still have some of the improved strength advantages of oblique bending straps, but in such instances there are no actual fulcrums for bending so that bending along bend line 245 becomes less predictable and precise. Similarly, if the strap-defining structures are grooves 243 which do not penetrate through the sheet of material, the grooves will define oblique, high-strength bending straps, but edge-to-face sliding will not occur during bending unless the groove is so deep as to breakthrough during bending and become a slit. Thus, arcuately or divergently grooved embodiments of the bending straps will have improved strap strength even if edge-to-face bending does not occur.

Another problem which will be associated with a kerf width that is too wide to produce interengagement of lips 253 with faces 255 of tongues 260 is that the resultant bent sheet material will not have a lip edge supported on a slit face, unless the bend is relatively extreme so as to define a small arcuate angle between the two sides of the bent sheet. As noted in connection with the prior art slitting approach, this will result in immediate further stressing of the bending straps upon loading. The problem would not be as severe in the strap configuration of FIGS. 6–8B as in the prior art, but the preferred form is for the kerf width and jog distance to be selected to insure interengagement of the lip and tongue face substantially throughout the bending process.

It is also possible for the slits 243 to actually be on the bend line or even across the bend line and still produce precise bending from the balanced positioning of the actual fulcrum faces 255 and the edges of lips 253 sliding therealong. A potential disadvantage of slits 243 being formed to cross the bend line 245 is that an air-gap would remain between edge 257 and face 255. An air-gap, however, may be acceptable in order to facilitate subsequent welding, brazing, soldering, adhesive filling or if an air-gap is desired for venting. Slit positioning to create an air-gap is a desirable feature of the present invention when subsequent bend reinforcement is employed. Unfilled, however, an air-gap will tend to place all of the load bearing requirements of the bend in all degrees of freedom, except rotation, on the connected zone or cross sectional area of plastically deformed strap 247. It is also possible to scale slits that cross the bend line that produce edge-to-face engagement without an air gap.

FIGS. 7, 8, 8A and 8B illustrate the sheet 241 as bent to a 90 degree angle along bend line 245. As best may be seen in FIGS. 8A and 8B, an inside edge 257 of lip 253 has slid up on face 255 of tongue 260 on the opposite side of the slit and is interengaged and supported thereon. A vertical force, $F_V$, therefore, as shown in FIG. 8A is supported by the overlap of edge 257 on face 255. A horizontal force, $F_H$, as shown in FIG. 8B similarly will be resisted by the overlap of edge 257 on face 255. Comparison of FIGS. 8A and 8B to the prior art FIGS. 1A, 1B and 2A and 2B will make apparent the differences which the present bending method and slit configuration have on the strength of the overall structure. The combination of alternating overlapping edge-to-face support along the slits and the oblique bending straps, which are oblique in oppositely skewed directions, provides a bend and twist which is not only precise but has much less residual stress and higher strength than prior slitting configurations will produce.

However, skewing of the bending straps in opposite directions is not required to achieve many of the advantages of the present invention. When sheet 241 is an isotropic material, alternate skewing of the strap longitudinal central axes tends to cancel stress. If the sheet material is not isotropic, skewing of the oblique straps in the same direction can be used to negate preferential grain effects in the material. Alternatively, for isotropic sheet material, skewing of the straps in the same direction can produce relative shifting along the bend line of the portions of the sheet on opposite sides of the bend line, which shifting can be used for producing a locking engagement with a third plane such as an interference fit or a tab and slot insertion by the amount of side shift produced.

The geometry of the oblique slits is such that they bend and twist over a region that tends to reduce residual stress in the strap material at the point where the slit is terminated or the strap connected to the rest of the sheet. Thus, crack propagation is reduced, lessening the need for enlarged openings or curls at the slit ends. If the resultant structure is intended primarily for static loading or is not expected to be loaded at all, no stress reducing termination is required in the arcuate slit that produces the oblique strap.

Moreover, it will be understood that slits 243 can be shifted along bend line 243 to change the width of straps 247 without increasing jog distance at which the slits are laterally spaced from each other. Conversely, the jog distance between slits 243 can be increased and the slits longitudinally shifted to maintain the same strap, thickness. Obviously both changes can be made to design the strap width and length to meet the application.

Generally, the ratio of the transverse distance from slit to slit, or twice the distance of one slit to the bend line is referred to as the "jog". The ratio of the jog distance relative to the material thickness in the preferred embodiments of the present invention will be less than 1. That is, the jog distance usually is less than one material thickness. A more preferred embodiment makes use of a jog distance ratio of less than 0.5 material thickness. A still more preferred embodiment makes use of a jog distance ratio of approximately 0.3 material thickness, depending upon the characteristics of the specific material used and the widths of the straps, and the kerf dimensions.

The width of bending straps 247 will influence the amount of force required to bend the sheet and that can be varied by either moving slits 243 farther away from the bend line 245 or by longitudinally shifting the position of the slits, or both. Generally, the width of oblique bending straps 247 most preferably will be selected to be greater than the thickness of the material being bent, but strap widths in the range of about 0.5 to about 4 times the thickness of the material may be used. More preferably, the strap width is between 0.7 and 2.5 times the material thickness.

One of the advantages of the present invention, however, is that the slitting configuration is such that bending of sheets can normally be accomplished using hand tools or tools that are relatively low powered. Thus, the bending tools need only so much force as to effect bending and twisting of bending straps 247; they do not have to have sufficient power so as to control the location of the bend. Such control is required for powered machines, such as press brakes, which clamp the material to be bent with sufficient force so as to control the location of the bend. In the present invention, however, the location of the bend is controlled by the actual fulcrums, namely edges 257 pivoting on face 255 on opposite sides of the bend line. Therefore, the bending tool required need only be one which can effect bending of straps 247, not positioning of the bend. This is extremely important in applications in which high strength power tools are not readily available, for example, in outer space or in the field fabrication of structures or at fabricators who do not have such high-powered equipment. It also allows low-force sheet bending equipment, such as corrugated cardboard bending machines, bladders, vacuum bending, hydraulic pulling cylinders with folding bars, and shape-memory bending materials, to be used to bend metal sheets, as will be set forth in more detail below. Additionally, accurate bends are important in the fabrication of structures in which physical access to power bending equipment is not possible because of the geometry of the structure itself. This is particularly true of the last few bends required to close and latch a three-dimensional structure.

The most preferred configuration for slit end portions 251 is an arcuate divergence from bend line 245. In fact, each slit may be formed as a continuous arc, as shown in FIGS. 9, 10 and 10A and described below. An arc causes the material on the side of the slit to smoothly and progressively move up the face side of the tongue along an arcuate path beginning at center of the slit and progressing to the ends of the slit. This reduces the danger of hanging up of edge 257 on face 255 during bending and thereby is less stressful on the bending straps. Additionally, large radii of cut free surfaces are less prone to stress concentration. In the configuration of FIGS. 6–8B, the central portion of slits 243 is substantially parallel to bend line 245. Some non-parallel orientations, particularly if balanced on either side of the bend line, may be acceptable and produce the results described herein.

It also would be possible to form end portions 251 to diverge from bend line 245 at right angles to the bend line and the center of slits 243. This would define a bending strap that could be non-oblique, if the slits did not longitudinally overlap. The disadvantage of this approach is that the bending straps 247 tend not to bend as uniformly and reliably and thereby influence the precision of the location of the bend. Additionally, such a geometry eliminates twisting of the strap and induces severe points of stress concentration on the inner and outer radii of the bend and may limit the degree of edge-to-edge engagement.

The bending straps in all the embodiments of the present invention are first elastically deformed and in plastic/elastic materials thereafter plastically deformed. The present slitting invention also can be used with elastically deformable plastics that never plastically deform. Such materials would be secured in a bent or folded condition so that they do not resiliently unbend. In order to make it more likely that only elastic deformation occurs, it is preferable that the bending straps be formed with central longitudinal strap axes that are at a small angle to the bending line, most preferably, 26 degrees or less. The lower the angle, the higher the fraction of twisting that occurs and the lower the fraction of bending that occurs. Moreover, the lower the angle, the higher the bending radius that occurs. Rigid materials that do not gracefully deform plastically, such as rigid polymers, rigid metal, the more flexible ceramics and some composites, can tolerate a large bending radius in the elastic regime. They can also tolerate a torsion or twisting spring action that is distributed over a long strap of material. Low angle straps provide both aspects.

At the end of the bend of a plastically deformed sheet, however, there will remain a certain resilient elastic deformation tending to pull edge 257 down against face 255 and resulting in residual resilient clamping force maintaining the interengagement between material on opposite sides of the slits. Thus, the elastic resiliency of the sheet being bent will tend to pre-load or snug down the overlapping sheet edges against the supporting faces to ensure strength at the bend and reduce bending strap incremental stress on loading of the bend.

The embodiment shown in FIGS. 9, 10 and 10A is a special case of the oblique strap embodiment described in connection with FIGS. 6–8B. Here the oblique straps are formed by completely arcuate slits 443. This slit configuration, shown as a circular segment, is particularly well suited for bending thicker and less ductile metal sheets, for example, titanium and ¼ inch steel plate and up.

When arcuate or circular slits 443 are formed in sheet 441 on opposite sides of bend line 435, lip portions 453 of the sheet, which extend over bend line 445 to slits 443, begin tucking or sliding onto face 455 of the tongues 470 at a center of each arcuate slit at the start of bending. Lip portions 453 then slide from the center of each slit partially up onto tongue faces 455 progressively toward the slit ends as straps 447 are twisted and bent. The progressive tucking of the lips onto the opposing faces is less stressful on the slit ends 449, and therefore more suitable for bending of less ductile and thicker materials, than say the embodiment of FIGS. 6–8B, in which the slits have straight central portions and simultaneously slide up onto the faces over the entire straight portion.

Slit ends 449 in FIG. 10 do not have the stress-relieving openings 249, nor radiused ends 249a of FIGS. 6–8 nor the curved ends of FIG. 11, but slits 443 are more economical to cut or form into most sheet stock. Moreover, the deformation of straps 447 is more gradual during bending so that stress concentration will be reduced. This, of course, combines with increasing strap width to transfer loading forces and bending forces more evenly into the remainder of the sheet with lower stress concentration.

The various embodiments of the present sheet slitting and grooving invention allow designing manufacturing and fabrication advantages to be achieved which have not heretofore been realized. Thus, the full benefits of such design and fabrication techniques as CAD design, Rapid Prototyping and "pick and place" assembly can be realized by using sheet stock formation techniques in accordance with the present invention. Moreover, standard fabrication techniques, such as welding, are greatly enhanced using the strap-defining configurations of the present invention.

The many advantages of using sheets formed in accordance with the present invention can be illustrated in connection with a manufacturing technique as basic as welding. Sheet bending using the present method, for example, avoids the manufacturing problems associated with handling multiple parts, such as jigging.

Additionally, the bent sheets of the present invention in which slitting is employed can be welded along the slits. As can be seen in FIG. 10A, for example, face 455 and end surface 457 of tab 453 form a V-shaped cross section that is ideal for welding. No grinding or machining is required to place a weld 460 (broken lines) along slits 443 as shown in FIG. 10A. Moreover, the edge-to-face engagement of the sides of the sheet on opposite sides of the slits, in effect, provides a jig or fixture for holding the sheet portions together during the weld and for reducing thermally induced warping. Set up time is thereby greatly reduced, and the dimensional accuracy achieved by the present slitting process is maintained during the welding step. The arcuate slits also provide an easily sensed topographic feature for robotic welding. These advantages also accrue in connection with soldering, brazing and adhesive filling, although thermal distortion is usually not a serious issue for many adhesives.

Filling of the slits by welding, brazing, soldering, potting compound or adhesives allows the bent sheets of the present invention to be formed into enclosures which hold fluids or flowable materials. Thus, bent sheet enclosures can even be used to form fluid-tight molds, with the sheeting either being removed or left in place after molding.

One of the significant advantages of using oblique, and particularly curved, grooves or slits is that the resulting bending straps are diverging at the point at which they connect to the reminder of the sheet material. Thus, area 450 of strap 447 in FIG. 10 is transversely diverging between slit end 449 and the next slit 443. This divergence tends to deliver or transfer the stresses in strap 447 at each end into the remainder of the sheet in a diffused or unconcentrated manner. As the arc or radius of the slits is reduced the divergence increases, again allowing a further independent tailoring of the strap stress transfer across the bend. Such tailoring can be combined with one or more of changes to strap width, jog distance and slit kerf to further influence the strength of the bend. This principle is employed in the design of the slits on grooves of FIG. 11.

While the oblique bending straps of the embodiments of FIGS. 6–8 and FIGS. 9–10 result in substantial improvements of the overall strength and fatigue resistance of the bent structure, it has been found empirically that still further improvements, particularly in connection with fatigue, can be achieved if the strap-defining structure takes the form of an arcuate slit. As used herein, "arcuate" shall mean and include a circular arc and a series of longitudinally connected, tangential arcs having differing radii. Preferably, the arcuate slits or grooves have relatively large radii (as compared to the sheet thickness), as illustrated in FIG. 11. Thus, a sheet of material 541 can be provided with a plurality of connected, large radii, arcuate slits, generally designated 542, along bend line 543. Arcuate slits 542 preferably are longitudinally staggered or offset (by an offset distance measured between the centers of adjacent slits along bend line 543 and alternatively are on opposite sides of the bend line 543, in a manner described above in connection with other embodiments of the present invention. Arcuate slits 542 define connected zones, which are bending straps 544, and disconnected zones, which are provided by slits 542. Only the right hand slit 542 in FIG. 11 shows a kerf or slit thickness, with the remainder of the slits 542 being either schematically shown or taking the form of a slit form by a knife resulting in no kerf.

Longitudinally adjacent slits 542 defined therebetween bending straps 544, which are shown in this embodiment as being oblique to bending line 543 and skewed in alternating directions, as also described above. Each slit 542 tends to have a central arcuate portion 546 which diverges away from bending line 543 from a center point 547 of the arcuate slit. End portions 548 also may advantageously be arcuate with a much smaller radius of curvature that causes the smiles to extend back along arc portion 549 and finally terminated in an inwardly arc portion 551.

It will be seen, therefore, that bending strap 544 is defined by the arc portions 546 on either side of bending line 543 and at the end of the straps by the arcuate end portions 548. A minimum strap width occurs between the arcuate slit portions 546 at arrows 552 (shown in FIG. 11 at the left hand pair of longitudinally adjacent slits). If a center line 553 is drawn through arrows 552 at the minimum width of the strap, it would be seen that the center line crosses bend line 543 at about the minimum strap width 552. Strap 544 diverges away from longitudinal strap axis 553 in both directions from minimum strap width 552. Thus, a portion 554 of the sheet on one side of bend line 543 is connected to a second portion 556 of the sheet on the opposite side of bend line 543 by strap 544. The increasing width of strap 544 in both directions from the minimum width plane 552 causes the strap to be connected to the respective sheet portions 554 and 556 across the bend line in a manner which greatly reduces stress and increases fatigue resistance.

For purposes of further illustration, strap 544a has been cross hatched to demonstrate the increasing width of the strap along its central longitudinal strap axis 553. Coupling of sheet portion 554 by an ever-increasing strap width to sheet portion 556 by a similarly increasing strap width tends to reduce stress. Orienting the central longitudinal axes 553 of straps 554 at an oblique angle to bend line 543 results in the straps being both twisted and bent, rather than solely twisted, which also reduces stresses in the straps. Stresses in the sheet flow across the bend through the connected material of the strap. Cyclical stress in tension, the primary cause of fatigue failure, flow through the twisted and bent strap and generally parallel to large radii arcs 546 and 549. The smaller radii of arcs 551 and 548 provide a smooth transition away from the primary stress bearing free surfaces of 546 and 549 but do not themselves experience significant stress flow. In this way, the arcuate slits are like portions of very large circles joined together by much smaller circles or arcs in a way that positions only the large radii arcs (compared to the material thickness) in the stress field flow, and uses smaller radii arcs as connectors to minimize the depth into the parent plane away from the fold line that the slit is formed. Thus, slit ends, at which stress caused micro cracking is most likely to occur, will tend not to be propagated from one slit to another down the length of the bend, as can possibly occur in a failure condition in the embodiments of FIGS. 6–8 and 9–10.

The bending strap shape also will influence the distribution of stresses across the bend. When the bending strap diverges relatively rapidly away from the narrowest strap width dimension, e.g., width dimension 552 in FIG. 11, there is a tendency for this minimum dimension to act as a waist or weakened plane at the center of the strap. Such rapid narrowing will allow localized plastic deformation and stress concentration in the strap, rather than the desired distribution of the stresses over the full length of the strap and into the sheet material 554 and 556 on either side of the strap.

As shown in FIG. 11, and as is preferred, strap 544 preferably a minimum width dimension 552 providing the desired strap strength and then gradually diverge in both directions along the strap with any rapid divergence taking place as the strap terminates into the sheet portions 554 and 556. This construction avoids the problem of having an unduly narrow strap waist at 552 which will concentrate bending and twisting forces and produce failure, rather than distributing them evenly along the length of the strap and into sheet portions 554 and 556.

Figure 11A:
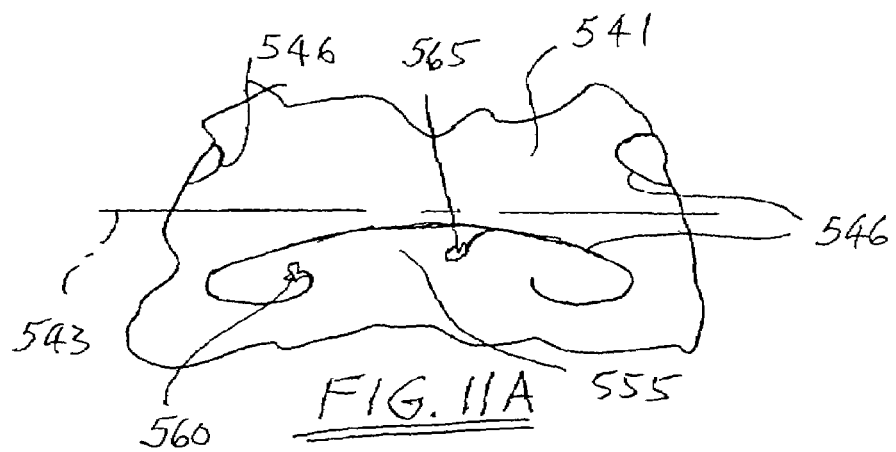
FIG. 11A is a fragmentary top plan view of a slit of the configuration shown in FIG. 11 which has been formed using a rapid piercing laser cutting technique.

The tongue side of a slit, that is, the portion of the parent plane defined by the concave side of the arcuate slit, tends to be isolated from tensile stress. This makes the tongue ideal for locating features that cut into the parent plane. Attachment or alignment holes, or notches that mate with other connecting geometry are examples. FIG. 11A illustrates positioning of water-jet cut or laser cut, rapid piercing holes 560 and 565 on the tongue 555 of slit 546. Rapid pierce holes are somewhat irregular and elsewhere might initiate a crack failure in fatigue. In FIG. 11A two alternative locations of rapid piercing holes are shown. Rapid pierce holes are important to reduce the total cost of laser or water-jet cutting because slow piercing is very time consuming.

One of the most beneficial aspects of the present invention is that the design and cutting of the material to form the straps and the edge-to-face engagement of the lips and tongues of the slits is accomplished in a manner in which the microstructure of the material around the bend or fold is essentially unchanged in comparison to the substantial change in the microstructure of materials bent or folded to the same angle or degree of sharpness using conventional bending techniques, as described in the prior art. It is the relationship of the straps and the edge-to-face engagement of the slits which provides a combination of twisting and bending deformation when the material is bent that greatly reduces the stress around the bend and leaves the microstructure of the material around the bend essentially unchanged. When conventional bending techniques of the prior art are used there is a substantial change in the microstructure of the material around the bend if the bend is made to be sharp (for example, 90 degrees on the inside of the bend, as shown for example in FIGS. 5A . . . , 8, 8A, 8B and 10A.

As was generally described in connection with other embodiments of the present invention, slits 542 can have their geometries altered to accommodate a wide range of sheet characteristics. Thus, as the type of sheet material which is bent is altered, or its thicknesses changed or strength characteristics of the bend are to be tailored, the geometry of smile slits 542 can also change. The length, L, of each slit can change, as can its offset distance, O.D., or longitudinal spacing along bend line 543. The height, H, of the slits can also be changed, and the jog distance, J, across the bend line between slits on opposite sides of the bend line can be altered. These various factors will have an effect on the geometry and orientation of straps 544, which in turn will also effect the strength of the bend and its suitability for use in various structures. Of equal importance is the shape of the arcuate slit in conjunction with the aforementioned sealing and positioning variable.

It is a feature of the present invention, therefore, that the strap-defining slits or grooves can be tailored to the material being bent or folded and the structure to be produced. It is possible, for example, to empirically test sheets of a given material but differing thicknesses with arc slit designs in which the geometries have been changed slightly, but the designs comprise a family of related arc geometries. This process can be repeated for differing materials, and the empirical data stored in a database from which designs can be retrieved based upon input as to the sheet of material being bent and its thickness. This process is particularly well suited for computer implementation in which the physical properties of the sheet of material are entered and the program makes a selection from the computer database of empirical data as to the most appropriate arc geometry for use in bending the material. The software can also interpolate between available data when the sheet is of a material for which no exact data is stored or when the sheet has a thickness for which there are no exact stored data.

The design or configuration of the arcs, and thus the connecting straps, also can be varied along the length of a bend line to accommodate changes in the thickness of the sheet of material along the bend line. Alternatively, strap configurations along a bend line can change or be tailored to accommodate non-linear loading. While not as important as the strength and fatigue-resistance improvements of the present invention, the slit or strap configurations also can be varied to provide different decorative effects in combination with improved strength and fatigue resistance.

Another advantage which accrues from the various embodiments of the sheet slitting system of the present invention is that the resulting bends or fold are relatively sharp, both internally and externally. Sharp bends enable strong coupling of one bent structure to another structure. Thus, a press brake bend tends to be rounded or have a noticeable radius at the bend. When a press brake bent structure is coupled to a plate, for example, and a force is applied tending to rotate the bent structure about the arcuate bend, the bent structure can decouple from the plate. Such decoupling can occur more easily than if the bend were sharp, as it will be for the bends resulting from using the present slitting scheme.

The ability to produce sharp or crisp bends or folds allows the process of the present invention to be applied to structures which had heretofore only been formed from paper or thin foils, namely, to the vast technology of origami or folded paper constructions. Complex three-dimensional folded paper structures, and a science or mathematics for their creation, have been developed after centuries of effort. Such origami structures, while visually elegant, usually are not capable of being formed from metal sheets of a thickness greater than a foil. Thus, origami folded sheets usually cannot support significant loading. Typical examples of origami are the folded paper constructions set forth in "ADVANCED ORIGAMI" by Dedier Boursin, published by Firefly Books, Buffalo, N.Y. in 2002, and "EXTREME ORIGAMI" by Kunihiko Kasahara, published by Sterling Publishing Company, NY, N.Y. in 2002. The present invention thus enables a new class of origami-analog designs in which the slitting and bending methods described herein are substituted for origami creases.

The sheet slitting or grooving process of the present invention produces sharp bends and even allows the folding of metal sheets by 180 degrees or back on itself. Thus, many structurally interesting origami constructions can be made using sheet metal having a thickness well beyond that of a foil, and the resulting origami-based structure will be capable of supporting significant loads. Another interesting design and fabrication potential is realized by using the present slitting configurations in connection with Rapid Prototyping and Rapid Manufacturing, particularly if automated "Pick and Place" component additions are employed. Rapid Prototyping and Rapid Manufacturing are broadly known and are comprised of the use of CAD (computer-assisted design) and CAM (computer-assisted manufacturing) design, respectively, to enable three-dimensional fabrication. The designer begins with a desired virtual three-dimensional structure. Using the current invention to enable Rapid Prototyping, the CAD software unfolds the three-dimensional structure to a two-dimensional sheet and then locates the slit positions for bending of the sheet to produce the desired structure. The same can be done in Rapid Manufacturing using CAM. Other types of software for performing similar tasks. The ability to precisely bend, and to tailor the bend strength, by selecting jog distances and bending strap widths, allows the designer to layout slits in the unfolded two-dimensional sheet drawing in the design process, which thereafter can be implemented in the manufacturing process by sheet grooving or slitting and bending to produce complex three-dimensional structures, with or without add-on components.

Broadly, it is also known to assemble components onto circuit boards for electronic devices using high speed "pick and place" automated component handling techniques. Thus, assembly robots can pick components from component supply devices and then place them on a circuit board or substrate or chassis. The robotics secure the components to the substrate using fasteners, soldering plug-ins or the like. Such "pick and place" assembly has been largely limited to placing the components on a flat surface. Thus, the circuit boards must be placed in a three-dimensional housing after the "pick and place" assembly has been completed.

An electronic housing, usually cannot be folded or bent into a three-dimensional shape after components are secured to the walls of the housing. Moreover, prior techniques for bending have lacked the precision possible with the present invention and necessary to solve component or structural alignment problems. Pre-folding or bending up the housing has, therefore, limited the ability for pick and place robotics to be used to secure electronic components in the housings.

It also should be noted that the straps present between slits can be advantageously used as conductive paths across bends in electronic applications, and the precision possible allows conductive paths or components on the circuit board to be folded into alignment when the three-dimensional chassis is formed, or when circuit boards themselves are folded into a more dense conformation.

The design and manufacturing processes of the present invention, however, enable precision bends to be laid out, slit and then formed with relatively low forces being involved, as is illustrated in FIGS. 28A–28E. Thus, a housing can be designed and cut from a flat sheet 821 and high-speed pick and place robotics used to rapidly secure components, C, to any or all six walls of a cube enclosure, and the housing or component chassis can be easily bent into a three-dimensional shape after the pick and place process is completed.

Figure 28A:
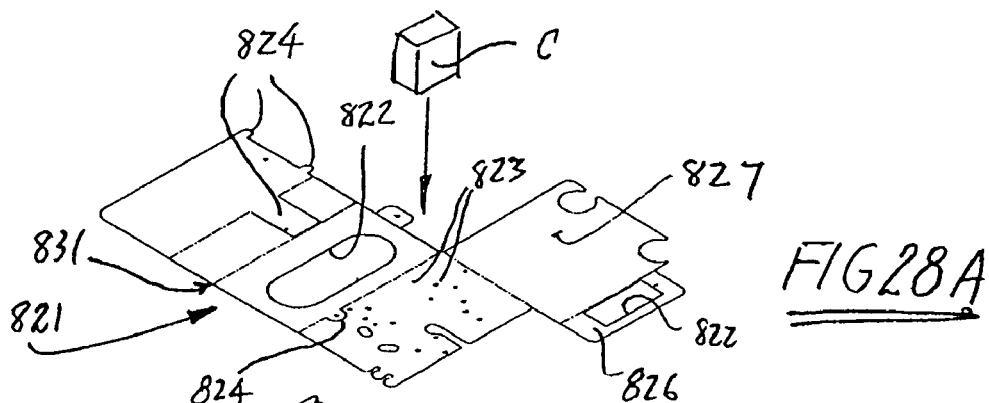
FIGS. 28A–28E are top perspective views of a sheet of material constructed in accordance with the present invention as it is being bent into a chassis for support of components such as electrical components.
Figure 28B:
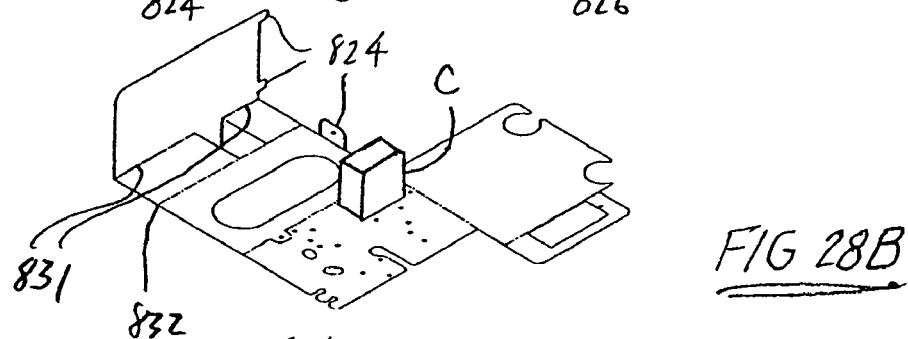
Figure 28C:
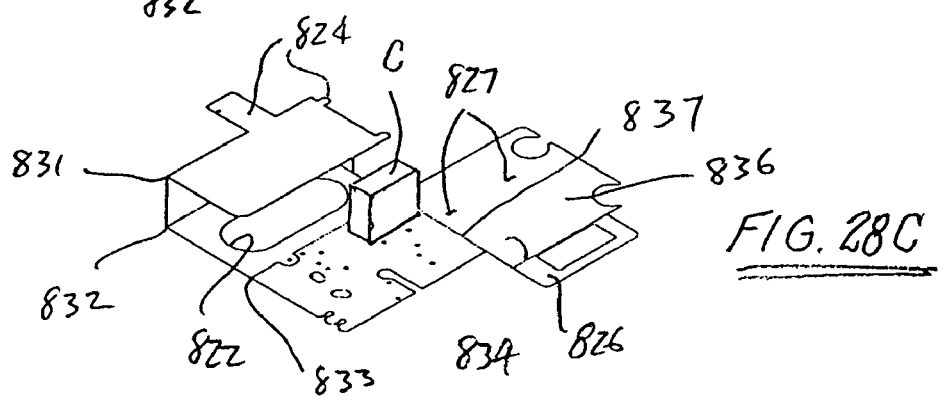
Figure 28D:
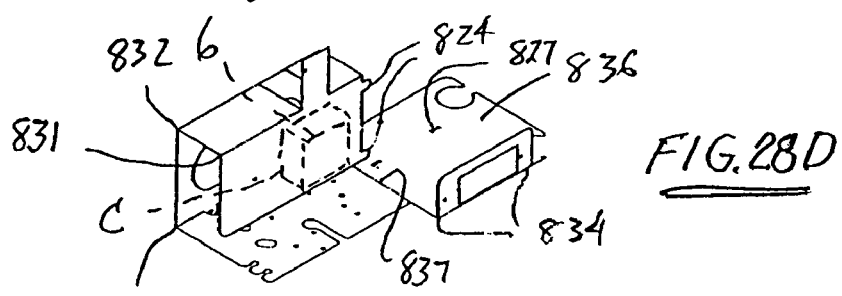
Figure 28E:
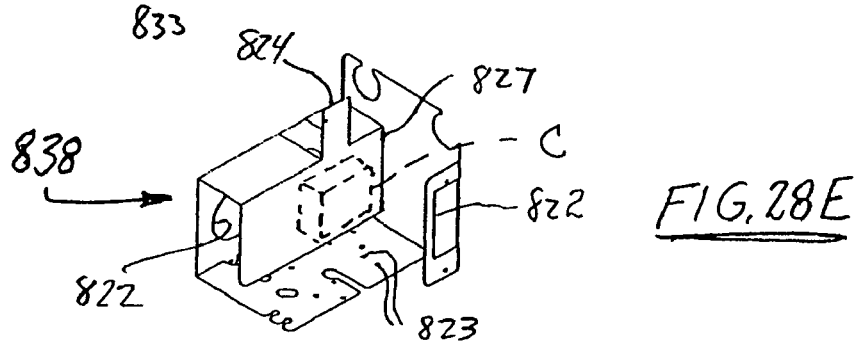

As shown in FIG. 28A, sheet 821 has component C secured thereto before bending, preferably by high-speed robotic techniques. Sheet 821 is formed by laser cutting, water jet cut, die cutting or the like with the designed cutout features 822, component-receiving openings 823, tabs 824 and support flanges 826 and tab-receiving slots 827. In FIG. 28B sheet 821 has been bent along bend line 831, causing a tab 824 to be displaced outwardly. The sheet is next bent along bend line 832 in FIG. 28C and then bent over component C along bend line 833 in FIG. 28D, while side flange 826 has been bent along bend line 834. Finally, chassis end portion 836 is bent upwardly along bend line 837 and tabs 824 are inserted into slots 827 so as to enable rigid securement of the sheet into a three-dimensional electronics chassis 838 around component C.

Obviously, in most cases a plurality of components C would be secured to sheet 821 before bending, and components C also can be secured to chassis 838 at various steps in the bending process and to various surfaces of the chassis.

FIGS. 28A–28E also illustrate a fundamental design process which is implemented by the sheet bending method of the present invention. One of the most space-efficient ways of supporting components is to mount them on sheet stock. Using conventional sheet stock bending techniques, however, does not enable tight bends and intricate interleaved sheet portions. The bending process of the present invention does, however, by reason of the ability to lay out slits extremely accurately that will produce bend in precise locations so that openings, cutouts, slots, tabs and the like will precisely align in the bent structure, as well as mounted components and the coupling to other structures.

Moreover, the precise layout of bending lines and chassis or enclosure features is only part of the advantage. The structure itself can be bent using relatively low force, and even by means of hand tools. The combination of precision location of bend lines and low-force bending enables a design technique which was only heretofore partially realized. The technique involves selecting components having the desired functions and positioning them in space in a desired arrangement. Thereafter, a chassis is designed with supporting thin sheet portions of the chassis necessary to support the components as positioned being designed, for example, using CAD techniques. The bend lines are located to produce the supporting sheet portions, and the chassis unfolded graphically to a flat sheet with the necessary feature and fold lines, as shown in FIG. 28A.

While such techniques have been described before in CAD design literature, and CAD and CAM software programs, they have not heretofore been effectively implemented in anything but the most simple designs because precision, low-force bending of sheet metals was not practical. The present slitting-based invention enables practical fabrication of this theoretical CAD or CAM design technique. Prior art CAD or CAM designs could not previously be physically realized in real materials to the same accuracy as the theoretical CAD or CAM model because, for example, conventional bending tolerances could not be held. The precision of bending possible with the present invention dramatically increases the correspondence between the CAD or CAM model and the achievable physical is form for bent sheet materials.

Moreover, the bending need not take place at the pick and place or rapid prototyping site. The sheet with attached components can be transported with the components being formed and selected to act as dunnage for the transport process. Once at the fabrication site, which may be remote from the design and cutting site, the chassis or housing sheet will be bent precisely, even by hand if desired, and the bent housing secured into a three-dimensional structure, with a plurality of selected components being secured thereto internally and/or externally.

Moreover, three-dimensional chassis and other structures 30 also can have panels therein which are attached by straps along a bend line to provide doors in the chassis or structure for periodic or emergency access to the interior of the structure. Separate door hinge assemblies are thereby eliminated.

Using the various embodiments of the sheet slitting or grooving techniques described herein, an extremely wide range of products can be formed. Without limitation by enumeration, the following are examples of products which can be folded from sheet material using the slitting and grooving schemes of the present invention: trusses, beams, curved beams, coiled beams, beams within beams, enclosures, polyhedrons, stud walls, beam networks, enveloped beams, flanged beams, indeterminate multiple-piece flanged beams, machines, works of art and sculpture, origami three-dimensional structures, musical instruments, toys, signs, modular connections, packages, pallets, protective enclosures, platforms, bridges, electrical enclosures, RF shield enclosures, EMI shields, microwave guides and ducts. A few examples of such structures are shown in FIGS. 12–30 and 32.

Formation of a curved box beam using the slitting process and slit sheet of the present invention can be described by reference to FIGS. 12, 13 and 14. A sheet of material 561 is shown in FIG. 12 that has two bend lines 562 and 563. Bend line 562 has a plurality of arcuate slits 563 on opposite sides of bend line 562. Also positioned along bend line 562 are smaller arcuate slits 564. The slits 563 and 564 have the general configuration as described and shown in connection with slits 542 in FIG. 11, but the length of slits 564 is reduced relative to the length of slits 563, and slits 564 will be seen to be positioned at the apex 566 of notches 567 which are provided in the edges 568 of the sheet of material. The bending straps 569 defined by longitudinally adjacent end portions of slits 563 and longitudinally adjacent end portions of slits 563 and 564 are essentially the same in configuration, notwithstanding differences in the length of the slits 563 and 564. There will be some slight shape difference due to arcuate segment differences, but bending straps 569 will be essentially uniform in their strength and fatigue-resistant capabilities along the length of bending line 562.

One of the advantages of the placement of slits 564 is that they tend to contain any stress crack propagation, which could occur at apexes 566 of notches 567. The various leaves or fingers 571 defined by notches 567 can be bent, for example, into or out of the page to a 90 degree angle, or to other angles if the structure should require. The central portion 572 can remain in the plane of the sheet on which FIG. 12 is drawn.

A plurality of slits 576 and 577 are positioned along second bending line 563. These slits have much tighter end curve portions 578 than the arc-like slits shown proximate first bend line 562. Generally, the tight curved end portions 578 are not as desirable as the more open-ended portions used in connection with slits 563 and 564. Nevertheless, for ductile materials that do not tend to stress fracture, slits of the type shown for slits 576 and 577 are entirely adequate. Again, the difference between slits 576 and 577 is that the smaller slits have been used at the apexes 566 of notches 567.

Once slit, sheet 561 can be bent along bend line 563 so that the leaves 571 can be bent to an angle such as 90 degrees relative to the central portion 572. It should be noted that normally the slits along bend line 562 and 563 will have the same shape, that is, they will either be slits 563 and 564 or slits 576 and 577. It is possible to mix slit configurations, but normally there will be no advantage from mixing them as shown in FIG. 12. The purpose of the illustrated embodiment of FIG. 12 is to show different slit configurations that are suitable for use in the bending of sheet material in accordance with the present invention.

The design and formation of a curved box beam using two sheets slit, as shown in the flat in FIG. 12, can be described in connection with FIGS. 13 and 14. The design would be accomplished on a CAD or CAM system, as described earlier, and the slits made in sheet 561 identically as laid out in the design process on the CAD, CAM or other systems. A curved box beam, generally designated 581, is shown in which one designed, cut and bent U-shaped sheet 572a is secured to a second designed, cut and bent U-shaped sheet 572b. As will be seen from FIGS. 13 and 14, the fingers or leaves 571a have been folded down over the outside of the fingers or leaves 571b. In both cases, the apexes 566 are closely proximate the fold lines 562a, 563a, 562b and 563b. This placement of the apexes allows bending of the sheet, by permitting notches 567a to have the included angle of the notches increase, while the included angle of notches 567b decrease in the area 582 of the longitudinal bending of beam 581. The central portions 572a and 572b of the sheet material have a thickness that will accommodate bending without buckling, at least in radii that are not extreme.

The folded sheets can be secured together by rivets 583 or other suitable fasteners, adhesives or fastening techniques such as welding and brazing. Openings for the fasteners can be pre-formed as shown in FIG. 12 at 580. The location of the openings 580 can be precisely set if the exact curved configuration is determined or known in advance of bending, or openings 580 can be positioned in central locations and thereafter used with later drilled holes to join the two bent sheets together in a curvature that is indeterminant or established in the field.

One application for indeterminant curved box beams, for example, is in the aircraft industry. Difficult to bend 4041 T-6 or 6061 T-6 aluminum is designed with the desired layout of slits and then provided in completed slit sheets as shown in FIG. 12. The sheets are then formed in the field to provide a box beam having a curvature which is determined in the field, for example, by the curvature of a portion of an airplane which must be repaired. The two sheets that form the box beam are curved to fit under a portion of the skin of the airplane which has been damaged, and then the skin is thereafter attached to the central section 572 of the curved box beam.

Bending of the leaves or fingers 571 can be done with simple hand tools, or even by hand, and field riveting used to hold the curvature of the box beam by using the preformed holes 58 as guides for holes that are drilled in the leaves or fingers of the underlying folded sheet. Thus, with a simple hand drill and pliers, a high-strength structural 4041 T-6 aluminum box beam can be custom formed and positioned as an airplane structural component for subsequent fastening of the skin of the airplane thereto. This can enable, for example, field repairs under even combat conditions so that the plane can be flown to a site at which permanent repairs can be made.

When the longitudinally curved box beam has a predetermined or known longitudinal curvature, leaves or fingers 571a and 571b can be defined by notches in which the fingers interdigitate or mesh with each other in the same plane. This will produce beam side walls that are smooth and without openings.

Box beams, whether curved or straight, also can be used in exoskeletal designs in order to provide high strength-to-weight advantages. Thus, rather than using a solid beam with its attendant weight, hollow, folded or bent beams can have corresponding strength but lower weight. If desired such hollow beams also can be filled with a foam, including a metal foam.

As shown in FIGS. 12–14 a longitudinally curved box beam 681 is produced by bending the sheet material along straight fold lines 562 and 563. It is also possible to produce longitudinally curved box beams by slitting or grooving along curved bend lines.

Turning now to FIGS. 15 and 16, a sheet of material designed and slit or grooved for folding and a three-dimensional structure made from the same, respectively, are shown. Sheet 611 has been designed to be slit or grooved along longitudinally extending fold lines 612 and 613. Further slitting and grooving has taken place on transversely extending fold lines 614, 615, 616 and 617. Opposed side edges 618 of sheets 611 are circular, and a plurality of notches 619 are formed in opposite side edges of the sheet. A coupling tab or flange 621 is formed at one end of the sheet and preferably has fastener receiving openings 622 therein which will align with opening 623 in the opposite end of sheet 611. Slits or grooves 624 of the type shown in the embodiment of FIGS. 9 and 10 have been positioned along fold lines 612–617. It will be understood that slits or grooves of the type shown in other embodiments could be employed within the scope of the present invention.

The sheet of material shown in FIG. 15 is designed to envelop or enclose a cylindrical member, such as a rod, post or column 631 shown in FIG. 16. By bending sheets 616 along fold lines 612–617, sheet 611 can be folded around to enclose cylindrical member 631 as shown in FIG. 16. The circular arcuate portion 618 of the sheet are dimensioned to have a radius which mates with that of column 631. Notches 619 close up and the edges defining the notches abut each other, while the fold lines 614–617 allow the sheet to be folded into a square configuration around the column 631. The bent three-dimensional structure which results has a plurality of planar panels 636-639 which provide surfaces against which other members or structures can be easily attached. Folded sheet 611 may be secured in place around column 631 by fasteners through openings 622 and 623. The configuration of the grooves or slits 624 causes the folded sheet 611 to become a high-strength, rigid structure around column or post 631. Securement of folded sheet 611 to post 631 against vertical displacement can be the result of an interference fit between arcuate edges 618 and the post, and/or the use of fasteners, adhesives, welding, brazing or the like, and the assembly has many applications which solve the problem of subsequent coupling of structural members to a cylindrical structure. The example of FIGS. 15 and 16 is not only a potential cosmetic cladding, it is a structural transition piece between cylindrical and rectilinear forms.

The designed and manufactured slit or grooved sheet and method of the present invention also may be used to design and form corrugated panel or deck assemblies. FIGS. 17 and 18 illustrate two corrugated panel assemblies that can be designed and constructed using the apparatus and methods of the present invention. Such assemblies are particularly effective in providing high-strength-to-weight ratios, and the sheet folding techniques of the present invention readily accommodate both folding of the corrugated sheet and the provision of attachment tabs.

In FIG. 17 attachment tabs are provided which can extend through slits to couple the corrugated sheet to the planar sheet, while in FIG. 18 tabs having fastener receiving openings are provided.

In FIG. 17, a sheet of material 641 has been slit or grooved along longitudinally extending fold lines 642–647 in accordance with the teaching of the present invention. Additionally, a plurality of tabs 649 have been formed along fold line 643, 645 and 647. Tabs 649 are cut in sheet 641 at the same time as formation of the slits or grooves 651 along the fold lines. Thus, a U-shaped cut 652 is formed in sheet 641 so that when the sheet is folded to the corrugated condition shown in FIG. 17, the tabs will protrude upwardly. Tabs 649 will extend at an angle from the vertical when folding occurs to form the corrugations, but tabs 649 can be bent from an angled position to a near vertical position, as shown in 617, by a subsequent step.

The folded or corrugated sheet 641 shown in FIG. 17 can be attached to a second planar sheet 656 which has a plurality of slits 657 formed therein. Slits 657 are positioned and dimensioned to matingly receive tabs 649 therethrough. When sheet 656 is lowered down over corrugated folded sheet 641, tabs 649 will extend up through slits 657. Tabs 649 can be in interference fit with slits 657 to secure the sheets together, or tabs 649 can be bent to a horizontal position or twisted about a vertical axis to secure the two sheets together. Tab 649 also may be bent down and secured to sheet 656 by adhesives, welding, brazing or the like.

Optionally, a second sheet of material, not shown, can be attached to the lower side of folded or corrugated sheet 641 using tabs (also not shown) which are formed out of sheet 641 during the slitting or grooving process. The second sheet would be secured to the bottom of folded corrugated sheet 641 in a manner described in connection with sheet 656.

The result is a high-strength, fatigue-resistant and lightweight corrugated panel or deck assembly which can be used in numerous applications.

A corrugated panel assembly similar to FIG. 17 can be constructed as shown in connection with the assembly of FIG. 18. Folded corrugated sheet 661 includes a plurality of fold lines 662 and a plurality of tabs 663. Tabs 663 are formed from sheet 661 in a manner similar to that described in connection with tab 649, only tabs 663 include fastener receiving openings 664. Additionally, tabs 663 are folded down to a near horizontal position, rather than up to a near vertical position, as described in connection with tabs 649. In the horizontal position, tab 663 can be used to couple a second sheet of material 666 having fastener receiving openings 667 therein. Sheet 666 is positioned so that opening 667 align with opening 664, and fasteners are used to secure the two sheets together. As described in connection with FIG. 17, a third sheet can be secured to the bottom of the corrugated sheet 666, although the figure does not show the securement tabs 664 on the bottom side of the corrugated sheet 61.

Again, by employing a plurality of grooves or slits 668 formed in accordance with the present invention, as above described, a corrugated deck or panel assembly can be fabricated which is very high in strength, has good fatigue resistance and is lightweight.

FIGS. 19–22 illustrate a further embodiment of a continuous corrugated panel or deck which can be formed using the slit sheet and method of the present invention. Moreover, the panel of FIGS. 19–22 illustrates the strength advantages which can be obtained by reason of the ability to make sharp bends or folds that have significant load carrying capabilities. Still further, the embodiment of FIGS. 19–22 illustrates the use of tabs to interlock a folded sheet into a high strength three-dimensional structure.

Prior art techniques forming corrugated panels or decks often have suffered from an inability to achieve a desired high level or percentage of chord material to the overall panel material. Generally, the purpose of the webbing is to separate the chords with the minimal web mass required to accomplish that task. I-beams are rolled or welded forms that use thicker top and bottom chords relative to the connecting web between them. The present invention enables a class of corrugated structures that provide for wide design flexibility in creating rigid, strong, low weight structures that can be manufactured from continuous coils, transported in a compact coil form, and easily formed on site. The interlocking nature of this enabled embodiment avoids welding at the corners where welding is especially subject to failure.

Sheet material 721 has been slit using the present invention and is shown in FIG. 19 in a flat state before bending or folding. As will be seen, a plurality of substantially parallel bend lines 722 have a pattern of alternating arcuate slits 723 positioned on opposite sides of the bend lines to define obliquely extending straps skewed in opposite directions. Slits 723 can take the form of the slits in FIG. 6 or 9, for example. Also formed in sheet 721 are a plurality of tabs 724 which extend outwardly of the tongue portions of slits 723, and a plurality of key-hole like openings 725. Openings 725 are positioned in aligned relation to tabs 724.

In FIG. 21A tabs 724 will be seen to extend across bend line 722 from slits 723. Tabs 724 are, therefore extensions of the tongue side of slits 723. Key hole openings 725 is a cut-out or negative tab in the tongue side of slits 723 which have a configuration dimensioned to receive tabs 724. In order to prevent the neck of tabs 724 from being interfered with by the upwardly displaced face on the opposite side of the slits, a notch 730 is provided in the lip side of the slits 723. Thus, the entire area of 725 and 730 is cut and falls out or is removed from the sheet so that tabs 724 can be inserted into notches 725/730.

In FIG. 20 the flat sheet 721 of FIG. 19 has been folded into a continuous corrugated panel or deck 726. Panel 726 includes web portions 727 and chord portions 728. As will be seen in panel 726, chords 728 are in end-to-end abutting relation over the full length of the panel on both the upper side and the lower side of the panel to provide continuous deck or chord surfaces. This construction affords panel 726 greatly enhanced strength, for example, in bending, over panels in which all the transverse webs are not joined by chords on both the top and bottom side of the panel. The deck or panel can be further reinforced by adding a sheet of additional material (not shown) which would further improve the ratio of chord material mass to the mass of the entire deck or panel for superior strength/stiffness-to-weight ratio.

FIG. 21 illustrates in greater detail the bending or folding scheme employed for panel 726. Commencing, for example, with end flange 729, web 727a can be bent down and back at bend line 722a down to a lower side of the panel. Sheet material 721 is then bent forward at bend line 722b and chord 728a extends in a longitudinal direction of the panel parallel to flange 729. At bend line 722c web 727b is bent to extend up and back to bend line 722a, at which point chord 728b is bent forward and extends to bend line 722b. Web 727 is then bent back at bend line 722d to bend line 722c. The bending continues along the length of panel 726 so as to produce a folded corrugated panel in which there are a plurality of end-to-end chords on both the top and bottom of the panel which are separated by connecting webs. The mass of the chord material in the panel to the overall panel mass is relatively high for a high strength-to-weight ratio.

The ability to fold a sheet 721 in sharp or crisp folds using the slitting process of the present invention allows the apexes 731 between the webs 727 and chords 728 to be relatively sharp and to be positioned in close, abutting relation. As illustrated, the panel of FIGS. 19–21 has webs and chords of equal length creating equilateral triangles in which each apex is about 120 degrees. As will be understood, many other corrugation geometries are equally possible.

While there are numerous ways in which folded panel 726 can be secured in a three-dimensional configuration, a preferred method is to employ tabs 724 and mating keyhole openings 725 cut into sheet 721 during formation of the bending slits.

Tabs 724a, for example, are provided by laser or water jet cutting of the tabs to extend outwardly of slit tongues from flange 729 into web 727a. When web 727a is bent downwardly and rearwardly to bend line 722b, tabs 724a remain in the horizontal plane of flange 729. As best seen in FIG. 21A, a mating opening 725 cut into chord 728b and aligned with tab 724a will allow tab 724a to be positioned in opening 725. If each tab 724 has an enlarged head or end 734, the tabs will lock or be captured by their mating openings 725, much as a jigsaw piece can capture or interlock with an adjacent piece. This interlocking resists separation of the tabs from the mating openings in the top and bottom planes of the panel. The tabs and openings do not need to be, and preferably are not, dimensioned to produce an interference fit.

Interlocking of tabs 724 and openings 725 also occurs along the bottom side of panel 726, and the result is securement of the folded panel in the form as shown in FIG.

20, even without additional securement techniques, such as adhesives, welding, brazing or the like, which optionally also can be used.

Figure 22:
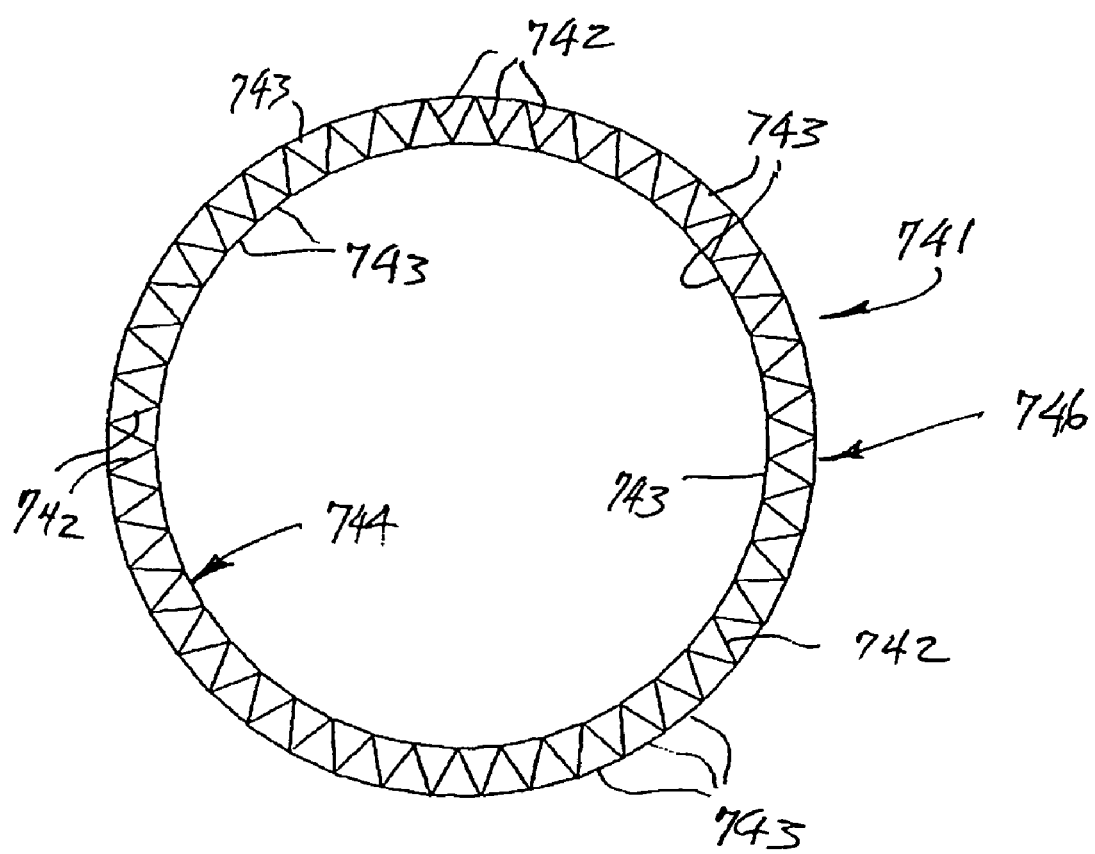
FIG. 22 is a schematic, end elevation view of a cylindrical member constructed using a corrugated sheet similar to that of FIGS. 19 and 20, scaled to define a cylindrical form.

In FIG. 22, the sheet slitting and bending process of FIGS. 19–21 is schematically shown as applied to the formation of a cylindrical member 741. Again, webs 742 and chords 743 are formed about bend lines and the locations of the bend lines selected so that the chords on the inner radius 744 are shorter in their length than the chords on the outer radius 746 of cylinder 741. Tabs and mating opening may be used to lock the chords and webs in the desired configuration, depending on the thickness of the material and the radii of cylinder 741. The resulting cylindrical structure can be used, for example, as a lightweight, high-strength column or post.

Figure 23:
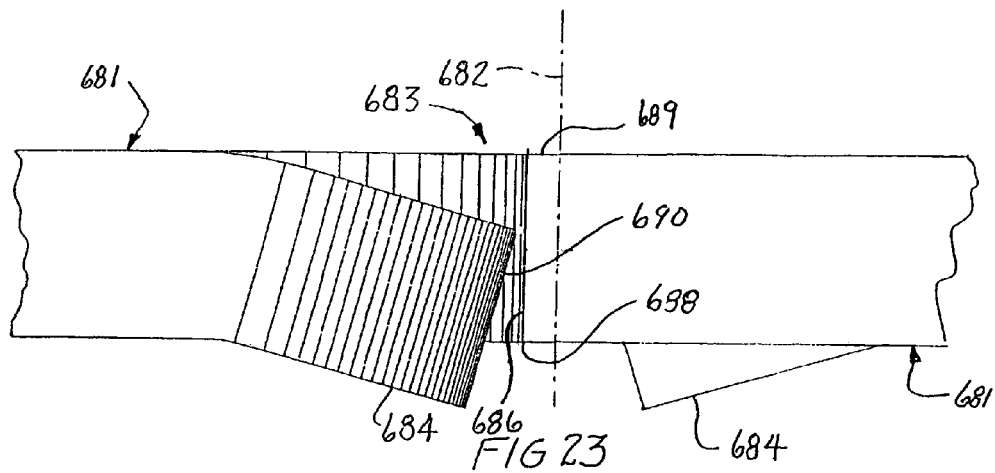
FIG. 23 is an enlarged, fragmentary, side elevation view of a sheet of material slit in accordance with the present invention and having a tongue or tab displaced to ensure predictable bending.

In most embodiments of the present invention, and particularly those in which the sheet of material has a substantial thickness, commencement of bending will automatically cause the tongue or tab portion of the slit to begin to slide in the correct direction against the face on the opposite side of the slit. When the sheet material is relatively thin and the kerf of the slit is small or zero, however the tab portions of the slit sheet occasionally will move in the wrong direction and thereby effect the precision of the bend. In order to remedy this problem, it is possible for the tongue portion of the slit to be biased in a direction producing predictable proper bending. This solution is shown in FIGS. 23 and 24A.

A sheet of material 681 is formed for bending about a plane of bend line 682 using the design and sheet slitting technique of the present invention. Arcuate slits 683 are formed which define tongues 684 that will slide along opposing faces during bending of the sheet about bend line 682.

Figure 23A:
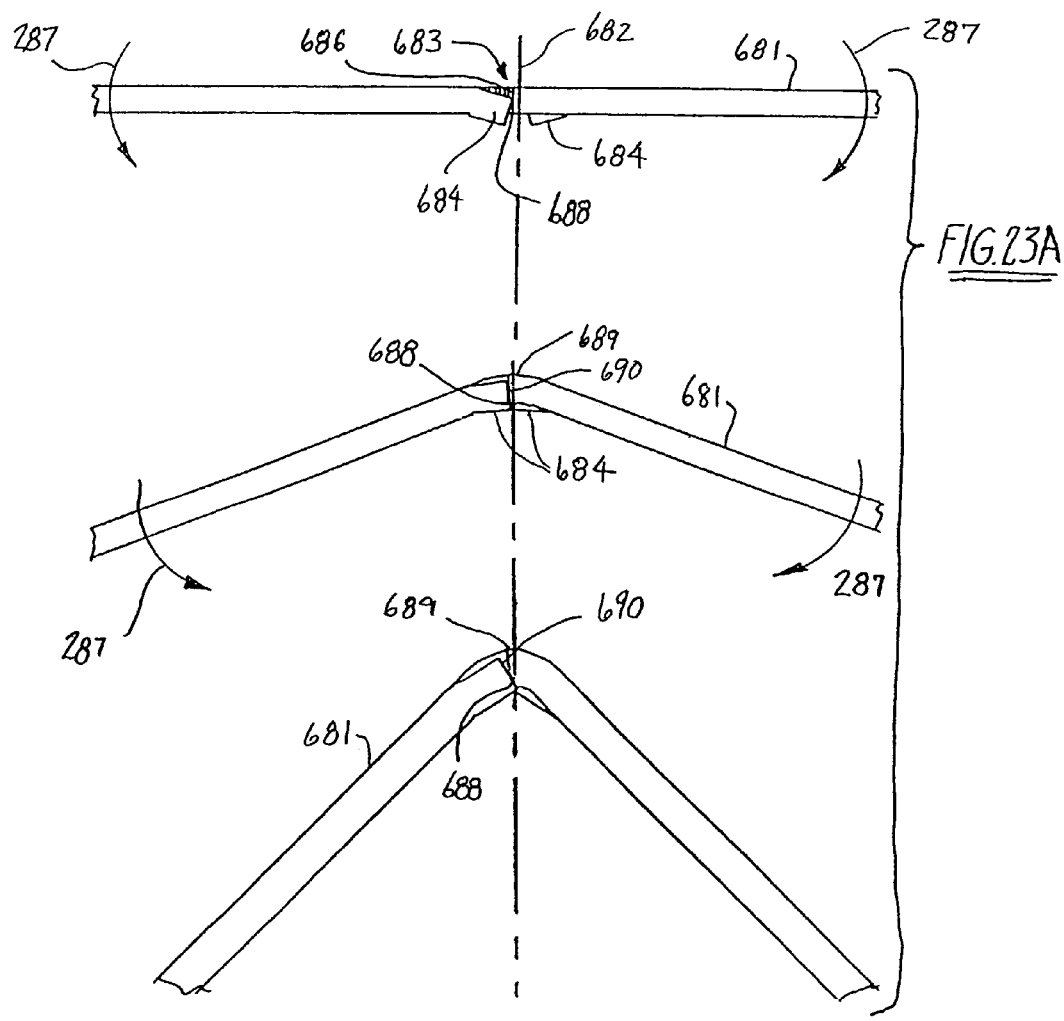
FIG. 23A is a reduced, end elevation view of the sheet of FIG. 23 during bending.

In FIG. 23a, sheet of material 681 can be seen as it is being bent in a downward direction, as indicated by arrows 687, about bend line 682. Because tongues 684 are downwardly displaced, the lower edges or corners 688 of lips 689 will tuck up and engage faces 690 of tongues in a manner which will produce sliding of edges 688 along faces 690. The edges 688 on each side of bend line 682 will be displaced upwardly to slide on the downwardly pre-set tongues 684 so that bending about bend line 682 predictably produces sliding of the edges along the faces of the tongues in the desired direction during the bending process.

When sheet 681 is formed for bending using, for example, a stamping process in which a knife forms slit 683, the stamping die can also plastically deform tongues 684 in a downward direction on side of the bend line. Predictable sliding of edge 688 along face 690 in the proper direction will occur during bending so that the actual fulcrums on opposite sides of the bend line will produce precise bending along the virtual fulcrum aligned with bend line 682. The displaced tongues also will cue an operator as to the proper direction for bending.

Figure 24:
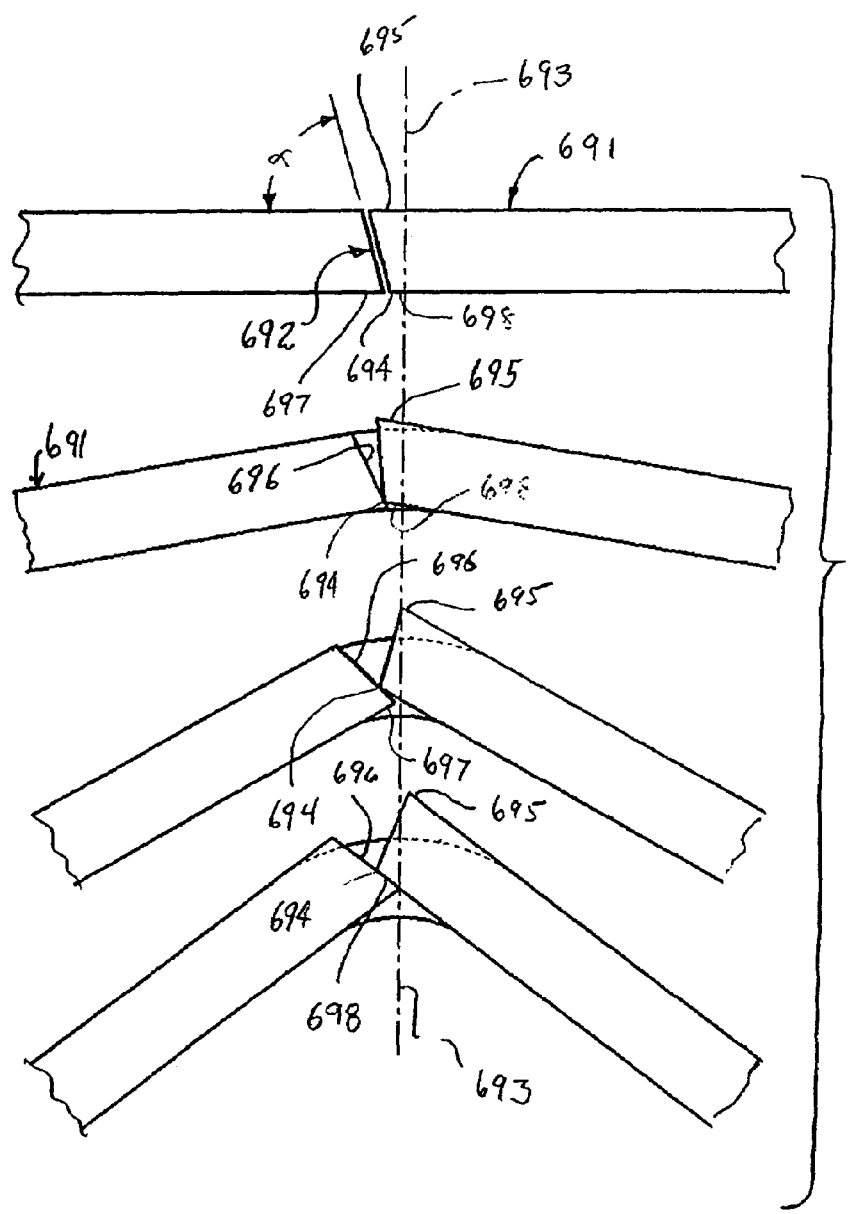
FIG. 24 is a fragmentary, end elevation view of a sheet of material slit at an oblique angle to the plane of the sheet and shown during bending a to a complimentary angle.

While many applications of the present invention will call for 90 degree bends, some will call for bends at other angles. The apparatus and method of the present invention can accommodate such bends while still maintaining the advantages of full edge-to-face contact. In FIG. 24, a bend of about 75 degrees is illustrated.

As shown, a sheet of material 691 is formed with a slit 692 which is cut at an angle of α of about 75 degrees to the plane of sheet 691. (A corresponding slit on the other side of bend line 693 also cut at 75 degrees but skewed in the opposite direction is not shown for simplicity of illustration.) Upon bending downwardly, lower edge 694 of lip 695 tucks onto and slides up face 696 of tongue 697. Once the bend reaches 105 degrees, or the complimentary angle to slit angle α, the lower surface 698 of the sheet proximate edge 694 will be coplanar with and evenly supported on face 696 of the tongue.

Today most commercial laser cutters with power capable of cutting both plastics and metals are sheet fed. There is, however, supply-roll fed laser cutting equipment commercially available, but such equipment that exists today does not roll the cut material back into a coil. Thus, reel-to-reel laser cutting equipment is not in use or commercially available.

The advantage of roll fed cutting combined with a coil mechanism, in the context of the present invention, is that very large or very complex, information-rich structures can be designed in CAD, cut, and then these pre-engineered structures can be recoiled into a compact form. Once in the coiled, compact form, they may be transported more conveniently, for example, on a flat-bed truck or rail car or launched into outer space. Upon arrival at the location of use, the material is uncoiled and bent or folded along the bend lines dictated and structurally supported by the arcuate slits and oblique straps cut into the metallic or plastic sheet.

The sheet slitting or grooving apparatus and method of the present invention can be incorporated into a reel-to-reel process in at least three ways. Widely available throughout industry are flat-bed laser cutters of many types. The first approach uses a coil on one end of a flat-bed laser cutter, the laser cutter in the middle and a winding roll for reforming a coil of partially cut material. The material is advanced through the system by hand and pin or edge-notch registration features are cut into the flattened sheet. The sheet is aligned in both X and Y axis by physically docking the cut features with a jig attached to the laser cutter bed. In this way, piece-wise advancement can occur including the alignment of slit-assisted bending features of the present invention. The novelty is in the combination of the registration system with the uncoiling and coiling of material-together with the application of cut bend-producing features of the present invention that enable low-force, precisely located, high strength bent or folded structures.

A second approach is to advance a coil through a laser cutter using the well-known technique of a power unwind, stop, cut and power rewind.

Figure 25:
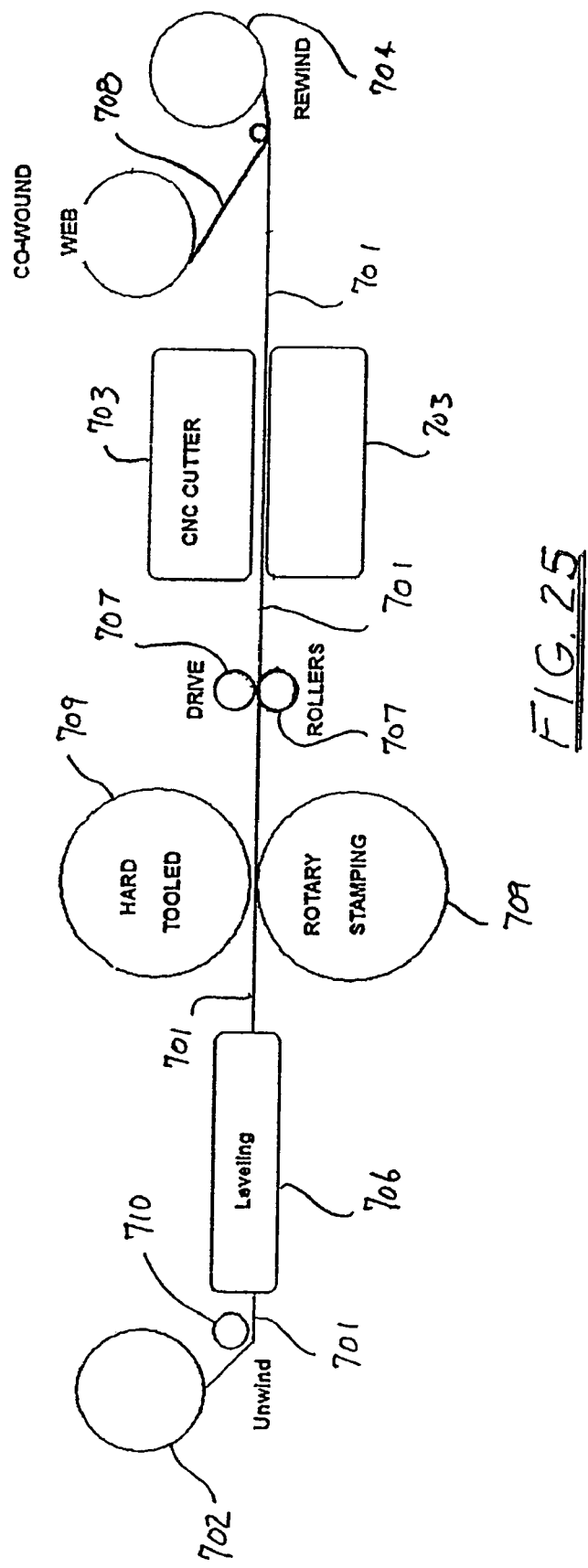
FIG. 25 is a side elevation, schematic representation of a reel-to-reel sheet slitting line arranged in accordance with the present invention.

A third approach is shown in FIG. 25. It employs a smooth, continuous web transport, with both unwind and rewind. Sheet material 701 is unwound from supply coil 702, and the motion and/or optics of the CNC cutter 703 is controlled to compensate for the rolling frame of material 701. CNC cutter 703 can be a laser cutter or a water jet cutter formed and controlled to cut the desired slit patterns into sheet 701. After cutting, sheet 701 is wound onto coil 704.

Since coiled sheet stock often will have a coil-set curl, the use of a leveling step or leveling apparatus 706 after unwinding coil 702 is an option. Sheet stock 701 can be driven through the processing line by pinch rollers 707 and drive motors at coils 702 and 704 and additionally at roller 710.

One reason that reel-to-reel processing has not been previously used is that the edges or contours of the cut-out features tend to interlock and snag as successive layers are would up on coil 704, particularly when the low-force slit-assisted bend features of the present invention enable a foldable tab or flap. The very act of recoiling material 701 will tend to make the cut tabs or flaps extend tangentially to the winding coil. Two methods can be used to address this issue. One is the use of thin, easily removed hang-tabs in combination with rewinding a coil of metal and other rigid materials that have these low-force folding features of the present invention that tend to extend from the rewound coil tangentially. A second method is shown in FIG. 25, namely, to co-wind a polymer web 708 onto coil 704. Web 708 should be tough and not easily punctured, yet thin in gage. Polypropylene and polyethylene are but two useful examples.

One technique for increasing the throughput of reel-to-reel processing systems is the use of laser cutter 703 having multiple laser beams for cutting the slit-assisted, low-force bend features of the present invention. Foldable box beams, such as is shown in FIG. 12, need several bend-assisting arcuate slits that are arranged parallel to the coil's winding direction, about a desired bend line. Multiple fiber lasers, for example, that are linked together mechanically and whose motion controller is a single, joined, mechanical system, with a single motion controller, can produce all of the parallel bends at the same time, while other lasers with independent motion actuation systems and motion controllers can produce all other cut features, such as the notched edges.

The methods and apparatus of the three reel-to-reel processing systems described above, combined with the low bending-force, high strength bend features of the present invention, enable a class of products, from beams, to ladders, to building stud and joist systems, to be formed, coiled, subsequently uncoiled and folded into deterministic dimensions of impressive structural integrity, when and where they are needed after compact storage or transport in coiled form. This technique has applications in space, in the military, in commercial and residential construction and many other industries where the costs and effort of getting materials to a site are prohibitively expensive and difficult when parts are already in an assembled state.

Optionally the reel-to-reel processing line of FIG. 25 can also include a pair of hard-tooled die cutters 709. Using male and female stamping shapes to stamp out the arcuate slits and drop-out features, the die cutters also can be plates and apply incremental material handling techniques, but most preferably, they are hard tooled rotary dies 709.

The advantage of the CNC cutting approach to fabricating coil-wound engineered folding structures is that non-repetitive features are easily programmed into the cutting process. The advantage of the hard tooled stamping or rotary die cutting approach, whether intermittent or continuous, is that repetitive features, especially the arcuate slits, can be efficiently made.

The greatest benefits of maximum throughput and flexibility may be advisable using CNC cutting in combination with the hard-tooled stamping/die cutting to yield an inline system with both forming steps located between the unwinding and rewinding steps of the process. In the combined system, such as shown in FIG. 25, each forming tool operates to its own advantage.

FIG. 25 illustrates a method can be used to form three-dimensional structures for use particularly at locations remote of the location at which the structure is slit and/or partially assembled prior to bending. One application is of particular interest is the fabrication of three-dimensional structures in outer space. Currently such structures are assembled in outer space from three-dimensional modules; they generally are not actually fabricated in outer space. The problem with space assembly is that the modules require an undesirable amount of volume in the payload of orbital space vehicles. Heretofore, one problem with fabrication in outer space has been that the tools required to form high-strength, three-dimensional structures have been prohibitively large and bulky. Another problem with assembly in space can be associated with a high part count and high fastener count. On the one hand, bulky near complete modules have been launched and fastened together. On the other hand, heretofore, dense packing of unassembled modules has resulted in a high part count and high fastener count.

Figure 26:
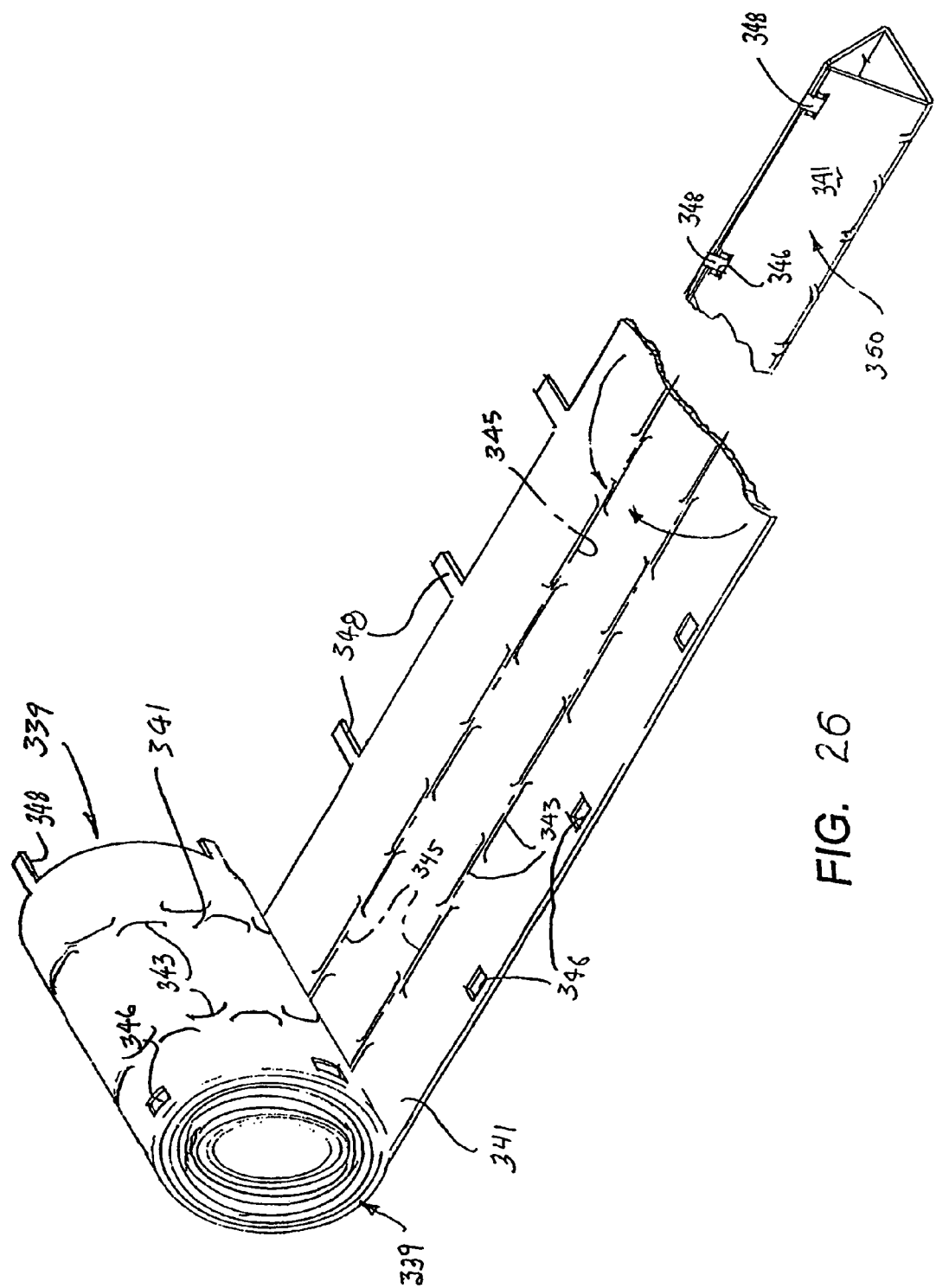
FIG. 26 is a top perspective view of a coiled sheet of material which has been slit, for example, using the apparatus of FIG. 25 and is in the process of being rolled out and bent into a three-dimensional structure.

In FIG. 26, a coil 339 of sheet material 341 is shown which has been designed and provided with slits or grooved on two bend lines 345. Sheet 341 is also formed with openings 346 and tabs 348 periodically positioned proximate opposed sheet edges. As will be seen, slits 343 may advantageously take the configuration as shown in FIG. 6. As will be appreciated, coil 339 is a highly compact configuration for the transport of sheet material. Sheet 341 can be formed with slits 243, openings 346 and tabs 348, as well as other desired structural features, at an earth-bound shop having unlimited fabrication equipment, for example, using the reel-to-reel processing line of FIG. 25. The coiled sheet is next transported by a space vehicle to an outer space location. Sheet 341 can then be unrolled from coil 339, and either, while being unrolled, or thereafter, the sheet can be fabricated, using hand tools or moderately powered tools, into a three-dimensional structure. Such fabrication is accomplished by bending the sheet along bend lines 345 and by bending tabs 348 into openings 346 so as to lock the sheet in a three-dimensional structure such as a triangular beam 350, as shown at the right-hand side of FIG. 26.

As shown in FIG. 26, structure 350 is an elongated beam with a triangular cross section can, in turn, be coupled to other structures to produce complex three-dimensional space structures and habitats. When the sheet bending slit configuration of the present invention is employed, each of the bends produced at the pattern of slits 343 will preferably include the edge-to-face support of the sheet material which will make the bends capable of withstanding substantial loading. Obviously, other beam and structural configurations, such as the box beam of FIGS. 13 and 14, the deck of FIG. 20 or the column of FIG. 22, can be produced by folding along bend lines having slits of the type described above. Moreover, using the slitting and grooving method and apparatus of the present invention ensures the precise positioning of the opposed edges of the sheet 341 and openings 346 and tabs 348 so as to enable closure of structure 350. If the structure to be formed needs to be fluid-tight and slitting is employed, the bends produced by slits 343 can be adhesively or otherwise filled, for example, by welding or brazing. It is also possible to provide numerous other closure configurations or fastening schemes, including welding along the abutting edges of sheet 341 and overlapping of an edge of the sheet with a side wall and the use of tabs and/or fasteners.

Figure 27A:
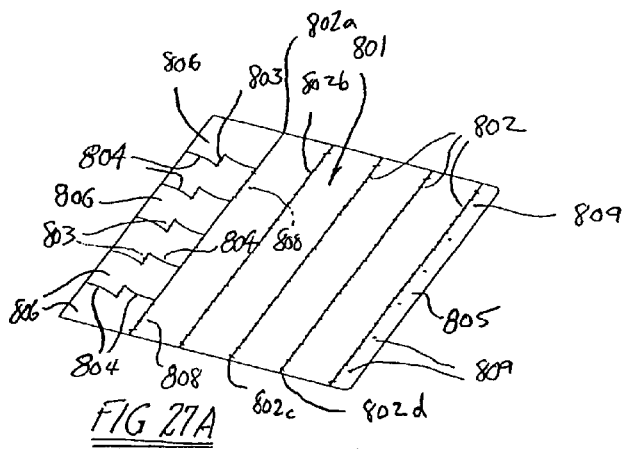
FIGS. 27A–27G are top perspective views of a sheet of material constructed in accordance with the present invention as it is being bent into a cross-braced box beam.

Another form of box beam which illustrates the flexibility of the apparatus and process of the present invention is shown in FIGS. 27A–27G, namely a cross or self-braced box beam. Sheet of material 801 is shown in FIG. 27A as being slit along bend lines 802 and 803. Additionally, a plurality of transverse slits 804 are provided which will be used to provide beam cross-bracing sheet portions 806. Bending of sheet 801 into a cross-braced box beam 807 9FIG. 27G) is shown in the sequence of FIGS. 27B–27G.

Figure 27B:
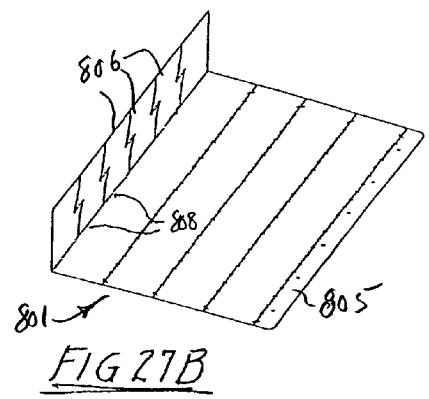
Figure 27C:
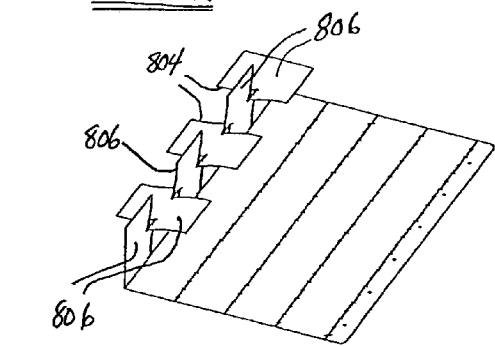
Figure 27D:
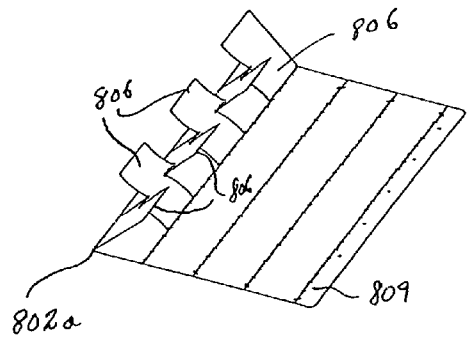
Figure 27E:
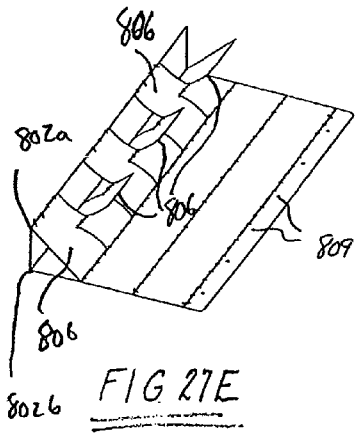
Figures 27F, 27G:
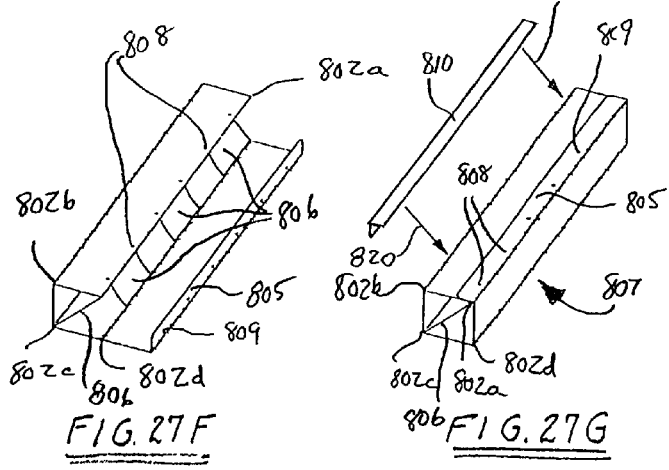

First, the side of the sheet having the cross-bracing sheet portions 806 can be bent to the position of FIG. 27B. Next, the sheet is bent along bend lines 803 to produce the cross braces 806 of FIG. 27C. Sheet 801 is then bent about bend line 802a to the position of FIG. 27D. The sheet is bent about bend lines 802b and 802c in FIGS. 27E and 27F, and finally side flange 805 is bent up and the sheet bent about bend line 802d to produce beam 807 of FIG. 27G. Fasteners can be placed in openings 808 and 809 (which are formed in aligned registered relation in sheet 801), such as rivets or screws, can be used to secure side flange 805 to the remainder of the box beam to produce a structure which will not bend or unfold. Beam 807 will be seen to trap or capture at its center an X-shaped cross-beam array extending along the beam to give it substantially enhanced strength. An extremely high-strength to weight, internally braced box beam, therefore, can be designed and formed from a single sheet of material using the process of the present invention.

As an optional step that can be added to many different structures formed using the apparatus and method of the present invention, protective corners or shin guards 810 (FIG. 27G) can be attached over bent corners 802 to effect a smooth and/or decorative corner treatment. Thus, L-shaped shin guard 810 can be added to beam 807, as indicated by arrows 820, and secured in place by, for example, adhesives or fasteners. Shin guards 810 can be metallic plastic or even reflective to produce decorative effects, as well as to provide impact protection, to smooth and/or to seal or pot the corner bends. Shin guard 810 could even encircle the beam or other three-dimensional structure. Attached shin guards can assist in load transfer across the bends.

In the cross braced box beam 807 of FIGS. 27A–27G, the cross bracing sheet portions 806 are bent to an "X" configuration and then captured or trapped within the folded beam to provide internal bracing. Another approach to the bracing of structures having adjacent walls in different planes is to employ swing-out sheet portions.

Figure 34:
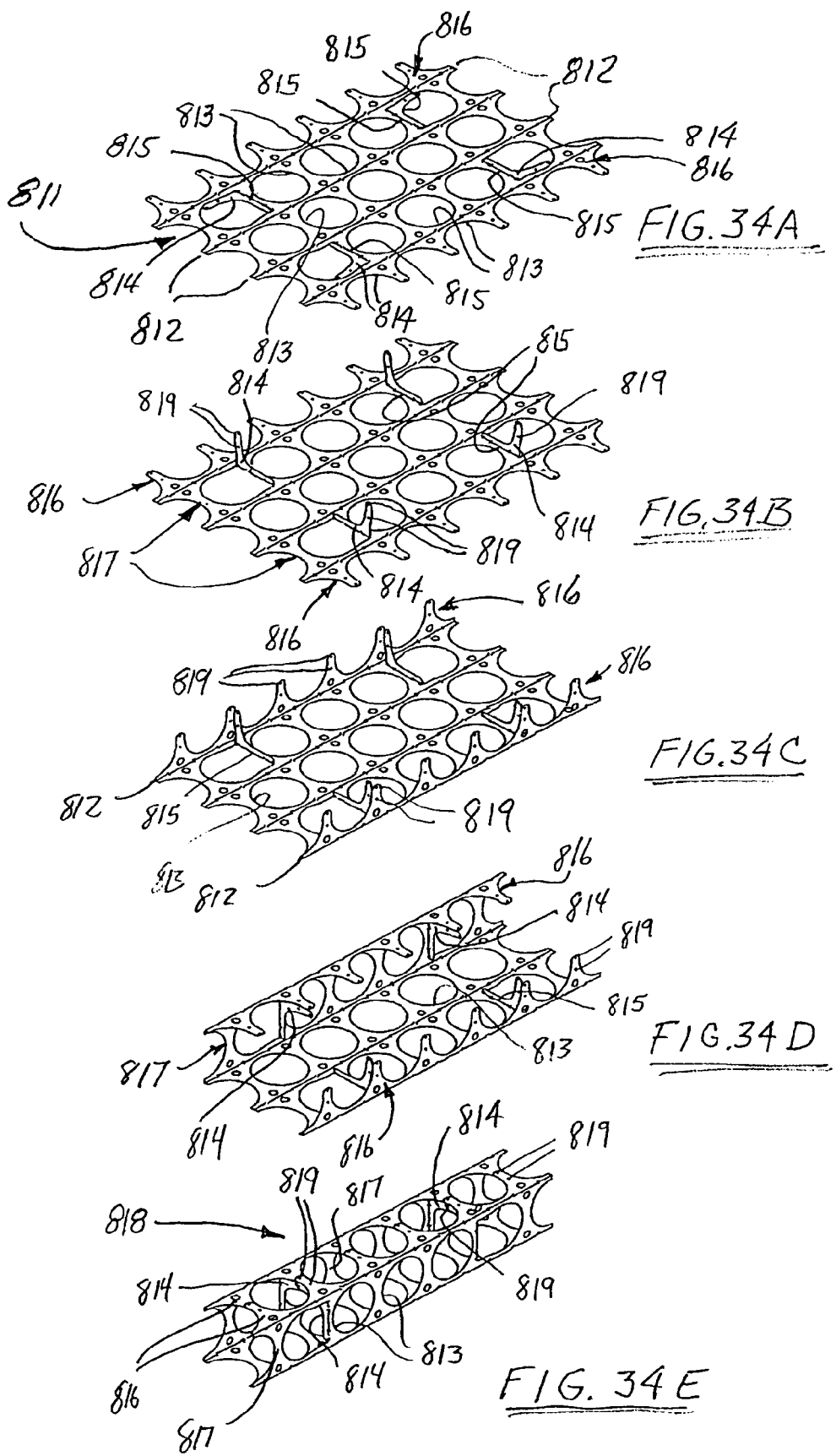
FIGS. 34A–34E are top perspective views of a sheet of material including swing-out bracing and shown as it is being bent into a swing-out braced box-beam.

FIGS. 34A–34E illustrate the use of swing-out bracing in another box beam that also has a pattern of weight-saving cutouts. In FIG. 34A, sheet 811 has been slit using the present invention with a plurality of bend lines 812. Sheet 811 has further been cut or stamped with cutouts or weight saving openings 813. Additionally, in order to provide bracing of the folded walls of the beam, a plurality of swing-out sheet portions 814 have been provided which can be bent around bend lines 815.

In FIG. 34B swing-outs 814 have been folded or swung out of the plane of sheet 811 around bend lines 815, while in FIG. 34C, the outside edges 816 of the sheet have been bent to a vertical orientation around bend lines 812. In FIG. 34D one side wall portion 817 of sheet 811 has been bent again around a bend 812, and in FIG. 34E the other side wall portion 817 has been bent around another bend line 812 to complete the box beam 818.

The last bending step, namely, bending from the configuration of FIG. 34D to that of 34E, causes edge portions 816 to overlap and causes swing-outs 814 to overlap. Both edges 816 and swing-out 814 can be provided with fastener-receiving openings 819 which will become aligned or superimposed as the beam is folded to the FIG. 34E condition by reason of the high precision or accuracy possible when employing the edge-to-face bending technique of the present invention. Thus, fasteners, such as rivets or screws, not shown, can be inserted into opening 819 to secure edges 816 together against unfolding of beam 819, and to secure swing-outs 814 together to provide bracing between mutually perpendicular walls of the beam, as well as bracing across the beam. As will be apparent, the number of bracing swing-outs can be increased from that shown in the illustrated embodiment, and the use of swing-outs to brace adjacent walls in different planes has application to many structures other than box-beams.

Turning now to FIGS. 29 and 30, the advantages of low-force sheet bending enabled by the present invention can be illustrated. In FIG. 29, a sheet of material 841 is shown which has a plurality of arcuate slits 842 formed along bend lines in a manner above described. Formation of box 843 from sheet 841 can be easily accomplished using low-force techniques.

Sheet 843 can be placed over opening 844 in die 846 and the four sides 847 of the box simultaneously bent to upright positions. An actuator driven plunger 848 can be employed or a vacuum source coupled to apply a vacuum to die 846 through conduit 849 used. Little or no clamping of sheet 841 to die 846 is required; only positioning of sheet 841 so that the bend lines are in mating relationship with opening 844 in the die. This can be accomplished, for example, by providing indexing pins (not shown) on the top surface of the die proximate the corners of opening 844. The indexing pins would engage sheet 844 at the apexes between sides 847 of sheet 841.

Depending upon the material being bent and its thickness, a negative pressure at conduit 849 will be sufficient to pull sheet 841 down into the die and thereby bend sides 847 up, or for thicker sheets and stronger materials, plunger 848 may also be used or required to effect bending.

Box 843 can be used, for example, as RFI shields for small circuit boards, such as the ones commonly found in hand-held cell phones, have been made by the prior art technique of progressive die stamping. The advantage of progressive die stamping is that sufficient precision can be achieved and it is suitable to low cost, mass production. However, with the rapid change in products that face this market, new shield designs require that the hard tooling be frequently replaced. This is especially problematic at the development end of the product life cycle where many changes occur before the final design is chosen. Another difficulty with relying on hard tooling is that the ramp-up to full production must wait until the hard tooling is available. This can be as much as eight weeks, which is very expensive in a market with rapid design changes and short product life. Yet another problem with the progressive die stamping has to do with accessibility to the underlying components for diagnostics or repair. If a significant fraction of a chip batch is faulty and may need repair, a two-piece RFI shield unit is employed with a low profile fence, soldered to the circuit and a "shoe box lid" covering it with an interference fit. This disadvantage is that the fence below take some horizontal "real estate" away from the circuit board and two pieces are always more expensive to manufacture than one. Another prior art solution to accessibility is the method of using a row of circular perforations in the shield lid that can be severed to allow an area of the lid to be hinged upward along one side. This perforated door approach crates the possibility of some RFI leakage and it is difficult to cut and reseal the lid.

Box 843 of FIG. 29 shows a solution to the aforementioned problems using the techniques of the present invention. The RFI shields manufactured using arcuate slit assisted bending methods can be rapidly prototyped without hard tooling using a CAD system for design and a CNC cutting process such as a laser cutter. Folding to the required shape can be readily accomplished by hand tools or the fabrication equipment of FIG. 29.

The ramp-up to full production can be accomplished immediately by laser cutting the initial production volumes required to enter the marker. Lower cost stamping tools to stamp out the biased tongue-tabs needed for the geometry disclosed can be fabricated during the ramp-up phase that initially is supplied by a CNC cut solution. In this way, the cost of design, ramp-up, and production can be lowered relative to the current practice of waiting for progressive cavity dies to be manufactured.

Another advantage of the present invention is the built-in access door for servicing the parts within. By severing the straps defined by slits 842 around three sides of shield 843, and having previously soldered edges 850 of the low profile rectangular box 843 to the circuit board, the panel 840 of box 843 can be hinged 90 degrees to allow for temporary service access. When repairs are complete, the lid or panel 840 can be closed again and re-soldered at the corners. Most metal alloys suitable for RFI shielding will allow for eight or more accesses in this manner before the hinged straps fail.

In FIG. 30 a series of steps is shown in which a sheet 861, which has been slit according to the present invention, can be popped up into a box using a pneumatic bladder or vacuum grippers.

Sheet 861 is shown in a flat form at the left side of the sequence of FIG. 30. Sheet 861 is, in fact, two identical sheets which have been coupled together at bend lines 826 at the outer edges of sides 863 of the sheets, as will become apparent as the box is formed. Sheet 861 can be transported in the substantially flat state shown on the left end of the sequence and then, at the use site, popped up to the three-dimensional box 865 shown at the right hand side of the sequence. This in-the-field formation of box 865 can be easily accomplished using pneumatics or hydraulics because the bending of sheet 861 requires only the minimal force necessary to bend the oblique bending straps.

One bending technique would be to employ suction or vacuum grippers 864 which are moved, as indicated by arrows 866, down into contact with a planar central sheet portion 867 of sheet 861. A vacuum is applied to suction grippers 864 and then the grippers are moved apart, as indicated by arrows 868 until box 865 is fully distended, as shown at the right hand side of FIG. 30.

Another approach is to insert an expansible bladder 869 into the slightly distended box, as shown by arrow 871. Such insertion can be accomplished before transportation or in the field. Bladder 869 is then inflated pneumatically or hydraulically and the box gradually distended or bent up to the condition shown at the right hand side of FIG. 30.

Box 865 can be secured in the configuration shown at the right hand side of FIG. 30 by, for example, welding, brazing or adhesively securing side panels 863 at corners 872.

A further advantage of the high precision bending or folding process of the present invention is that geometric information may be embedded in the planar material at the same time that the low-force, high precision bending structures are fabricated. This information may be accurately and predictably communicated into an anticipated 3D spatial relationship at very low cost.

In the past, symbols and geometric conventions have been used to convey information about the assembly of structures. One aspect of the present invention is that the bending or folding instructions may be imparted to the flat parts of the sheet material at the same time that they are formed with bending slits or grooves. Alternatively, folding instructions may be imparted to the flat parts through a secondary process such as printing, labeling, or tagging. Additionally, information may be embedded in the flat form that is intended to instruct the assembly process of similarly precision-bent structures or the adjoining of parts from non-folded prior art and future art fabrication methods.

For example, a continuous pre-engineered wall structured may be formed from a single sheet of material that is folded into top and bottom joists with folded-up studs. All anticipated windows, doors and electrical boxes can be embedded as physical geometric information in the flat part for subsequent folding and assembly into the building. A convention may be established that a round hole in the structure is indicative of electrical conduit that will later be threaded through the hole. A round-cornered square hole may be indicative of hot water copper pipe that should be passed through the wall. In this way, the feature is not only located in the flat part, but it is very accurately translated into correct 3D relationship, and finally, such conventions communicate to trades people, who are not involved with the structural erection of the building, where their activities intersect with the structure. Moreover, communication of such information anticipates the trades people's activity so that they do not have to modify and repair the structure as they thread their infrastructure through the building.

FIGS. 32A–32E illustrate an embodiment of a stud wall which can be folded out of a single sheet of material using the sheet bending method of the present invention. In FIGS. 32A–32E no attempt has been made to illustrate openings or the like which are precisely positioned and shaped to communicate information, but such data can be precisely located during the sheet slitting process. It should also be noted that the folded sheet of FIG. 32E can either be a stud wall with studs joined to joists or a ladder with rungs joined to side rails.

Turning to FIG. 32A, sheet of material 901 has been slit along a plurality of bend lines to enable formation of a stud wall or ladder structure. The slits are formed and positioned as taught herein.

In FIG. 32B the side wall portions 902 of eventual studs or ladder rung 903 have been folded up along bend lines 904 from flat sheet 901. The next step is to fold up an additional end wall or step portion 906 along bend line 907, as shown in FIG. 32C. In FIG. 32D the joists or ladder rails 908 are folded up along bend line 909, and finally the joists/rails 908 are folded again along bend line 911 in FIG. 32E. This last fold causes openings 912 in joist/rails 908 to be superimposed in aligned or registered relation to openings 913 (FIG. 32D) in side walls 902 of the studs/rungs 903. Fasteners, such as rivets or screws can be used to secure the joist/rails 908 to the studs/rungs 903 and thereby secure the assembly in a load bearing three-dimensional form 914.

When used as a ladder, rails 908 are vertically extending while rungs 903 are horizontal. When used as a stud wall, joists 908 are horizontal and studs 903 are vertically extending. As will be appreciated, the rungs/studs and rails/joists also would be scaled appropriately to the application.

As set forth above, most uses of the slitting process and slit sheets of the present invention will require that a plurality of slits be placed in offset relation along opposite sides of the desired bend line. This approach will produce the most accurate or precise sheet stock bends since three will be two opposed and spaced apart actual fulcrums that precisely cause the position of the virtual fulcrum to be between the actual fulcrums on the desired bend line.

While there is a very minor loss of bending precision, the technique of the present invention can also be employed using a single slit and bending straps configured to produce bending of the sheet of material along a bend line, while edge-to-face engagement of the sheet portions across the slit occurs. This single slit bending is illustrated in FIGS. 35 and 36.

Figure 35:
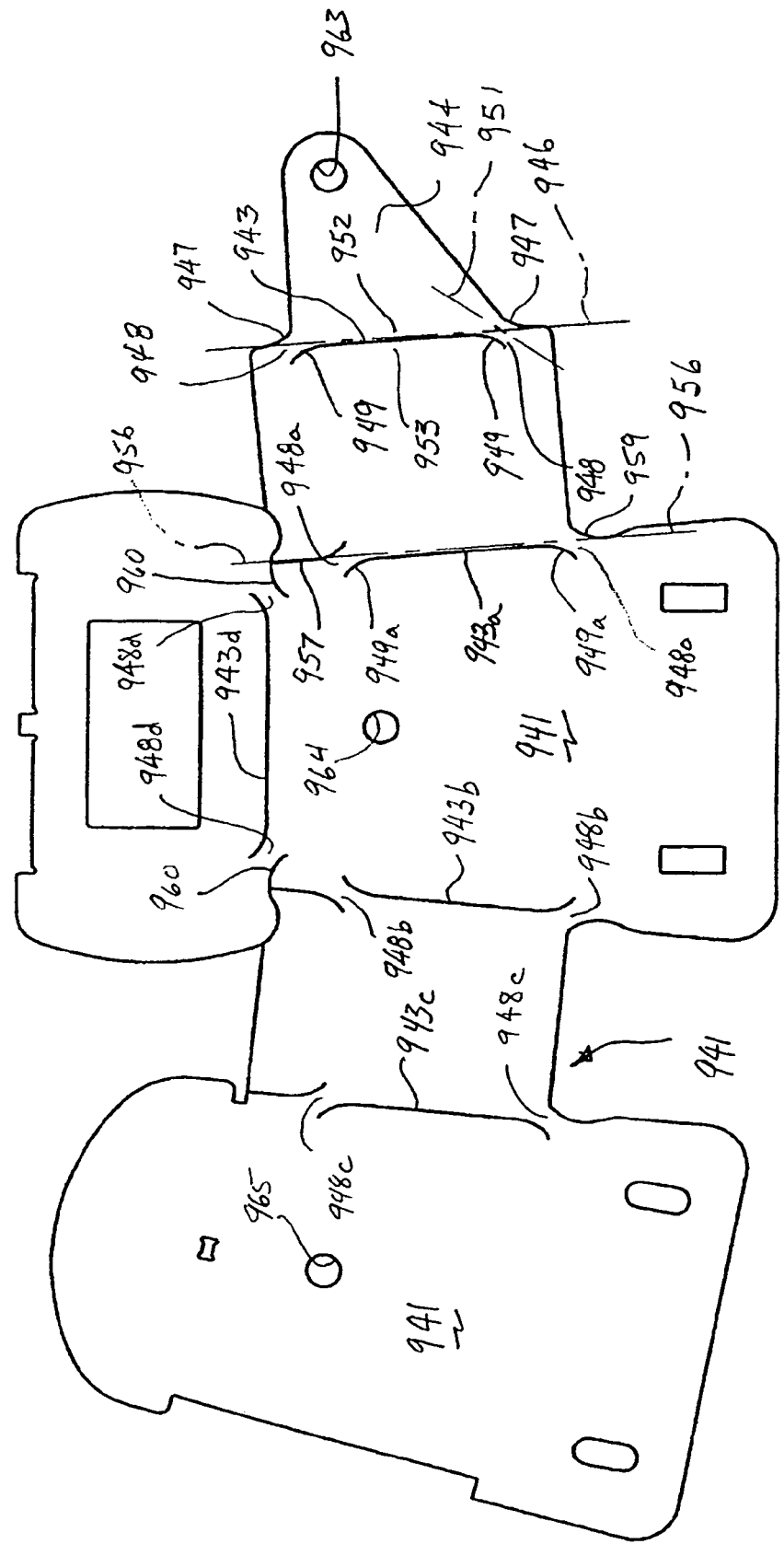
FIG. 35 is a top plan view of a sheet of material slit in accordance with the present invention and including a single slit embodiment
Figure 36:
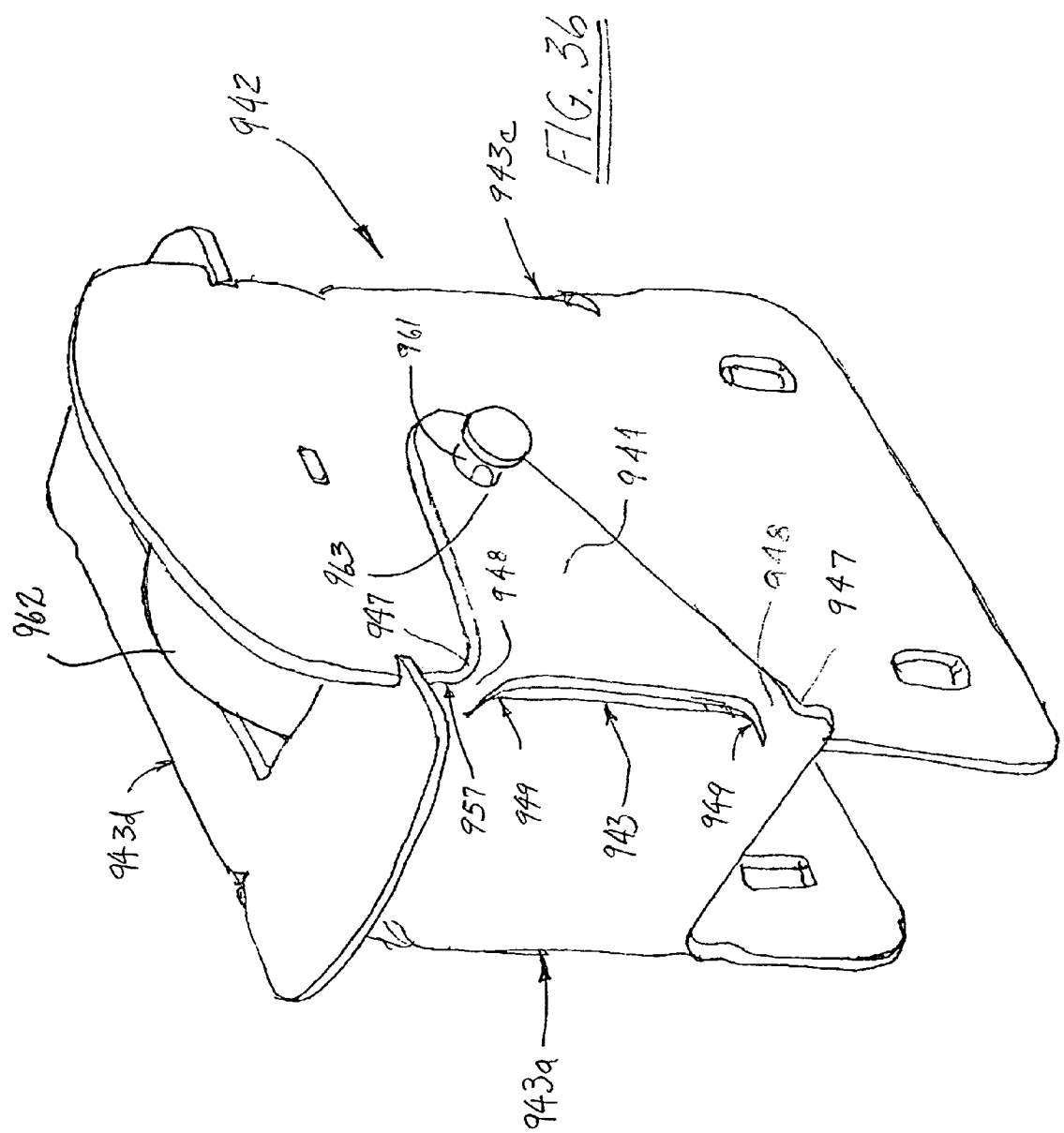
FIG. 36 is a top perspective view of the sheet of FIG. 35 as bent into a roller housing.

In FIG. 35 a sheet of material 941 is shown which has been slit for bending into a wheel roller housing, generally designated 942, as shown in FIG. 36. Sheet 941 includes a slit 943 for bending of ear 944 about bend line 946. As will be seen, there is no slit on the side of bend line 946 opposed to slit 943. Nevertheless, ear 944 includes two shoulders 947 that define bending straps 948 with arcuate end portion 949 of slit 943. It also will be apparent that the central axes 951 of bending straps 948 are oblique to bending line 946 in oppositely skewed directions.

When ear 944 is bent into the page for FIG. 35, oblique straps 948 will bend and twist and at the same time pull or draw lip 952 on the ear side of slit 943 up into engagement with the face of tongue 953 on the body side of the slit. Thus, sliding edge-to-face engagement again is produced by reason of oblique bending straps 948, correctly scaled and shaped.

Sheet 941 has other examples of arcuate bending slits which combine with partial opposed sits or edges of the sheet to provide bending straps that will produce edge-to-face bending. For bending line 956, for example, slit 943a is opposed at one end by a partial slit 957 having an arcuate end 958 that combines with arcuate end 949a to define an oblique bending strap 948a. At the opposite end of slit 943a an arcuate edge portion 959 combines with arcuate slit end 949a to define another oppositely skewed strap 948a.

The result of the configuration of straps 948a is edge-to-face bending about bend line 956.

Slit 943b is formed as a mirror image of slit 943a with an arcuate edge and partial slit cooperating to define oblique bending straps 948b. Similarly, slit 943c cooperates with an edge and partial slit to define oblique bending straps 948c that ensure edge-to-face bending. Finally, slit 943d cooperated with slit portions 960 to define obliquely oriented bending straps 948d.

The single slit embodiment of the present apparatus and method as illustrated in FIG. 35 is somewhat less precise in the positioning of the bend on desired bending line, but the loss of accuracy is not significant for many applications. In the structure illustrated in FIG. 36, an axle 961 for roller 962 passes through openings 963, 964 and 965 (FIG. 35) which must come into alignment when sheet 941 is bent into the three-dimensional housing 942 of FIG. 36. The single slit embodiment, therefore, will produce bends which are still sufficiently precise as to enable alignment of openings 963, 964 and 965 to within a few thousandths of an inch for insertion of axle 961 therethrough.

In FIG. 37, bend line termination or edge-effects related to the slitting process and apparatus of the present invention are illustrated. A sheet of material 971 is shown with five bend lines 972–976. Slits 981 are formed in the sheet along the bend lines as described above. The edge 982 of sheet 971 should be considered when designing the slit layout because it can influence the positioning of the slits.

On bend line 972 slits 981 were given a length and spacing such that a partial slit 981a opoens to edge 982 of the sheet of material. This is an acceptable bend line termination strategy. On bend line 973, partial slit 981b again opens to edge 982, but the partial slit 981b is long enough to include arcuate end 983 so that a bending strap 984 is present to oppose bending strap 986. Slit 987 can also be seen to have a rectangular opening 988 extending across the slit. Opening 988 is in the central portion of slit 987 and therefore will not significantly influence bending straps 984 or 986, nor will it effect edge-to-face bending.

On bend line 974, slit 981c has an arcuate end 989 which defines with sloping edge portion 991 an oblique bending strap 992. A similar geometry is shown for slit 981d and edge portion 993. The use of an edge of a sheet to partially define a bending strap is also employed in connection with the slits of FIG. 35, as above described.

Finally, on bend line 976 arcuate edge portion 994 cooperates with arcuate end 996 of slit 981e to define strap 997. Thus, the edge portion 994 requires a slit layout which inverts slit 981e from the orientation of slit 981d and illustrates that the finite nature of the slits requires that edge effects be considered when laying out the slits. In most cases, slit length can be slightly adjusted to produce the desired bend line termination or edge effect.

Figure 31:
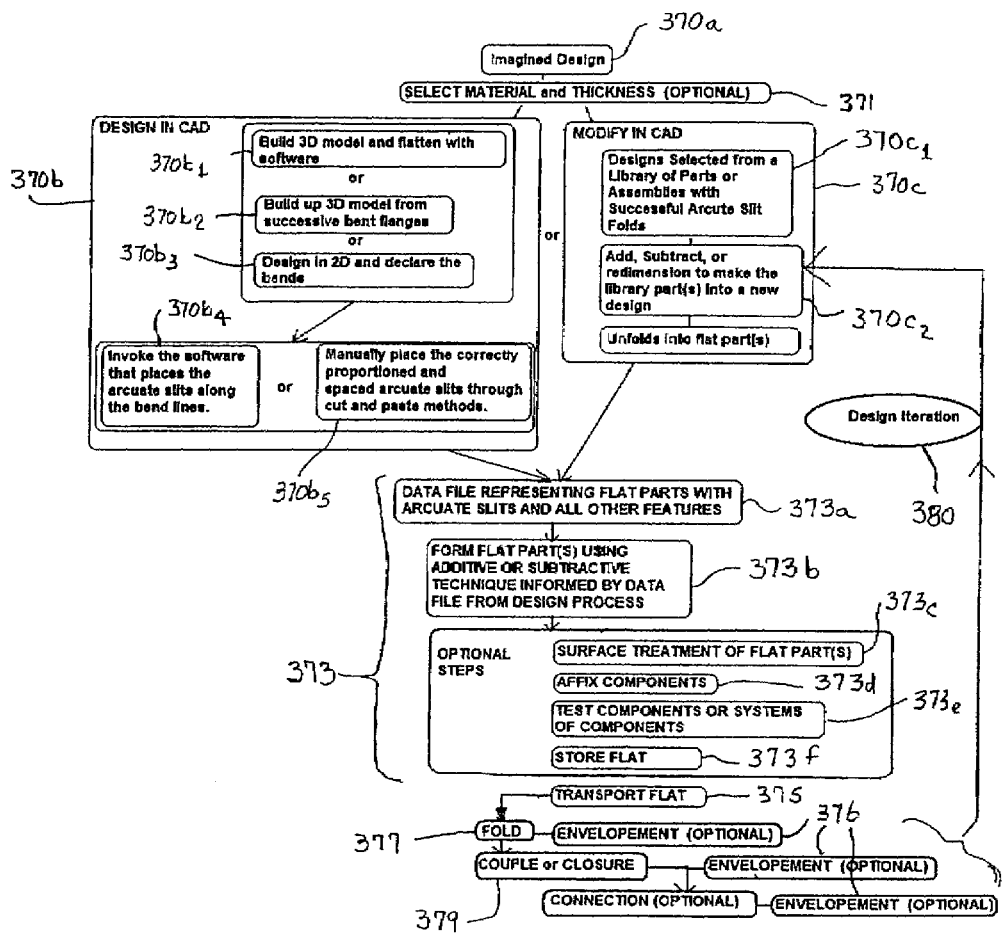
FIG. 31 is a flow diagram of one aspect of the interactive design, fabrication and assembly processes for slit sheet material bending of the present invention.
Figure 32:
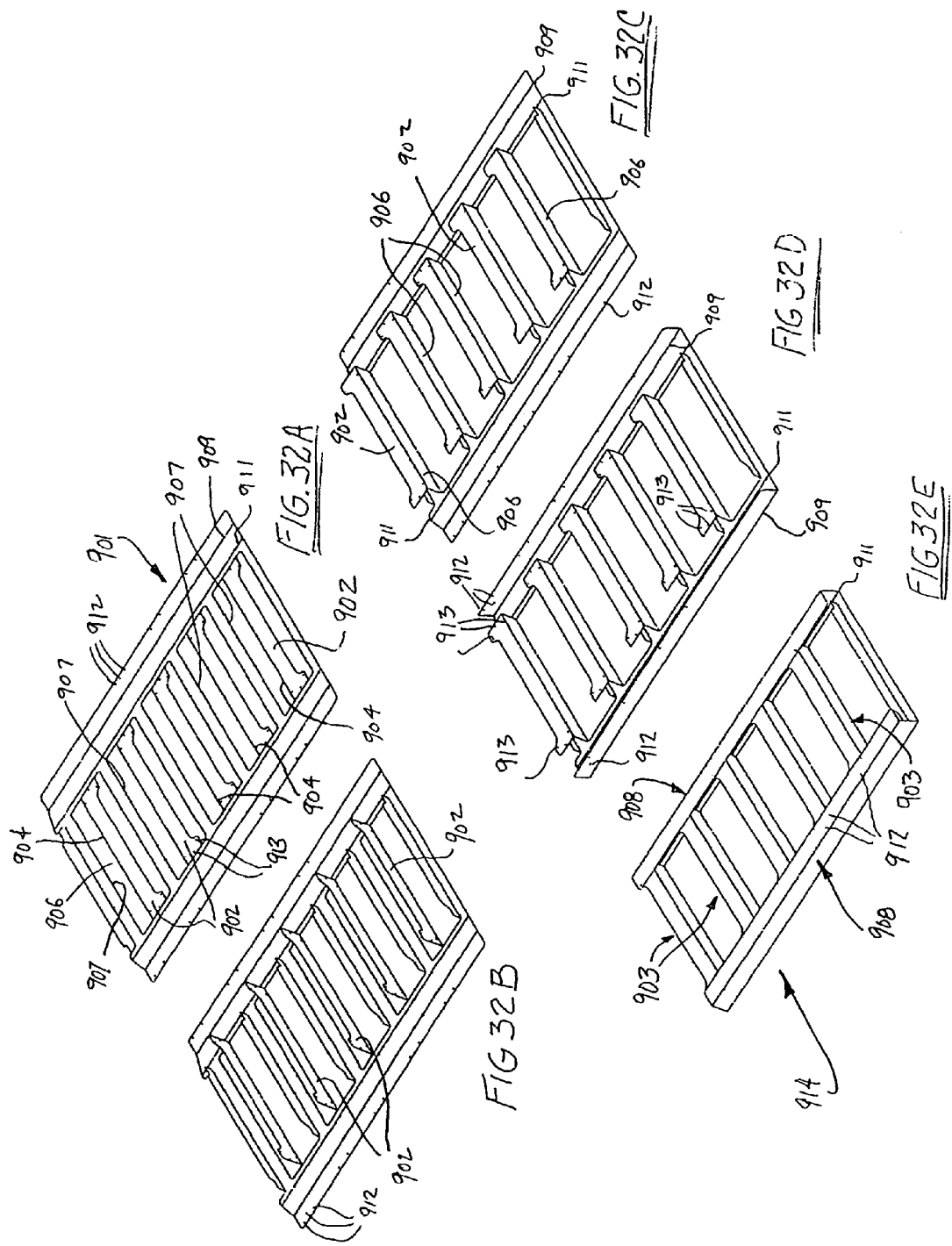
FIGS. 32A–32E are top perspective views of a sheet of material constructed in accordance with the present invention as it is being bent into a stud wall/ladder.

In a further aspect of the present invention, as schematically shown in FIG. 31, a method is provided for forming three-dimensional structures. The first step is designing the three-dimensional structure. This involves an initial sub-step 370a of imagining the design. Once conceptualized, designing will often, but not necessarily, proceed with a step 370b or 370c in which CAD or computer implemented designing takes place. The step 371 of selecting a sheet of material and its thickness optionally can occur before or during CAD design steps 370b or 370c.

As can be seen in FIG. 31, CAD design steps 370b and 370c can include various alternative sub-steps. Thus, a common approach is sub-step $370b_1$, in which the conceptual design is built in 3-D CAD and then flattened. Alternatively at step $370b_2$, the design can be built up by successively bending sheet flanges or portions. One can also design in 2-D and declare or locate the bend lines, which is sub-step $370b_3$. Placement of the proper or best-designed slits or grooves of the present invention can be done through software, at step $370b_4$ or manually at the step $370b_5$.

The design process of the present invention can also be based upon a selection, usually by computer or a CAD software program, at sub-step $370c_1$ among a plurality of stored designs and/or parts. The CAD system can then, at sub-step $370c_2$, modify the selected part to achieve the new or desired design, if modification is required. Finally, at sub-step $370c_3$ the part is unfolded by the software into a flat state.

Once designed, the next step is a slitting or grooving step 373, preferably by employing a CNC controller to drive a sheet stock slitting apparatus. Thus, at sub-step 373a data, representing the flat part and the designed slits or grooves, are transferred from the CAD or CAM systems to a CNC controller. The controller then controls slitting and other formation steps for the cutting and fabricating equipment. At sub-step 373b, therefore, the flat part is formed using additive (molding, casting, stereo lithography) or subtractive (slitting, cutting) or severing (punching, stamping, die cutting) fabrication technique.

Optionally, the formed flat sheet can also undergo such steps as surface treatment 373c, affixation of components 373d, testing $373e_4$ and storage 373f, usually in a flat or coiled condition.

Often a transportation step 375 will occur before the sheet material is bent or folded at step 377. The slit sheet stock is most efficiently transported from the fabrication site to a remote bending and assembly site in a flat or coiled condition.

Bending or folding 377 is precise and low-force. For most structures bending occurs along a plurality of bend lines and often continues until two portions of the sheet are abutting, at which point they can be coupled together at the abutting portions of the sheet to produce a rigid load-bearing three-dimensional structure at step 379. Optionally, the structure can be secured in a three-dimensional, load bearing configuration by an enveloping step, which couples the folded part together by encircling it.

Envelopment can be used for at least three strategies. In the present invention, the angle of a fold is not informed by the geometry of slits that form it. (Notwithstanding the technique of using a slit tilt angle to affect maximum contact area of edge to face engagement for a particular angle of folding, as shown in FIG. 24.) The angle of each fold is generally dictated by at least three interlocking planes. In some cases there is no opportunity to interlock three orthogonally independent planes, so an alternate method of defining a restricted rotational angle is needed. One method is to fold the structure against a reference structure of known angular relationship and lock the angle(s) into place by methods of adhesive(s), brazing, welding, soldering, or attaching structural shin guards to the inside or outside of the fold. Another method is to use an interior structure of defined angular form and bend the structure around it, that is to envelop the interior structure. This second method is referred to in the design and fabrication process diagram of FIG. 31, by reference numeral 376*a,b*. In this embodiment of envelopment, the interior part may be left in place (376*b*) or in some cases, it aids in the folding process only and is subsequently removed (376*a*).

Another use for envelopment is to capture, which is the process of docking together a folded sheet structure of the present invention with a functional part that may or may not be formed by the present invention, by enfolding or enveloping parts or modules within another structure. For example, FIG. 16 illustrates but one of many "capture" opportunities of the enabling feature of envelopment in the present invention 376*b*. Thus, column 631 is enveloped by folded sheet 611.

Yet another class of envelopment can occur, when connections are made between two or more modules of folded plate construction of the present invention, or between two or more components that include at least one structure of folded plate construction of the present invention. The three-dimensional positional accuracy of features formed in a planar material of the present invention, combined with the enveloping nature of the closure or coupling process, enable a method of joining together multiple pieces with a very high rate of success that does not require secondary cut and fit adjustments. This is distinct from the capacity of the present invention to align fastening features, such as holes, tabs and slots. It is a method of joining together by wrapping around.

The process of the present invention can also include an iterative step 380. The ability to create low-cost three-dimensional parts using the present method affords the designer the practical luxury of being able to tweak the design before settling on a production design.

The slit-base bending method and apparatus of the present invention are capable of highly precise bending tolerances. The original slits can be laid out with extreme precision using a CNC machine to control, for example, a laser, or water jet cutter, stamping or punching die, and the bends which are produced will be located with ±0.005 inches tolerance while working with macroscopic parts. This is at least as good or better than can be achieved using a press brake and a highly skilled operator. One additional advantage of using a stamping die is that the die can be wedge-shaped to compress the slit transversely or in the kerf width direction. This will compress the sheet material locally at the slit for better fatigue resistance. Such transverse compression also must be considered when designing a kerf width to produce edge-to-face contact during bending. It also is possible to follow laser or water jet cutting by a transverse compression of the slit with a wedge shaped stamping die to enhance fatigue resistance.

Moreover, when using the bending scheme of the present invention, the tolerances errors do not accumulate, as would be the case for a press brake. Alternatively, the slits or grooves can be cast or molded into a sheet of material or cast three-dimensional member having a sheet-like extension or flap that needed to be folded. While working with materials of near microscopic or microscopic dimensions, other forming methods commonly used in the field of microelectronics and MEMS such a e-beam lithography and etching may be used to effect the required geometry of the present invention with extreme accuracy.

Rather than manipulating a laser beam (or sheet of material) to produce curved grooves or slits, such beams can also be optionally controlled or shaped to the desired configuration and used to cut grooves or slits without beam movement. The power requirements presently make this most feasible for light guage sheets of metals or plastics.

Fabrication techniques in the method of the present invention also may include steps such as deburring the slits or grooves, solvent etching, anodizing, treating to prevent surface corrosion, and applying compliant coatings, such as paints, polymers, and various caulking compounds.

From the above description it also will be understood that another aspect of the method for precision bending of a sheet material of the present invention includes the step of forming a plurality of longitudinally extending slits or grooves in axially spaced relation in a direction extending along and proximate a bend line to define bending strap webs between pairs of longitudinally adjacent slits. In one embodiment, the longitudinally extending slits are each formed by longitudinally extending slit segments that are connected by at least one transversely extending slit segment. In a second embodiment, the slits or grooves are arcs or have end portions which diverge away from the bend line to define bending straps, which are preferably oblique to the bend line and increasing in width. In both embodiments, the straps can produce bending about virtual fulcrums with resulting edge-to-face engagement of the sheet material on opposite sides of the slits. The number and length of the bending straps webs and slits or grooves also can be varied considerably within the scope of the present invention. The width or cross sectional area of the bending straps and the transverse divergence of the straps also can be varied independently of the transverse spacing between slits. An additional step of the present method is bending of the sheet of material substantially along the bend line across the bending web.

The method of the present invention can be applied to various types of sheet stock. It is particularly well suited for use with metal sheet stock, such as aluminum or steel, which can have substantial thickness and a variety of tempers (for example, 2 inch carbon steel, 6061 aluminum with a T6 temper, some ceramics and composites). Certain types of plastic or polymer sheets and plastically deformable composite sheets, however, also may be suitable for bending using the method of the present invention. The properties of these materials are relative to a given temperature and fluctuations in temperature may be required to make a particular material suitable in the context of the present invention. The present method and resulting sheets of slit material are particularly well suited for precision bending at locations remote of the slitter or groover. Moreover, the bends may be produced precisely without using a press brake.

Sheet stock can also be press brake bent, as well as slit or grooved, for later bending by the fabricator. This allows the sheet stock to be shipped in a flat or nested configuration for bending at a remote manufacturing site to complete the enclosure. Press brake bends can be stronger than unreinforced slit bends so that a combination of the two can be used to enhance the strength of the resulting product, with the press brake bends being positioned, for example, along the sheet edges. The slit or grooved bends can only be partially bent to open outwardly slightly so that such sheets can still be nested for shipping.

The bent product has overlapping edge-to-face engagement and support. This enhances the ability of the product to withstand loading from various directions without significant stressing of the bending straps. If further strength is required, or for cosmetic reasons, the bent sheet material can also be reinforced, for example by welding or otherwise attaching a shin guard or bent sheet along the bend line. It should be noted that one of the advantages of forming slits with essentially zero kerf, is that the bent sheet has fewer openings therethrough along the bend line. Thus, welding or filling along the bend line for cosmetic reasons is less likely to be required.

Figure 33:
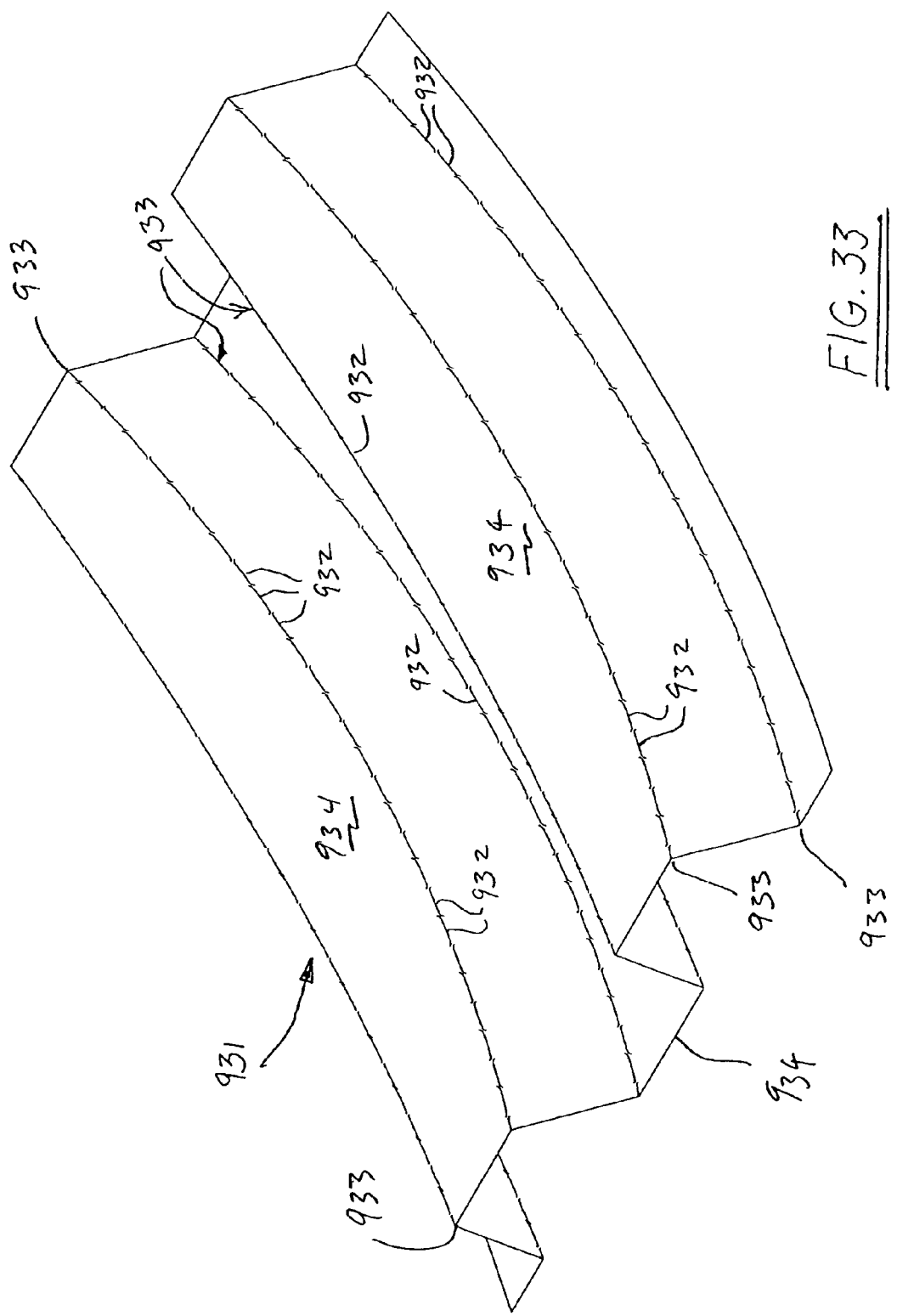
FIG. 33 is a top perspective view of a curved corrugated deck or panel constructed in accordance with the present invention.

It will be noted that while straight line bends have thus far been illustrated, arcuate bends can also be achieved. One technique for producing curved bend lines is shown in FIG. 33, namely, to layout identical-strap-defining structures along a curved bend line so the virtual fulcrums fall on the desired curved centerline.

Sheet 931 has been slit with identical slits 932 which are positioned on opposite sides of curved bend lines 933 and folded into a corrugated panel. Slits 932 are shown as having a form similar to the sits of FIG. 6 with a central portion that is linear and diverging or curving away end portions. Slits 932, however, are laid out bend lines. As radius of curvature of bend lines 933 decreases, the length of slits 932 along bend lines 932 can be shortened to better approximate the curve.

It should be noted that the corrugated sheet 931 has a hat-shaped cross section which is often found in roll formed corrugated panels. When used as a decking structure, this construction is not as desirable as the continuous panel of FIG. 20, because chord sheet portions 934 only comprise about one-half the overall panel mass, but in other applications it has advantages and requires less material.

A second technique is to use non-identical strap-defining slits to shape the bending straps to produce a smooth curved bend. The bent sheet will have curved surfaces on both sides of the bend line. If stepped slits are used, the longitudinally extending slit segments can be shortened.

The distribution and width of bending straps may vary along the length of a given bend-line for a variety of reasons including a variation in the trade-off between the local force required for bending and the residual strength of the unreinforced bend. For example, adjacent features that may be opportunistically formed at the same time as the bending straps of the present invention may approach the bend-line so closely that the nearest bending straps are best formed with less frequency near the approaching feature or with thinner straps to maintain planarity of the bent material.

Finally, the bent structures of the present invention can be easily unbent. This allows three-dimensional structures to be disassembled or unfabricated for transport to another site or for recycling of the sheet material. It has been found that the bent sheet material can often be straightened out, or even subject to a bend reversal, and thereafter re-bent through 5 to 10 or more cycles. This allows bending or fabrication of a structure at one site and then unbending, transportation and re-bending at a second site. The ease of unbending also enables structures to be unbent and sent to a recycling center for reuse of the sheet material and removed components.

For convenience in explanation and accurate definition in the appended claims, the terms "up" or "upper", "down" or "lower", "inside" and "outside" are used to describe features of the present invention with reference to the positions of such features as displayed in the figures.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

In the claimed:

1. A method of slitting a sheet of material for bending along a bend line comprising the step of:
   forming a plurality of slits through the sheet of material which are positioned relative to the bend line and configured to produce bending along the bend line wit edge-to-face engagement of the material on opposite sides of the slits during bending of the sheet of material.

2. The method as defined in claim 1 wherein,
   during the forming step, fanning the slits as arcuate slits alternating on opposite sides of the bend line with convex sides of the arcuate slits closest to the bend line.

3. A method as defined in claim 1 wherein,
   during the forming step, each slit is formed with slit end portions diverging away from the bend line, with a pair of longitudinally adjacent slit end portions on opposite sides of the bend line defining a bending strap extending across the bend line, and during the forming step, forming the slits with a kerf width dimensioned and transverse jog distance between slits producing interengagement of the sheet of material on opposite sides of the slits during bending.

4. The method of slitting a sheet of material for bending as defined in claim 3 wherein,
   the forming step is accomplished by forming the slits wit slit end portions defining a bending strap extending obliquely across the bend line.

5. The method as defined in claim 3, and
   the step of varying the cross sectional area of the bending strap by changing at least one of the jog distance between slits and the position of the slits along the bend line.

6. The method of slitting a sheet of material for bending as defined in claim 1, and the step of:
   prior to the forming step, selecting a solid sheet of elastically and plastically deformable material for slitting.

7. The method of slitting a sheet of material for bending as defined in claim 1 wherein,
   the forming step is accomplished by forming each of the slits in a position to longitudinally overlap along the bend line; and
   forming each slit with an arcuate end portion at each end of the slit to define an obliquely extending bending strap between the end portions of longitudinally adjacent slits.

8. The method of slitting a sheet of material for bending as defined in claim 7 wherein,
the forming step is accomplished by forming the slits to be laterally offset on opposite sides of the bend line with central slip portions substantially parallel to the bend line.

9. The method of slitting a sheet of material for bending as defined in claim 1, wherein
the forming step is accomplished by forming a plurality of slits as defined in claim 1 on opposite sides of the bend line along substantially the full length of the bend line.

10. The method of slitting a sheet of material for bending as defined in claim 1, and the step of:
after the forming step, bending the sheet of material about the bend line.

11. The method as defined in claim 10 wherein,
during the fanning step, forming a plurality of slits on each of a plurality of intersecting bend lines;
during the bending step, bending the sheet of material along at least two bend lines to produce a structure having three mutually intersecting and abutting planar sheet panels; and the step of:
securing the three mutually intersecting panels in abutting relation for mutual support.

12. The method as defined in claim 10, and the step of:
after the bending step, filling the bent sheet of material at the slits by one of a welding, brazing, soldering, potting and adhesive filling step.

13. The method of slitting a sheet of material for bending as defined in claim 1 wherein,
the forming step is accomplished at a first location, and the steps of:
after the forming step, transporting the sheet of material from the first location to a second location remote of the first location; and
after the transporting step, bending the sheet of material along the bend line at the second location.

14. The method of slitting a sheet of material for bending as defined in claim 13 wherein,
the transporting step is accomplished by transporting the sheet of material in one of:
(a) a flat condition;
(b) a coiled condition; and
(c) a partially formed condition.

15. The method of slitting a sheet of material for bending as defined in claim 13 wherein, alter the forming step and prior to the transporting step, rolling the sheet of material into a coil, performing the transporting step while the sheet of material is coiled, and the step of:
uncoiling the sheet of material at another location prior to performing the bending step.

16. The method of slitting a sheet of material for bending as defined in claim 15, and the step of:
during the uncoiling step, performing the bending step.

17. The method as defined in claim 16 wherein,
the transportation step is accomplished by transporting the coiled sheet of material from a first location on the surface of the surface of the earth to a second location in outer spare.

18. The method as defined in claim 17 wherein,
the bending step is accomplished by bending the sheet of material along a plurality of bend lines to produce a structure having three mutually intersecting planes; and the step of
securing the structure against unbending.

19. The method as defined in claim 1 wherein,
the interior side of the bend has substantially no radius of curvature along substantially the entire length of the bend line.

20. The method as defined in claim 1 wherein,
bending stresses in the sheet are localized in close proximity to the bend line and deformation of the structural feature is minimized.

21. The method as defined in claim 20 wherein,
the positioning step is accomplished by positioning the bend line in close proximity to an opening in the sheet of material.

22. The method as defined in claim 1, and the step of:
bending the sheet of material along the bend line to produce plastic deformation of bending straps between the bend-inducing structures with low residual stress in the bending straps.

23. The method as defined in claim 22 wherein,
during the forming step, forming the bend-inducing structures to define bending straps between the bend-inducing structures having center lines oriented obliquely to the bending line; and
during the bending step, bending and twisting the bending straps to produce the strain and plastic deformation of bending straps.

24. The method as defined in claim 22 wherein,
during the forming steps, the adjacent bend-inducing structures are formed to be longitudinally overlapping along the bend line, and the bend-inducing structures are formed with a length dimension and bending straps are formed between the bend-inducing structures having a width dimension substantially less than the length dimension of the bend-inducing structures.

25. The method as defined in claim 1, and the steps of:
bending the sheet of material along the bend line to produce a prototype product having substantially no radius of curvature on an interior side of the bend; and
using the prototype product to design a commercial product by scaling the commercial product from the prototype product and employing a plurality of bend-inducing structures along the bend line of the commercial product positioned in laterally spaced relation on alternating sides of the bend line at positions producing edge to face engagement of material on opposite sides of the bend-inducing structures and on opposite sides of the bend line during bending.

26. The method as defined in claim 1, and the step of:
bending the sheet of material along the bend line whereby the residual elastic stress in the bending straps pulls the sheet material on opposite sides of the bend line together to produce a preloaded bend across the bend line and enhanced bend stiffness and vibration and fatigue resistance.

27. A method of slitting a sheet of material for bending along a bend line comprising the step of:
forming a plurality of slits through the sheet of material which are positioned relative to the bend line and configured to produce bending along the bend line with edge-to-face engagement of the material on opposite sides of the slits during bending of the sheet of material;
wherein the forming step is accomplished by forming the slits with a kerf producing sliding of edges on one side of the slit on faces on the other side of the slit during bending to position the edges in supporting relation to the faces of the sheet of material on opposite sides of the slits during bending.

28. The method of slitting a sheet of material for bending as defined in claim 27, and the step of:
  after the forming step, bending the sheet of material about a virtual fulcrum aligned with the bend line to produce plastic and elastic deformation of the bending strap.

29. A method of bending a sheet of material formed for bending along a bend line comprising the step of:
  forming a slit through a sheet of material, said slit being positioned relative to a desired bend line and being configured to produce bending of the sheet of material along the bend line with edge-to-face engagement of the sheet of material on opposite sides of the slit during substantially the entire bend of the sheet of material.

30. The method of claim 29 wherein,
  the forming step is accomplished by forming said slit having end portions, each of said end portions defining one side of a bending strap extending obliquely across the bend line.

31. The method of claim 30 wherein,
  said slit is arcuate with a convex side, said convex side of said slit being closest to the bend line.

32. The method of claim 29 wherein,
  the forming step is accomplished by forming the slit proximate an edge of the sheet of material so that the edge and an arcuate end of the sheet of material define a bending strap.

33. A method of designing a sheet of material for bending along a bend line comprising the step of;
  laying out a slit on a sheet of material, said slit being positioned relative to a desired bend line and configured to define with a structure on the sheet, a bending strap at each end of the silt oriented to produce edge-to-face engagement of the sheet of material on opposite sides of a slit upon bending of the sheet of material during substantially the entire bend of the sheet of material.

34. The method of claim 33 wherein,
  the laying out step is accomplished by forming said slit having end portions, each of said end portions defining a bending strap that extends obliquely across the bend line in oppositely skewed directions that converge on a far side of the bend line from the slit.

35. The method of claim 34 wherein,
  the forming step is accomplished by forming the slit as an arcuate slit with a convex side being positioned closest to the bend line.

* * * * *

UNITED STATES PATENT AND TRADEMARK OFFICE
CERTIFICATE OF CORRECTION

PATENT NO. : 7,032,426 B2 Page 1 of 1
APPLICATION NO. : 10/861726
DATED : April 25, 2006
INVENTOR(S) : Max W. Durney, Alan D. Pendley and Irving S. Rappaport It is certified that error appears in the above-identified patent and that said Letters Patent is hereby corrected as shown below:

IN THE CLAIMS

At Col. 44, Claim 1, line 26, change "wit" to --with--.

At Col. 44, Claim 2, line 30, change "fanning" to --forming--.

At Col. 44, Claim 4, line 45, change "wit" to --with--.

Signed and Sealed this

Eleventh Day of July, 2006

JON W. DUDAS
*Director of the United States Patent and Trademark Office*